(12) United States Patent
Zuo et al.

(10) Patent No.: US 7,216,018 B2
(45) Date of Patent: May 8, 2007

(54) ACTIVE CONTROL VIBRATION ISOLATION USING DYNAMIC MANIFOLD

(75) Inventors: Lei Zuo, Cambridge, MA (US); Jean-Jacques E. Slotine, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 287 days.

(21) Appl. No.: 10/878,669

(22) Filed: Jun. 28, 2004

(65) Prior Publication Data

US 2005/0256613 A1 Nov. 17, 2005

Related U.S. Application Data

(60) Provisional application No. 60/571,137, filed on May 14, 2004.

(51) Int. Cl.
  G05B 13/02 (2006.01)
  G05D 19/00 (2006.01)
(52) U.S. Cl. .......................... 700/280; 700/40
(58) Field of Classification Search ................ 700/280, 700/40
See application file for complete search history.

(56) References Cited

U.S. PATENT DOCUMENTS 6,721,636 B1 * 4/2004 Gade .............................. 701/1

OTHER PUBLICATIONS

Cao et al. "Active vibration absorber design via sliding mode control" American Control Conference 2000, Proceedings of the 2000 ,Chicago, Il, USA, vol. 3, pp. 1637-1638, Published 2000.*

Alleyne, Andrew and Hedrick, J. Karl, "Nonlinear Adaptive Control of Active Suspensions", IEEE Transactions on Control Systems Technology, vol. 3, No. 1, Mar. 1995, pp. 94-101.

Bai, M. R. and Liu, W., "Control Design of Active Vibration Isolation Using µ-Synthesis", Journal of Sound and Vibration, 2002, 257(1), pp. 157-175.

Balas, "Trends in Large Space Structure Control Theory: Fondest Hopes, Wildest Dreams", IEEE Transactions on Automatic Control, vol. AC-27, No. 3, Jun. 1982, pp. 522-535.

Chan, S. P. and Gao, Wei-bing, "Variable Structure Model-Reaching Control Strategy for Robot Manipulators", IEEE, 1989, CH2750-8/89/0000/1504, pp. 1504-1508.

(Continued)

*Primary Examiner*—Leo Picard
*Assistant Examiner*—Steven R. Garland
(74) *Attorney, Agent, or Firm*—Steven J. Weissburg

(57) ABSTRACT

A controller f or multi-DOF active vibration isolation accounts for plant uncertainties and payload disturbances using dynamic frequency-shaped sliding control. Modal decomposition rewrites a multi-DOF vibration control problem as a combination of modal problems. Modal parameters can be extracted. Target frequency-domain performance, e.g., a skyhook, is recast as a frequency-shaped sliding surface. Boundary layer approximation is examined. Skyhook can be robustly achieved. The manifold is also extends to adaptive vibration isolation without model reference. Nonlinear target dynamics of the same order as the plant can be attained. Control can be achieved without measuring excitation or knowing mass, stiffness and damping matrices. Control for plants subject to disturbances other than vibration can be achieved for any that can be described by equations the same character as those that describe mechanical dynamic systems. The target dynamics can be any, even non-linear.

107 Claims, 25 Drawing Sheets

OTHER PUBLICATIONS

Chen, Xinkai, Fukuda, Toshio and Young, K. David, "A new nonlinear robust disturbance observer", Systems and Control Letters 41, 2000, pp. 189-199.

Gawronski, Wodek K., Dynamics and Control of Structures: A Modal Approach, Springer-Verlag, 1998.

Hrovat, D., "Survey of Advanced Suspension Developments and Related Optimal Control Applications", Automatica, vol. 33, No. 10, pp. 1781-1817, 1997, Pergamon, Great Britain.

Hung, John Y., Gao, Weibing and Hung, James C., "Variable Structure Control: A Survey", IEEE Transactions on Industrial Electronics, vol. 40, No. 1, Feb. 1993, pp. 2-22.

Inman, Daniel J., "Active modal control for smart structures", Phil. Trans. R. Soc. Lond., 2001, pp. 205-219.

Karnopp, D., "Active and Semi-Active Vibration Isolation", Journal of Mechanical Design, Jun. 1995, vol. 117, pp. 177-185.

Karnopp, D., Crosby, M.J. and Harwood, R.A., "Vibration Control Using Semi-Active Force Generators", Journal of Engineering for Industry, May 1974, pp. 619-626.

Kim, C. and Ro, P. I., "A sliding mode controller for vehicle active suspension systems with non-linearities", Proc Instn Mech Engrs, vol. 212 Part D, pp. 79-92.

Lohmiller, Winfried and Slotine, Jean-Jacques E., "Conrol System Design for Mechanical Systems Using Contraction Theory", IEEE Transactions on Automatic Control, vol. 45, No. 5, May 2000, pp. 984-989.

Lohmiller, Winfried and Slotine, Jean-Jacques E., "On Contraction Analysis for Non-linear Systems", Automatica, vol. 34, No. 6, pp. 683-696, 1998, Pergamon, Great Britain.

Luo, N. Rodellar, J., De La Sen, M. and Vehi, J., "Output feedback sliding mode control of base isolated structures", Journal of the Franklin Institute, Pergamon, 337, 2000, pp. 555-577.

Mizutani, Kazuki, Fujita, Yoshitaka and Ohmori, Hideto, "Hybrid Control System for Microvibration Isolation", IEEE AMC 1996-MIE, 0-7803-3219-Sep. 1996, pp. 577-582.

Mottershead, J. E. and Friswell, M. I., "Model Updating in Structural Dynamics: A Survey", Journal of Sound and Vibration (1993) 167(2), pp. 347-375.

Preumont, A., Francois, A., Bossens F. and Abu-Hanieh, A., "Force Feedback Versus Acceleration Feedback in Active Vibration Isolation", Journal of Sound and Vibration (2002) 257(4), pp. 605-613.

Richman, S. J., Giaime, J. A., Newell, D. B., Stebbins, R. T., Bender, P. L. and Faller, J. E., "Multistage active vibration isolation s ystem", Review of Scientific Instruments, vol. 69, No. 6, Jun. 1998, pp. 2531-2538.

Rivin, Eugene I., "Vibration isolation of precision equipment", Precision Engineering 17, pp. 41-56, 1995.

Serrand, M. and Elliott, S. J., "Multichannel Feedback Control for the Isolation of Base-Excited Vibration", Journal of Sound and Vibration (2000) 234(4), pp. 681-704.

Slotine, Jean-Jacques E., "Modular stability tools for distributed computation and control", International Journal of Adaptive Control and Signal Processing, accepted May 29, 2003, pp. 397-416, vol. 17, published Aug. 2003. Available online Jul. 31, 2003.

Slotine, Jean-Jacques E., "Sliding controller design for non-linear systems", Int. J. Control, 1984, vol. 40, No. 2, pp. 421-434.

Stobener, Uwe and Gaul, Lothar, "Active Vibration Control of a Car Body Based on Experimentally Evaluated Modal Parameters", Mechanical Systems and Signal Processing (2001) 15(1), 173-188.

Trumper, David L. and Sato, Tsuyoshi, "A vibration isolation platform", Mechatronics 12 (2002), pp. 281-294.

Vaes, D., Souverijns, W., De Cuyper, J., Swevers, J., Sas, P., "Optimal decoupling for improved multivariable controller design, applied on a n automotive vibration test rig", Proceedings of the American Control Conference, Denver, Colorado, Jun. 4-6, 2003, pp. 785-790.

Wang, Y.-P. and Sinha, A., "Adaptive Sliding Mode Control Algorithm for a Multi-Degree-of-Freedom Microgravity Isolation System", Proceedings of the 1997 IEEE International Conference on Control Applications, Hartford, CT, Oct. 5-7, 1997, pp. 797-802.

Yao, Bin and Tomizuka, Masayoshi, "Smooth Robust Adaptive Sliding Mode Control of Manipulators with Guaranteed Transient Performance", Journal of Dynamic Systems, Measurement, and Control, Dec. 1996, vol. 118, pp. 765-775.

Young, David K. and Ozguner, Umit, "Frequency shaping compensator design for sliding mode", Int. J. Control, 1993, vol. 57, No. 5, pp. 1005-1019.

Young, David K. and Utkin, Vadim I., and Ozguner, Umit, "A Control Engineer's Guide to Sliding Mode Control", IEEE Transactions on Control Systems Technology, vol. 7, No. 3, May 1999, pp. 328-342.

Zhao, Bin, Lu, Xilin, Wu, Minzhe, and Mei, Zhanxin, "Sliding mode control of buildings with base-isolation hybrid protective system", Earthquake Engineering and Structural Dynamics 2000; 29, pp. 315-326.

Zuo, Lei, Slotine, Jean-Jacques E. and Nayfeh, Samir A., "Experimental Study of a Novel Adaptive Controller for Active Vibration Isolation", Proceeding of the 2004 American Control Conference, Boston, MA, Jun. 30-Jul. 2, 2004, pp. 3863-3868. (Not admitted to be prior art).

Zuo, Lei, and Slotine, Jean-Jacques E., "Robust Vibration Isolation via Frequency-Shaped Sliding Control and Modal Decomposition", Journal of Sound and Vibration, submitted Apr. 8, 2003, accepted Sep. 2004, available online Dec. 25, 2004. (Not admitted to be prior art).

* cited by examiner

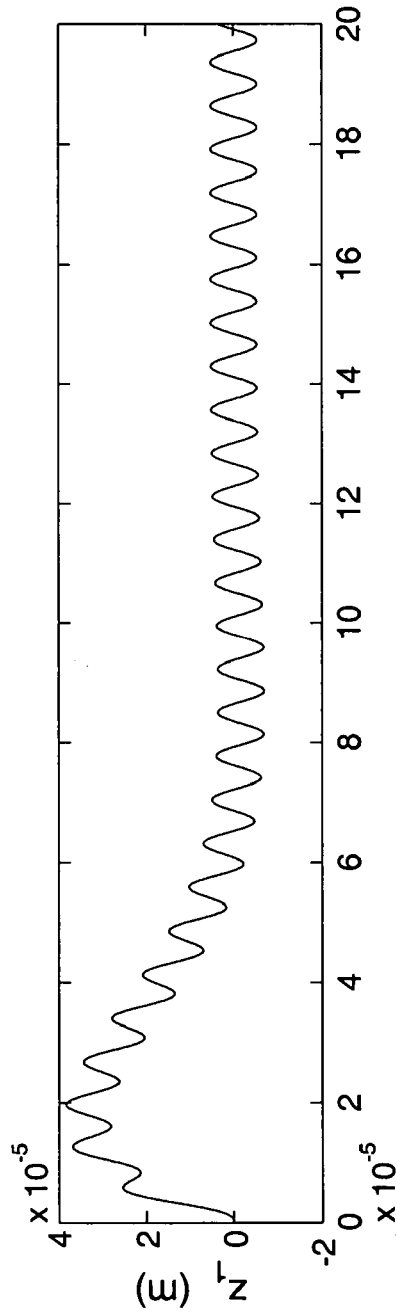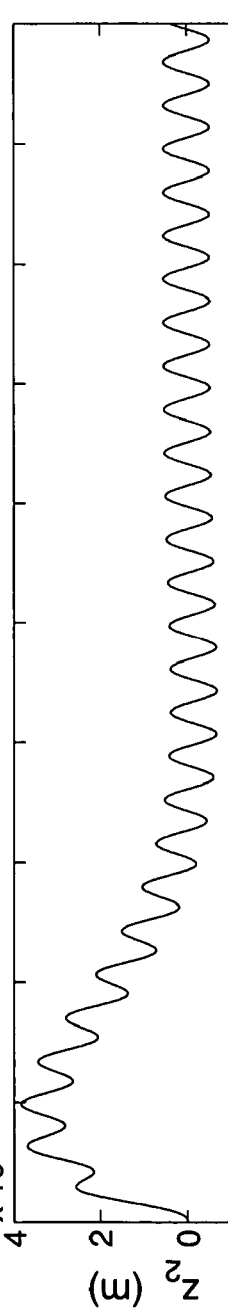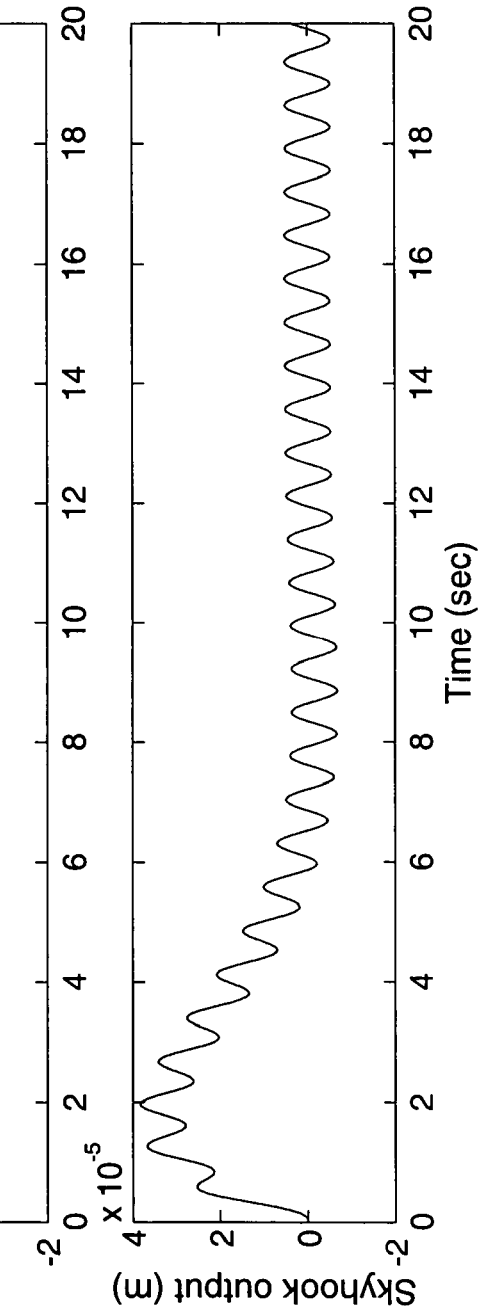

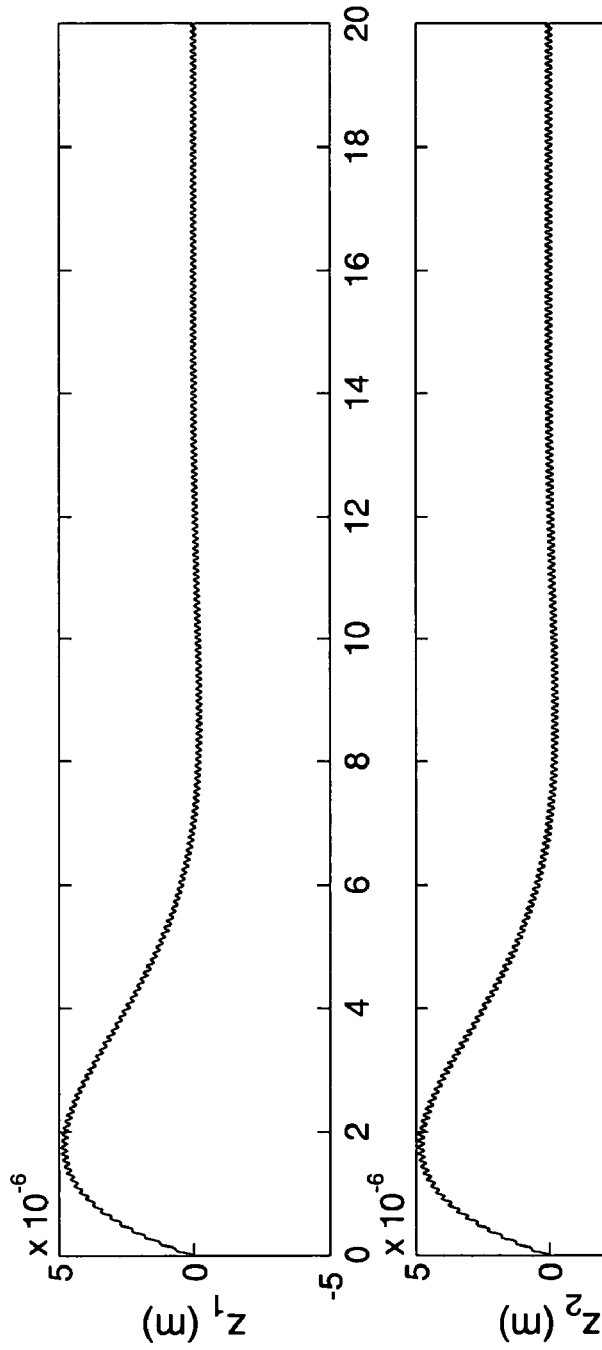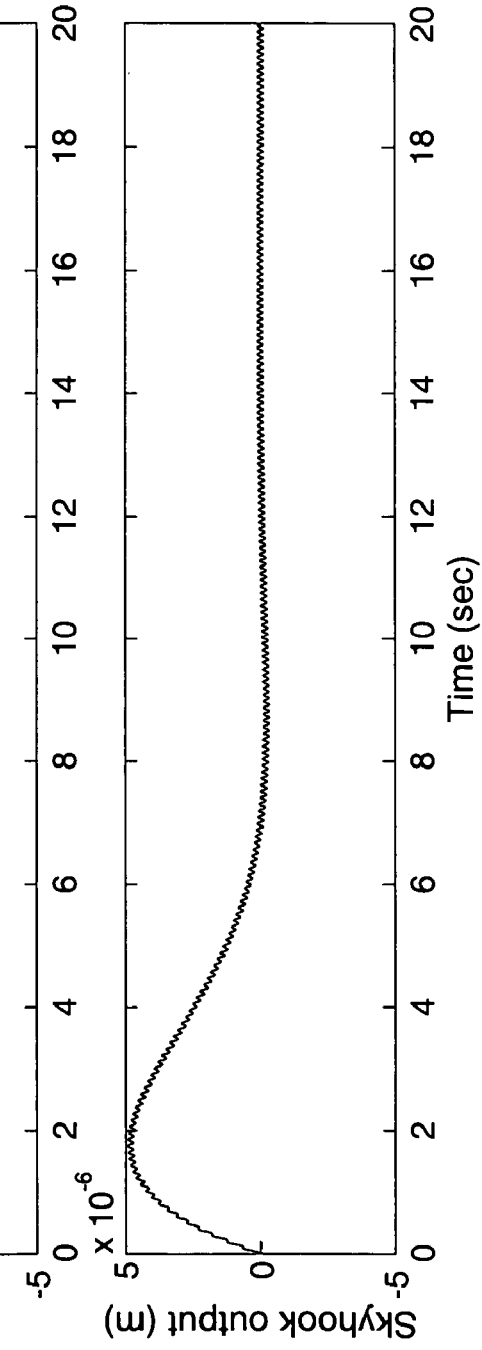
*Fig. 8A*
*Fig. 8B*
*Fig. 8C*

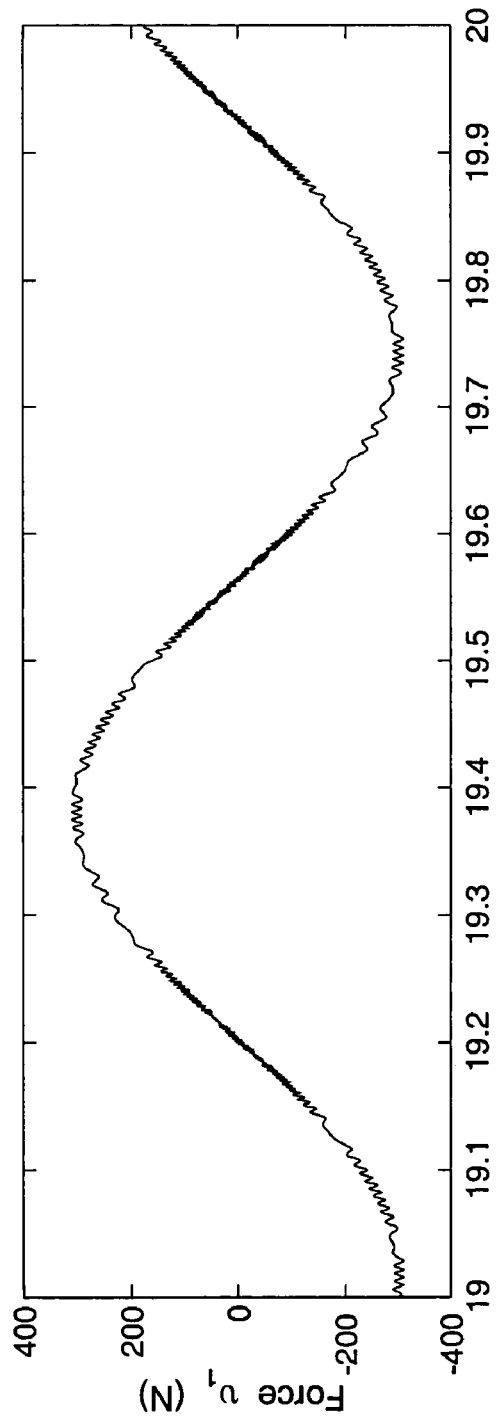
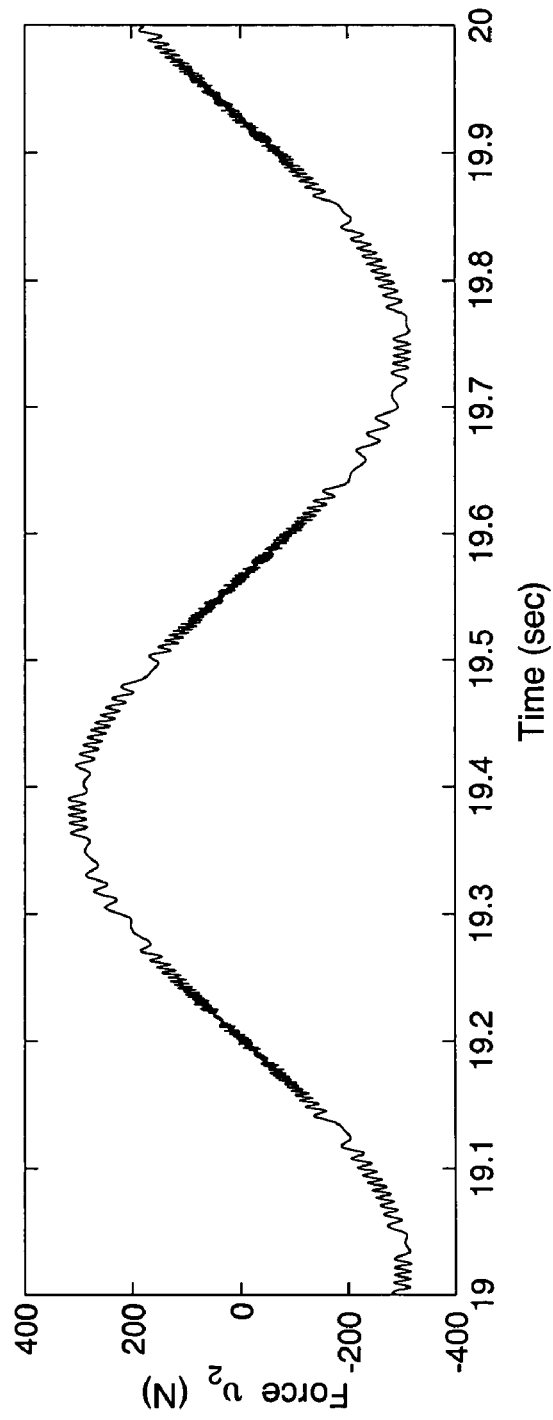
Fig. 11A
Fig. 11B

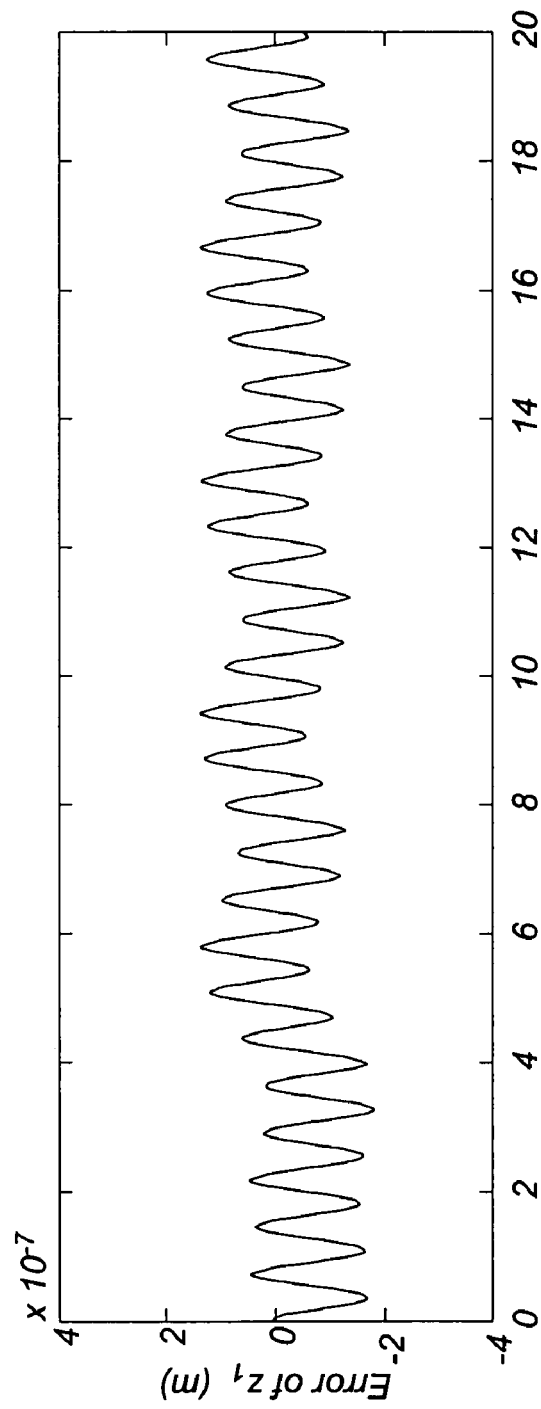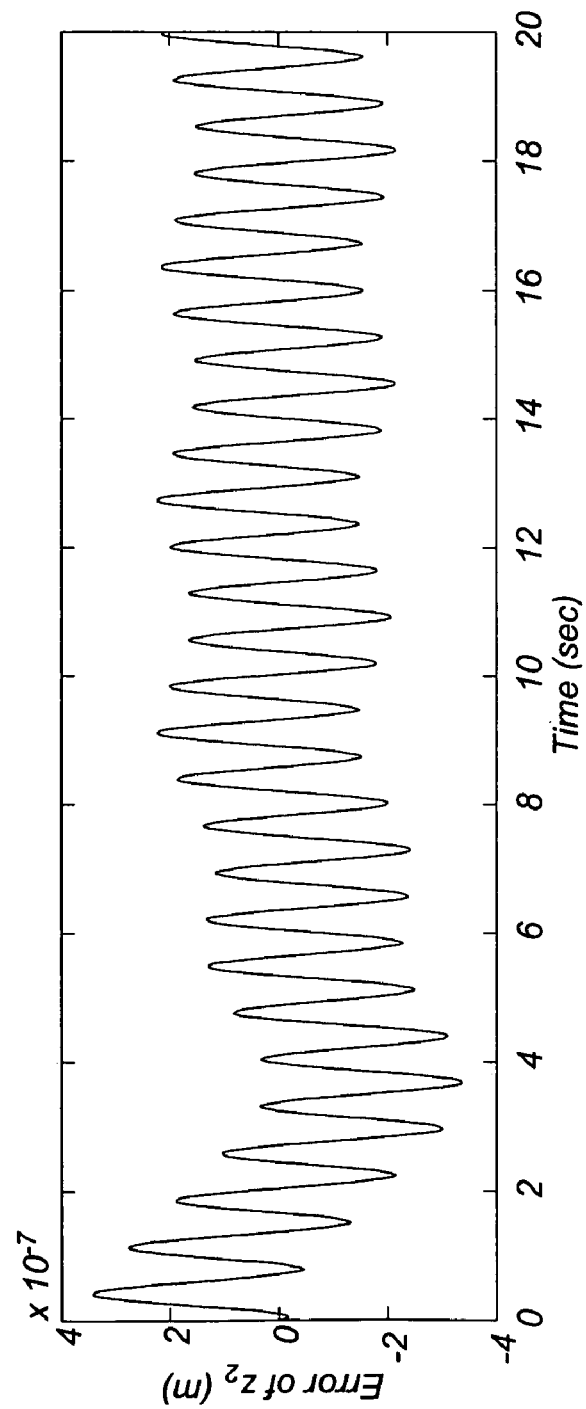
*Fig. 12A*
*Fig. 12B*

ACTIVE CONTROL VIBRATION ISOLATION USING DYNAMIC MANIFOLD

RELATED DOCUMENTS

Benefit is hereby claimed to U.S. Provisional patent application No. 60/571,137 filed on May 14, 2004, which is hereby fully incorporated by reference herein.

A partial summary is provided below, preceding the claims.

The inventions disclosed herein will be understood with regard to the following description, appended claims and accompanying drawings, where:

FIGS. 7A, 7B and 7C are graphical representations showing responses of the controlled system, FIG. 7A for $z_1$, FIG. 7B for $z_2$, and FIG. 7C showing a skyhook system, all under ground excitation at $z_0=0.001\sin(1.38\times2\pi t)$m;

FIGS. 8A, 8B and 8C are graphical representations showing responses of the controlled system, FIG. 8A for $z_1$, FIG. 8B for $z_2$, and FIG. 8C showing a skyhook system, all under ground excitation $z_0=0.001\sin(9.55\times2\pi t)$m;

FIGS. 11A and 11B are graphical representations showing control forces $v_1$ and $v_2$, respectively, with a boundary layer under ground excitation $z_0=0.001\sin(1.38\times2\pi t)$m;

FIGS. 12A and 12B are graphical representations showing displacement errors $z_1$ and $z_2$, respectively, due to a thicker boundary layer, under the same ground excitation $z_0=0.001\sin(1.38\times2\pi t)$m;

Figure 17A:
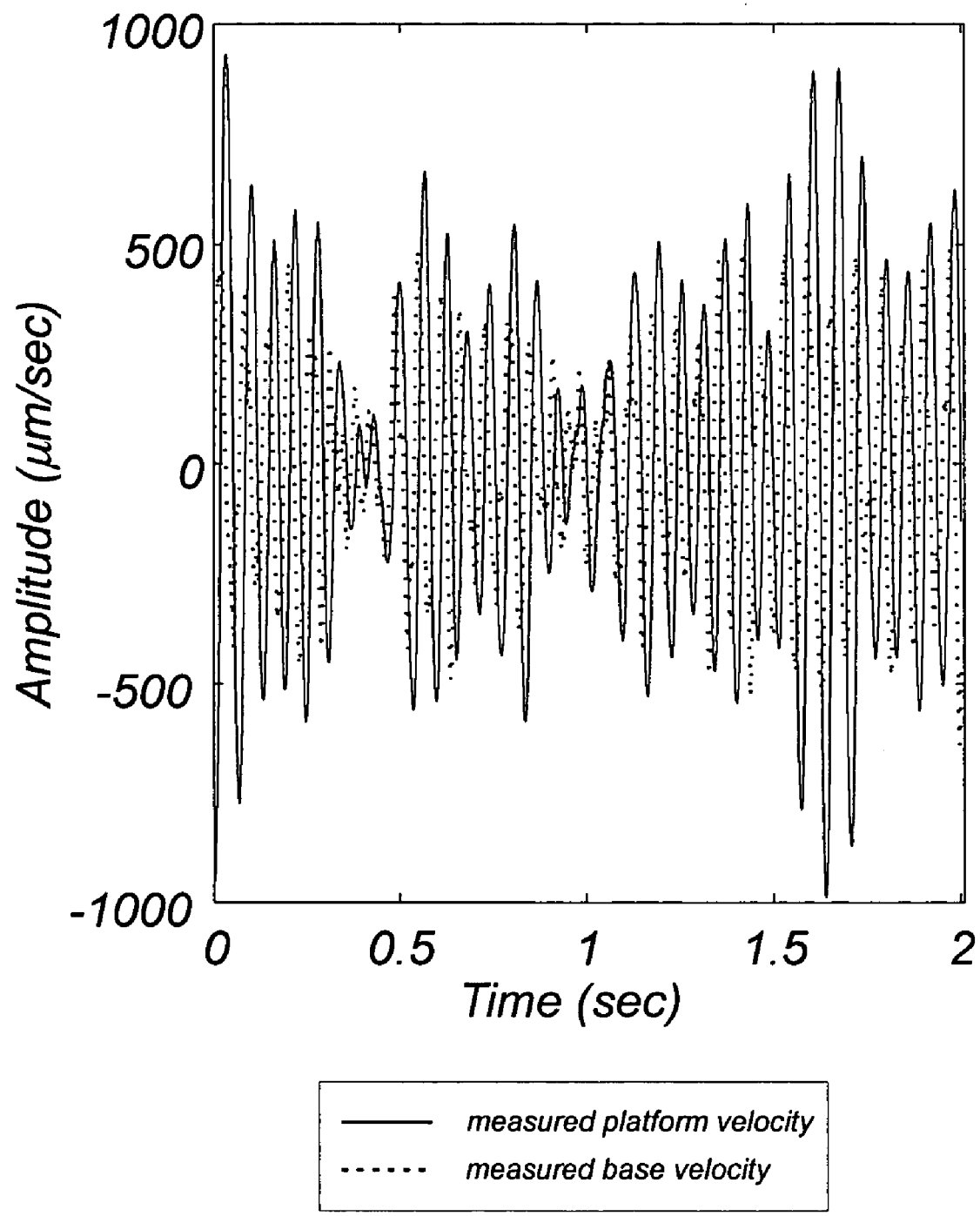
Figure 17B:
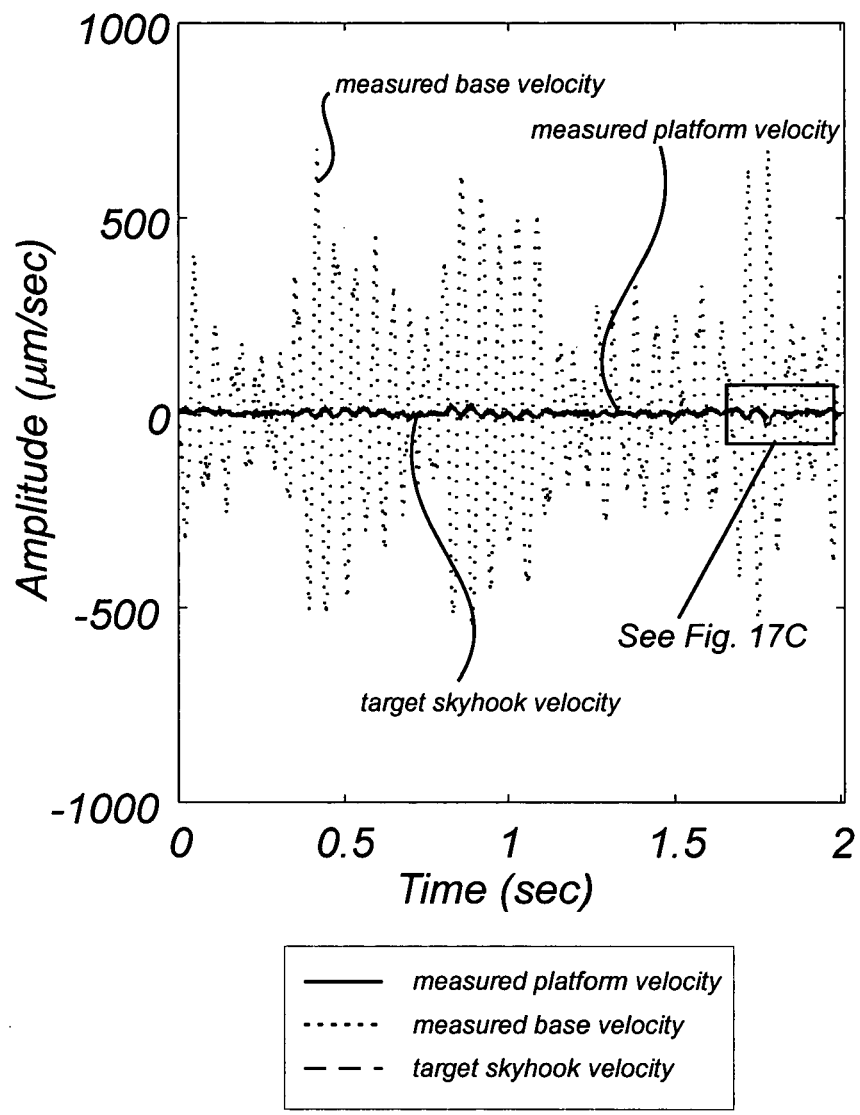
Figure 17C:
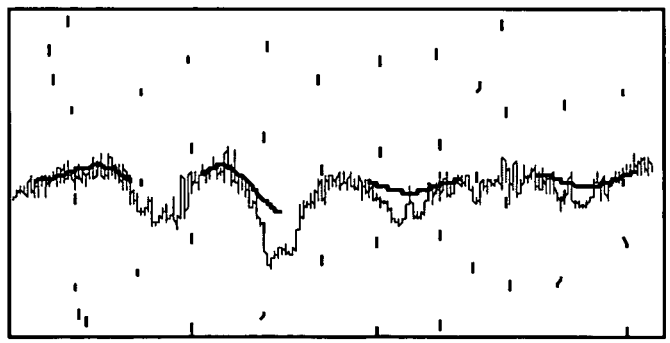
Figure 18:
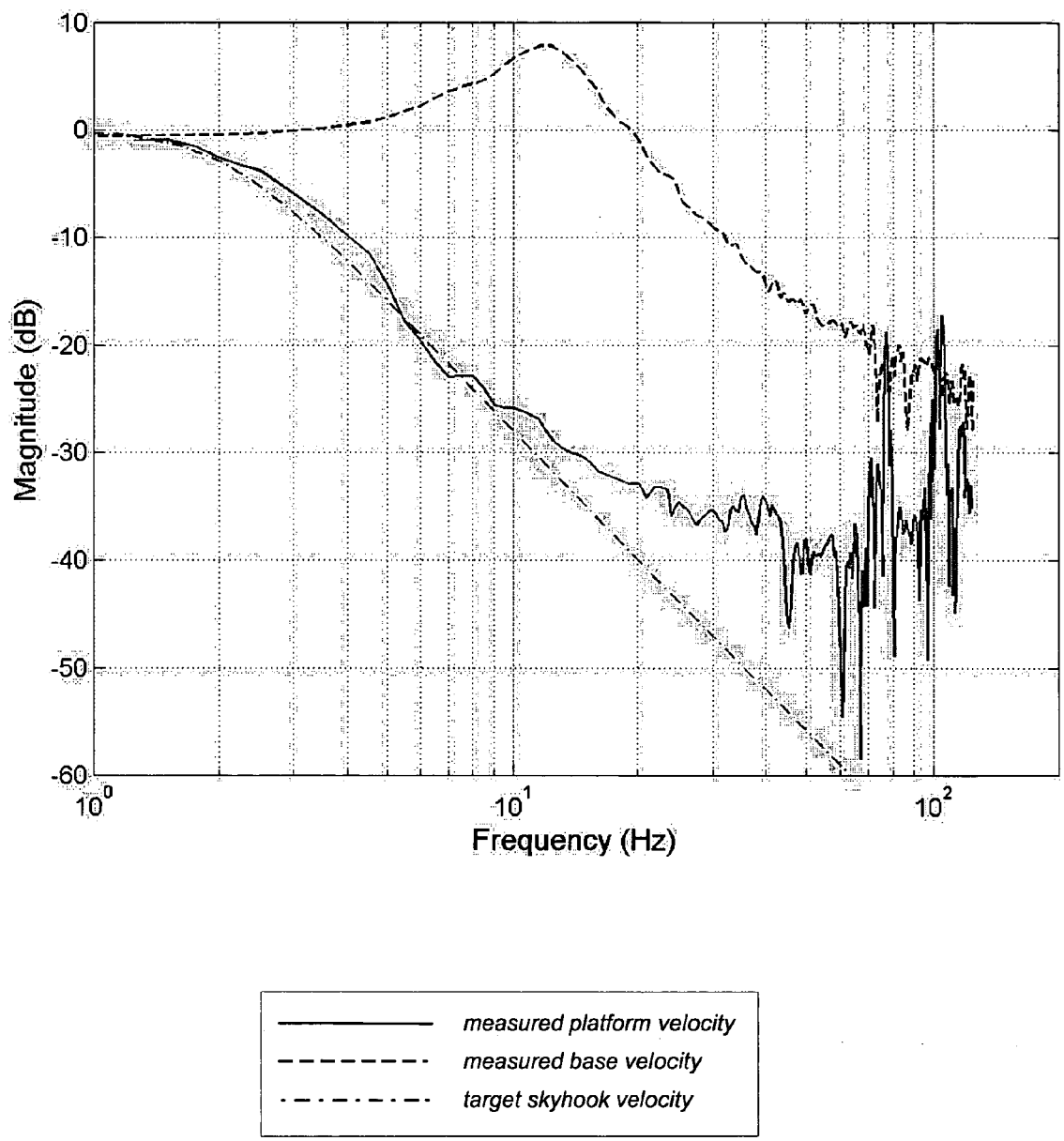
Figure 19:
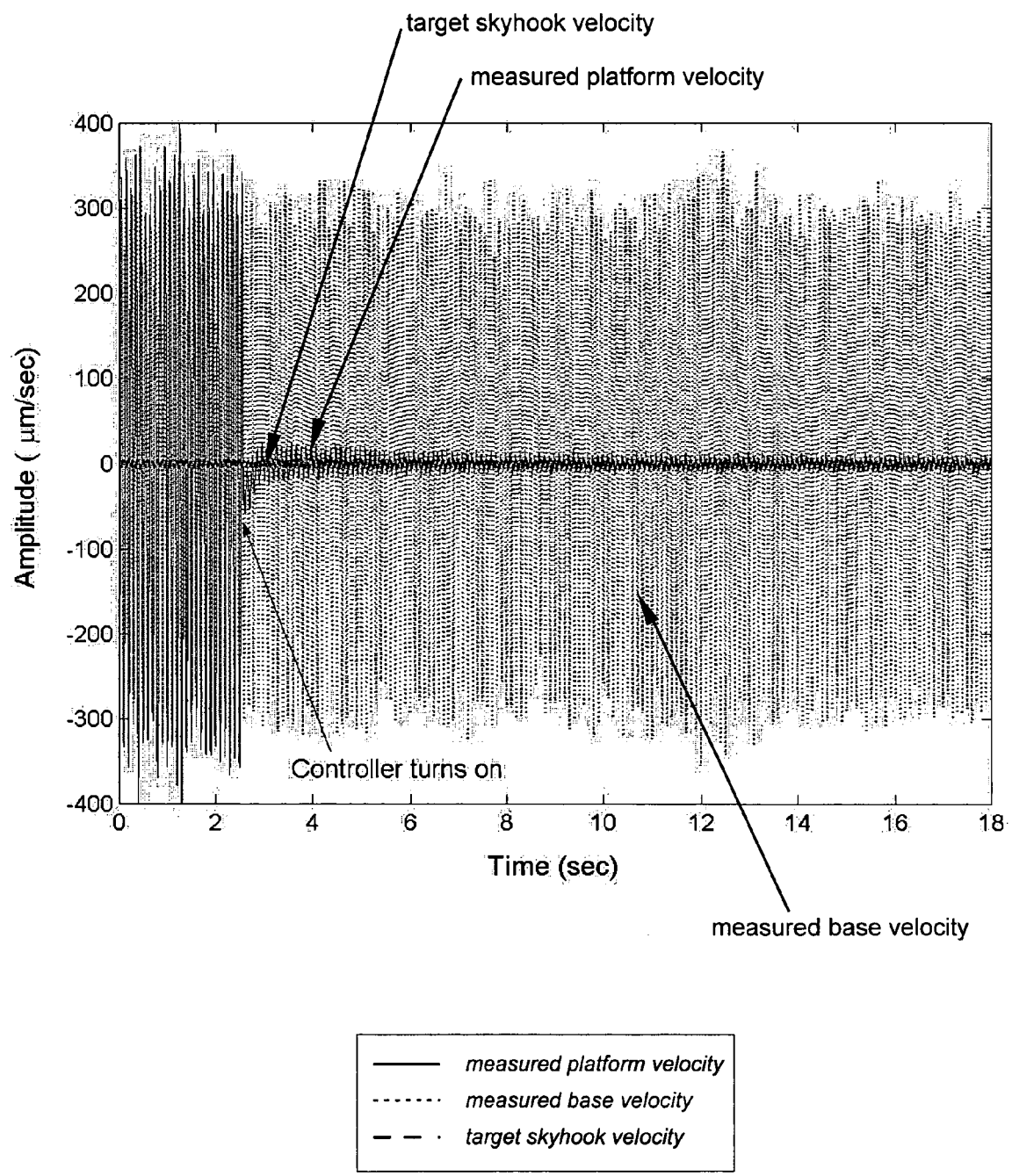
Figure 20:
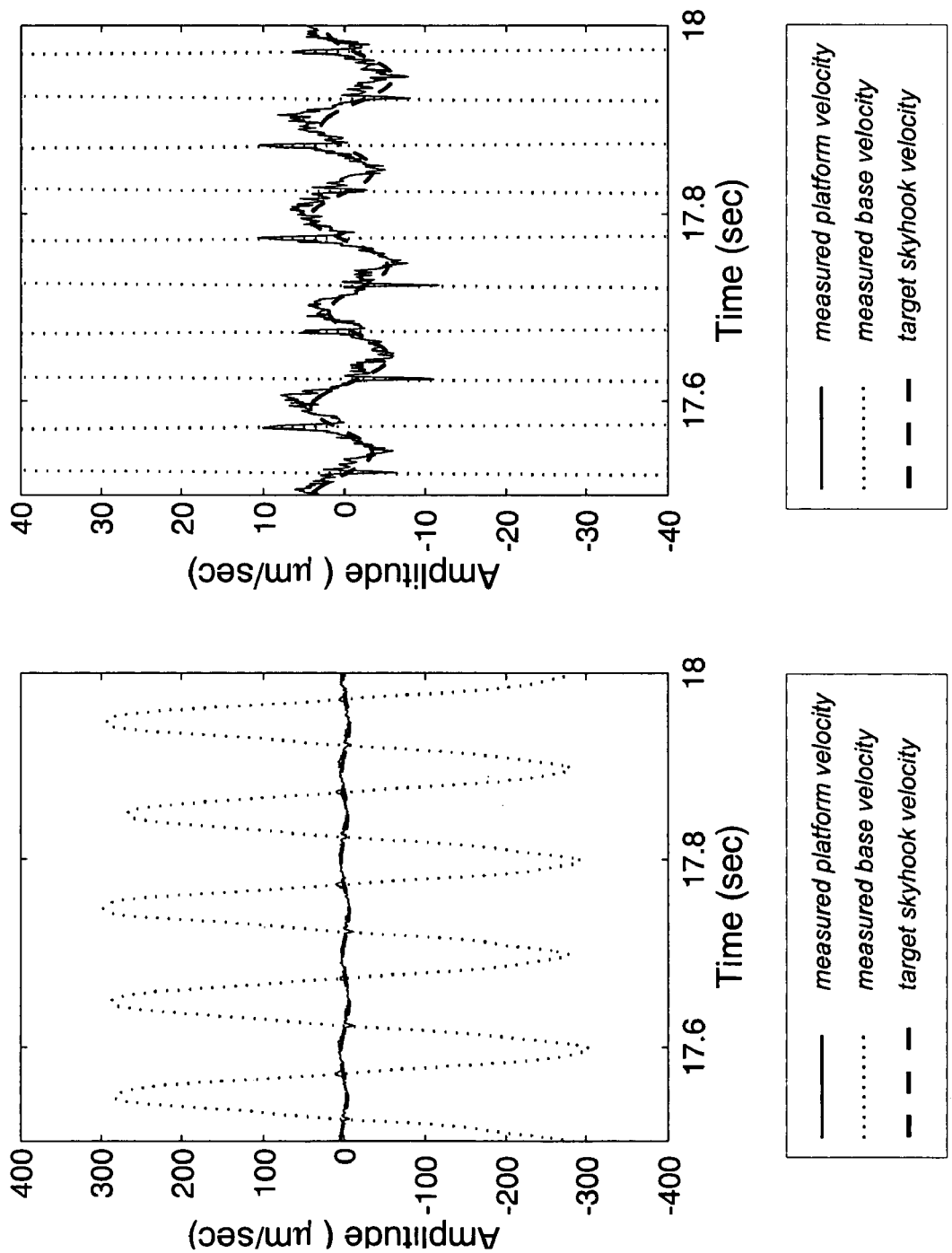
Figure 21:
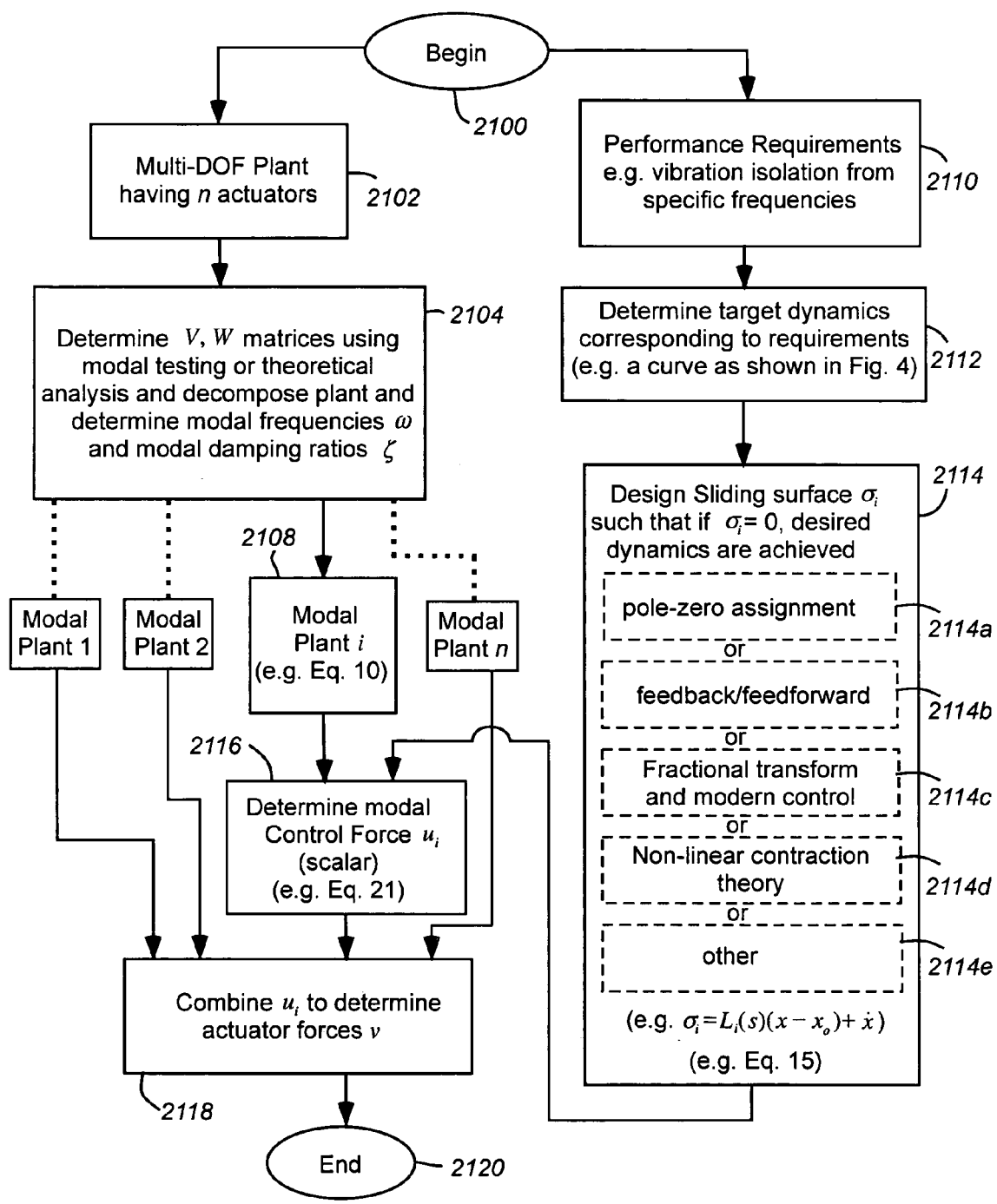
Figure 22:
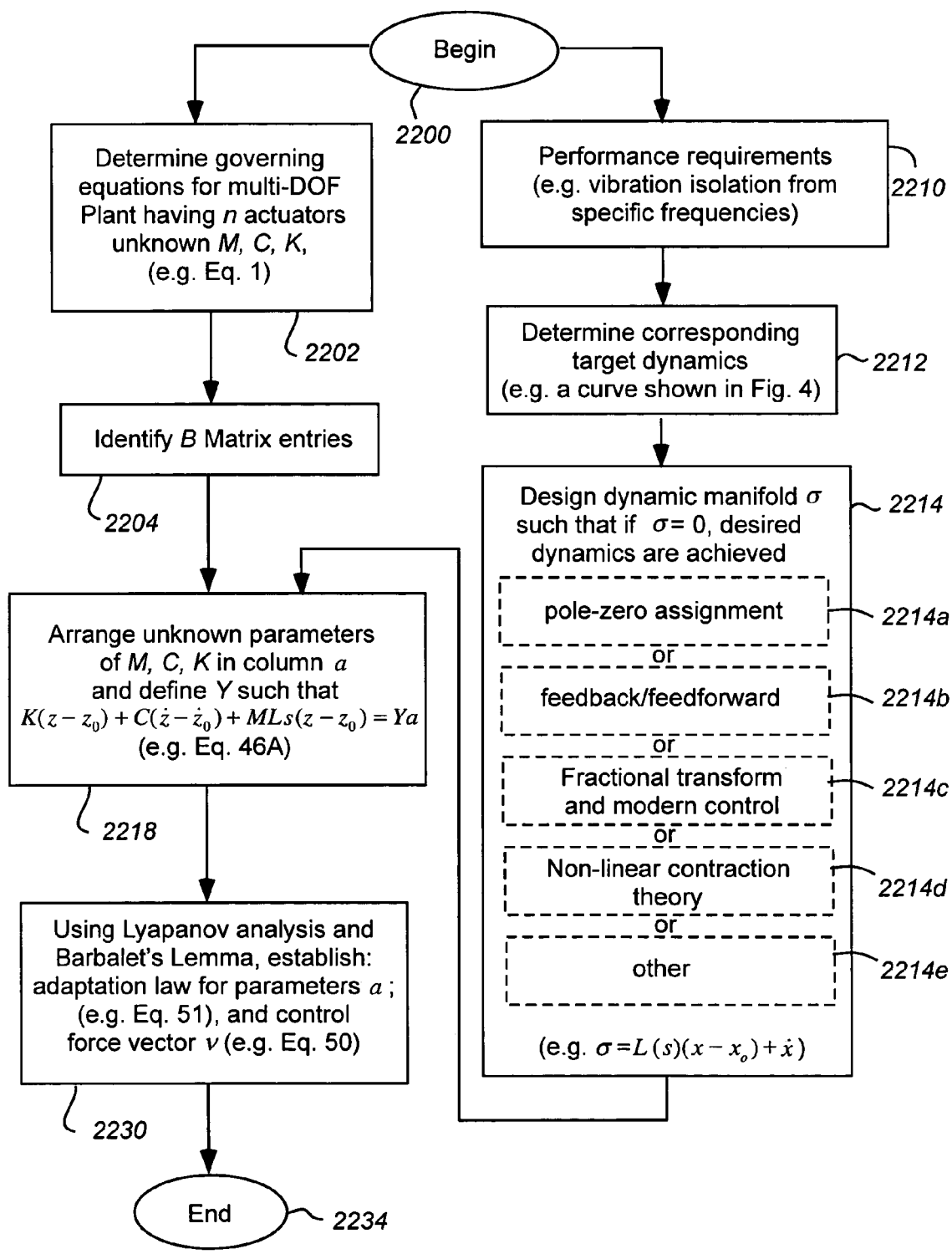
Figure 23:
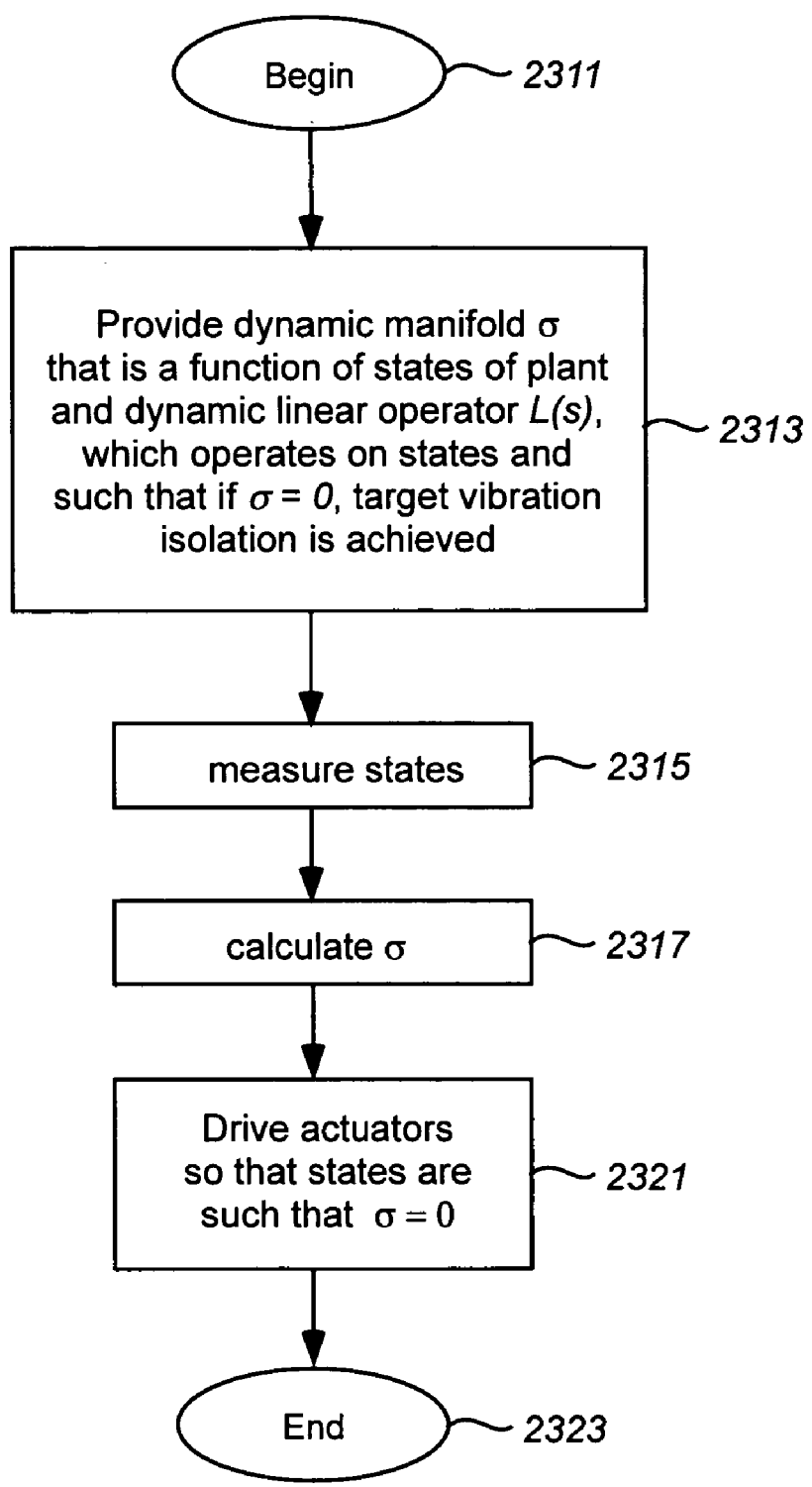
Figure 24:
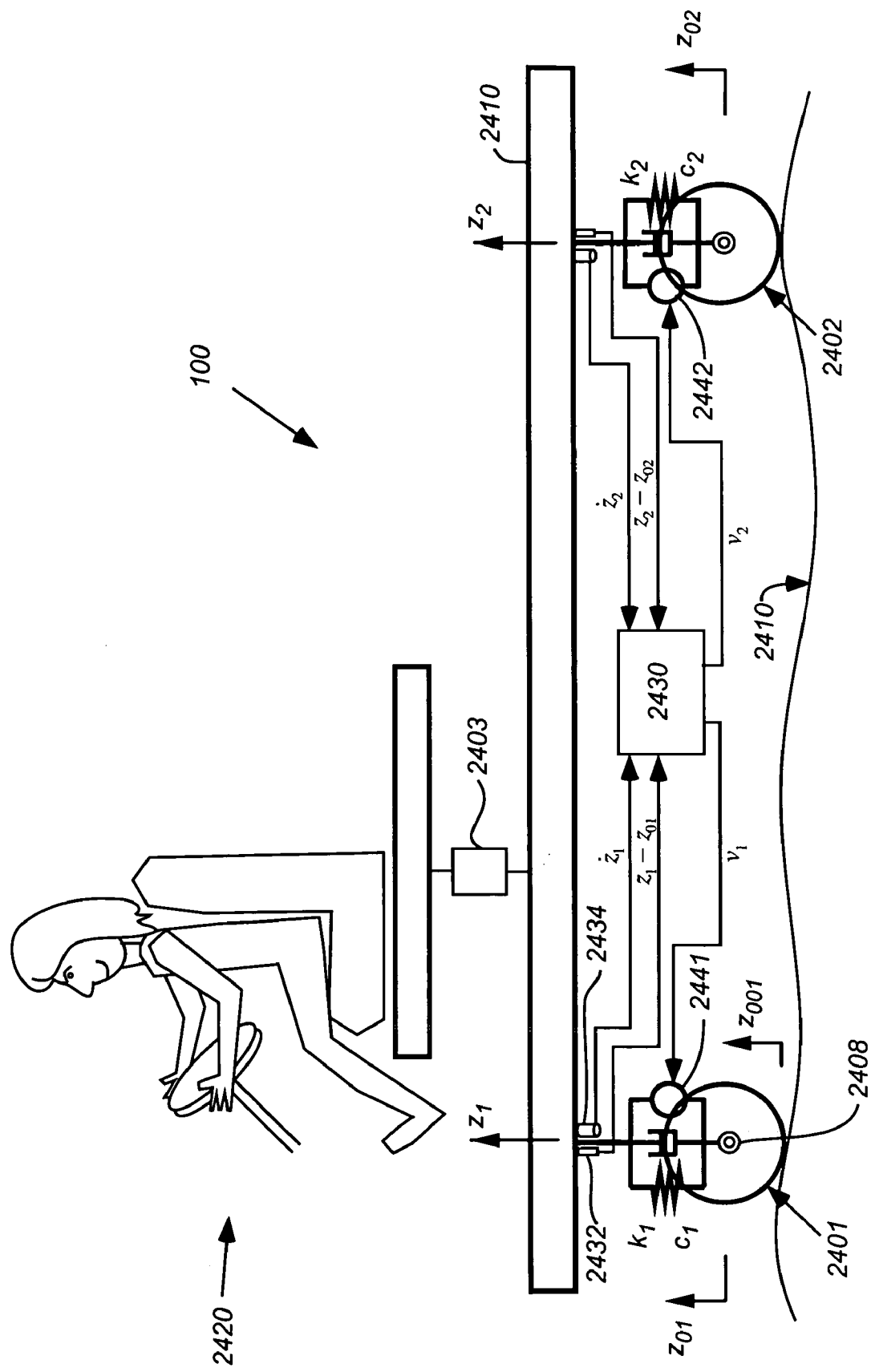

FIGS. 17A, 17B and 17C are graphical representations showing time response of a single-DOF isolation system (experiment); with FIG. 17A showing passive isolation without control; FIG. 17B showing active isolation with frequency-shaped sliding control: measured base velocity (dotted line), measured platform velocity (solid line), target skyhook velocity (dashed line); and FIG. 17C showing, schematically, an enlargement of over several 0.25 seconds, showing the target and platform velocities as in FIG. 17B;

FIG. 18 is a graphical representation showing the magnitude frequency response from a base to an isolated platform, with passive isolation without control shown dashed; active isolation with frequency-shaped sliding control shown solid, and target skyhook shown dash-dot;

FIG. 19 is a graphical representation showing the time response of a single-DOF isolation system (experimental) when the adaptive control turns on under 10 Hz base excitation, with initial parameters set as zeros showing: measured base velocity (dotted line); measured platform velocity (solid line); and target skyhook velocity (dashed line);

FIGS. 20A and 20B show, schematically, responses of a base velocity (dot) in comparison with platform velocity (solid) and target skyhook velocity (dash) with FIG. 20A showing the response, and FIG. 20B showing a zoomed view (enlarging the scale of the amplitude axis);

FIG. 21 shows, schematically, in flow-chart form, steps of a method to design a controller using a dynamic manifold and sliding control, which can be used for a SISO plant, or for a mode of a modally decomposed plant, which is later modally combined;

FIG. 22 shows, schematically, in flow-chart form, steps of a method to design a controller that may be used for a SISO or a MIMO plant, using adaptive control without modal decomposition, even if entries for the M, C and K matrices are not known;

FIG. 23 shows, schematically, in flow-chart form, steps of a method to control a plant using a dynamic manifold; and FIG. 24 shows, schematically, in block diagram form, a passenger vehicle, such as an automobile, with a controller of an invention hereof installed to isolate the passenger from vibration due to passage over a road surface.

NOMENCLATURE

The following symbols and notations are used herein.

M: mass matrix;
C: damping matrix;
K: stiffness matrix;
$B_V$: a matrix taking into account the effect of actuator locations;
v: vector of control force;
$f_d$: vector of disturbance force;
z, ż, and z̈: vector of displacement, velocity, and acceleration. $z_i$: $i^{th}$ component of z;
$z_0$: displacement vector of ground/base motion;
V: matrix of mode shapes;
W: matrix of mode participations;
$\omega_i$: $i^{th}$ nature frequency of the system;
$\hat{\omega}_i$: estimate of $\omega_i$;
$\omega$: frequency;
$\zeta_i$: $i^{th}$ mode damping ratio;
$\hat{\zeta}_i$: estimate of $\zeta_i$;
$\Lambda$: a diagonal matrix composed of $\omega_i^2$;
x, ẋ, and ẍ: vector of displacement, velocity, and acceleration in modal coordinates;

$x_0$: displacement vector of ground/base motion in modal coordinates;
$x_i$: $i^{th}$ component of x;
$x_{i0}$: $i^{th}$ component of $x_0$;
d: disturbance force vector in modal coordinates;
$\epsilon_{ir}$: the $ir^{th}$ entry of $V^{-1}M^{-1}CV$;
$\hat{\epsilon}_{ir}$: estimate of $\epsilon_{ir}$;
u: control force vector in modal coordinates;
H(jω): frequency response function matrix;
$\sigma_i$: the $i^{th}$ sliding surface;
σ: a vector of dynamic manifold, which in some cases may be a sliding surface;
s: Laplace operator;
$\lambda_i$: a constant scalar;
$L_i(s)$, $G_i(s)$, Q(s): dynamic linear operators;
$a_0$, $b_0$, $b_1$: constant scalars;
$\omega_s$: natural frequency of a skyhook system;
$\zeta_s$: modal damping ratio of a skyhook system;
$\omega_g$: resonant frequency of a geophone sensor;
$\zeta_g$: modal damping ratio of a geophone sensor;
$\eta_i$: a constant scalar;
[ \ ]: represents a diagonal matrix;
$\hat{\omega}_i$, $\hat{\zeta}_i$, $\hat{\epsilon}_{ir}$: estimation of $\omega_i$, $\zeta_i$, $\epsilon_{ir}$;
$\Phi_m$: boundary layer thickness;
$\hat{\dot{x}}_i$: geophone measurement of velocity $\hat{\dot{x}}_i$;
$T_{xi/xi0}(s)$: transmission from $x_{i0}$–$x_i$;
$e_i$: equals $x_{i0}$–$x_i$;
$x^{(n-1)}$: $n-1^{th}$ derivative (with respect to time);
$\overline{C}, \overline{K}$: damping and stiffness matrices of target skyhook;
P: a positive matrix;
$k_d$: a positive definite matrix;
Y: a matrix for parameterization;
a: a vector of unknown parameters;
$\hat{a}, \dot{\hat{a}}$: on line estimation of a and its time derivative;
$\tilde{a}, \dot{\tilde{a}}$: error in on line estimation and its time derivative;
$V(\sigma,\tilde{a})$, $\dot{V}(\sigma,\tilde{a})$, $\ddot{V}(\sigma,\tilde{a})$: Lyapunov function and its time derivatives;

INTRODUCTION

The following discusses many configurations, methods for designing control systems, and control methods. It is expressly stated herein that the inclusion of any of these items here is not an admission that any of these items are prior art, or that any of these references are from related or appropriate arts, or that it would have been appropriate or obvious to one of ordinary skill in the art to consider them either alone or in combination in connection with the inventions at the time the inventions were made. They have been identified and are presented here for explanatory purposes, gathered by hindsight knowledge of the inventions herein after the inventions were made. This is not a Background section. This is simply one part of this disclosure, designed to help readers understand the inventions that are disclosed herein.

Vibration isolation has been of great interest in the academic and industrial areas of precision machine tools, optical instruments, automobiles, aerospace, and civil structures. Passive isolators are often sufficient for high frequency isolation in many applications. But damping tradeoffs exist between the isolation performance at high frequency and that at low frequency. Soft mounting is preferred for seismic vibration, but it causes static misalignment and dynamic instability under payload disturbances. To improve the performance (especially at low frequencies), active isolators are suggested.

Many configurations and control methods have been developed for the active isolation. LQG/H2 control has been extensively used in suspension and isolation to suppress random excitations, see the survey by Hrovat (D. Hrovat) and the items therein. (All bibliographic items are cited herein by author(s) names, with full citations listed below, before the claims.) Karnopp (D. Karnopp, M. J. Crosby, and R. A. Harwood), (D. Karnopp) proposes the concept of skyhook damping, involving absolute velocity feedback.

Figure 3A:
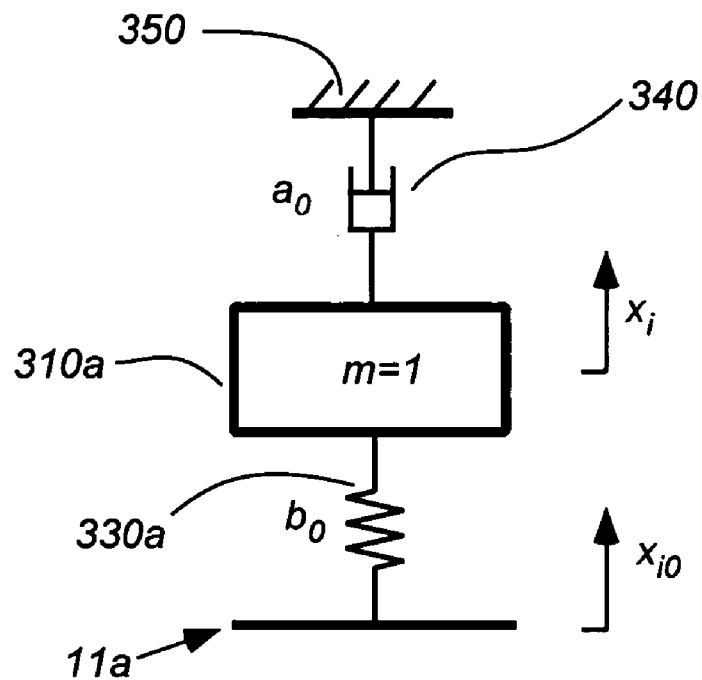
FIG. 3A is a schematic representation of a mass, damper, and spring arranged in a skyhook configuration.

By skyhook damping, it is meant, a configuration such a shown in FIG. 3A, where an inertial support 350, known as a sky, supports a mass 310a from above the mass, through a damper 340. The mass 310a is coupled to a lower support 11a, such as a floor, through a spring 330a. The floor is not considered to be stationary, having a vertical position $x_{i0}$ that varies over time. Vertical position of the mass 310a is indicated by the variable $x_i$. Serrand and Elliott (M. Serrand and S. Elliott) show that skyhook damping can be closely achieved for a rigid body mounted softly on a flexible base by using multi-channel absolute velocity feedback and reactive actuators. Conventional sliding mode control has been used in base isolation of building structures (B. Zhao, X. Lu, M. Wu, and Z. Mei), (N. Luo, J. Rodellar, D. De la Sen, and J. Vehi).

Feedforward control has been combined with feedback to improve the isolation performance and to reduce closed-loop bandwidth (T. E. Pare and J. P. How), (H. Yoshioka, Y. Takahashi, K. Katayama, T. Imazawa, and N. Murai).

In practice, since actual systems have many sources of uncertainty, robust controllers are required. $H_\infty$ and μ-synthesis are also used experimentally in active isolation (M. R. Bai and W. Liu). Alleyne and Hedrick (A. Alleyne and J. K. Hedrick) and Kim and Ro (C. Kim and P. I. Ro) use the skyhook model as reference, and employ adaptive control and sliding control to track a given skyhook force or states. An adaptive sliding control algorithm has also been developed by Wang and Sinha (Y. P. Wang and A. Sinha) for multi-degree-of-freedom microgravity isolation, where the reference model is defined as the ideal transfer matrix.

To further enhance the isolation performance, multi-stage isolation may become necessary, combining passive and active stages (K. Mizutani, Y. Fujita, and H. Ohmori), (S. J. Richman, J. A. Giame, D. B. Newell, R. T. Stebbins, P. L. Bender, and J. E. Faller). Further uncertainties exist in such systems. For instance, the mass, location, and dynamics of upper stages or the payload might be unknown or be time-varying. The structured mathematical modelling required in H2 or $H_\infty$ synthesis is hard to obtain in this context. Similarly, adaptive control (A. Alleyne and J. K. Hedrick), (Y. P. Wang and A. Sinha) can achieve some robustness, but non-parametric uncertainties and unmodelled dynamics could remain a problem. For example it might be desired to design an active isolation table and use it in different experiments, where the payload dynamics on the isolation table might not be easily parameterized.

A purpose of an invention hereof is to provide a robust controller for multi-degree-of-freedom isolation with uncertainties in payload dynamics and disturbances. In some cases herein, frequency-shaped sliding surfaces are exploited. They were proposed (in K. D. Young and U. Ozguner) for chattering attenuation. It has been determined by inventors hereof that such a specification is appropriate for shaping system performance directly in the frequency domain such as a skyhook dynamics target of vibration isolation. The controller can be synthesized based on the data of experimental modal analysis or a mathematical model.

Modal analysis and decomposition is introduced below. Multi-input multi-output (MIMO) control of the isolation system can be handled with single input single output (SISO) systems in modal coordinates, with coupling from other modes and payload dynamics taken as disturbances. Frequency-shaped sliding control is used to achieve skyhook isolation under modal uncertainties and payload disturbances, as well as coupling due to decomposition errors. Smooth boundary layer implementation of the controller is examined and quantified for the given isolation requirement. The effect of geophone dynamics and mode combination are also explored. Simulation results that verify the design are also presented below. The experiment verification of a disclosed routine of frequency-shaped manifold for vibration isolation is also presented below. The experiment verification is briefly presented following simulation results. Also disclosed is generalized design of frequency-shaped sliding surfaces from the point of view of linear compensator design and of contraction theory. This allows linear or nonlinear target dynamics of the same order as the nominal plant to be systematically specified. As used herein, the term sliding surface is a type of dynamic manifold.

Modal Decomposition and Experimental Modal Analysis

Figure 1:
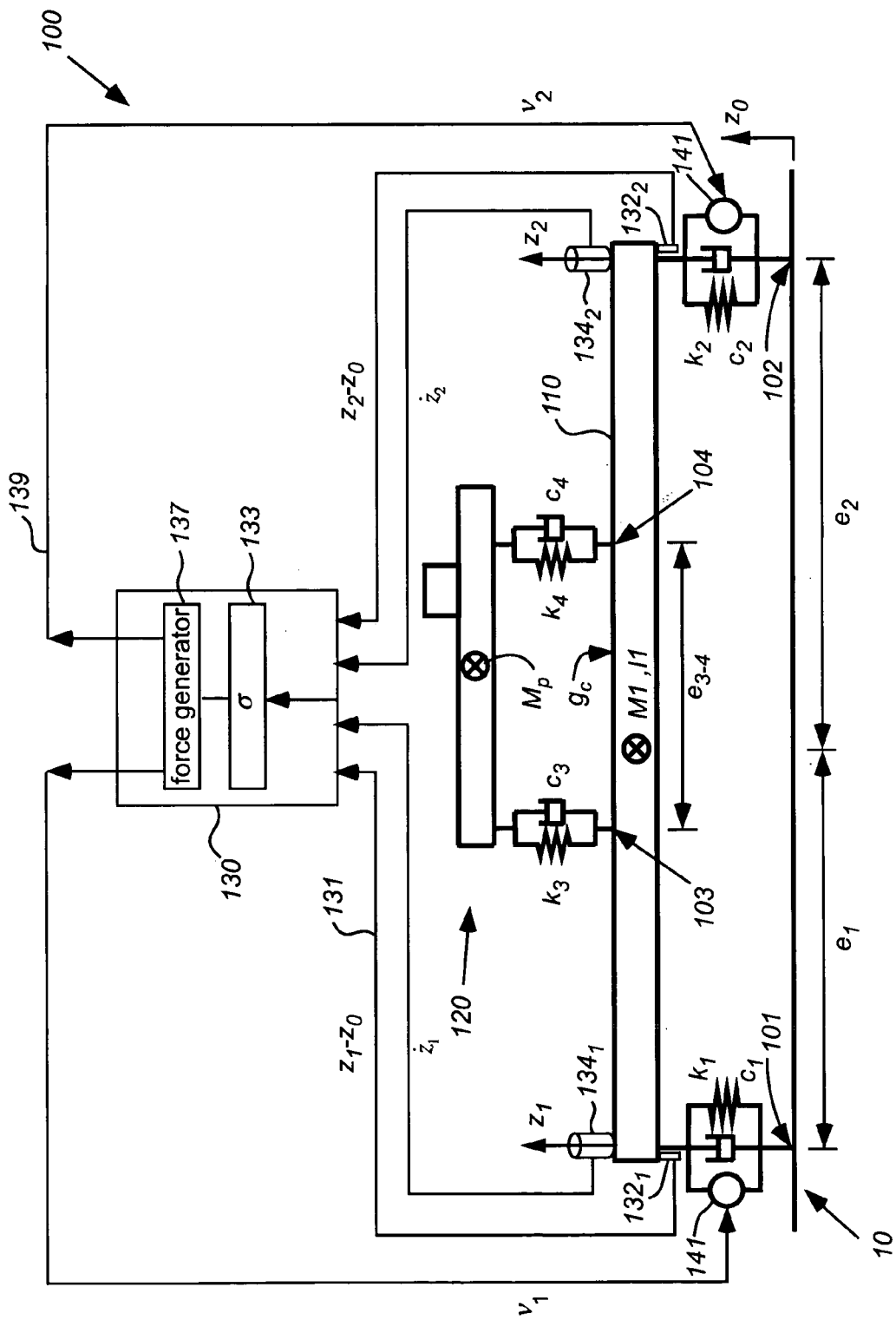
FIG. 1 is a schematic representation of a multi-Degree of Freedom (DOF) active isolation system of an invention hereof.

FIG. 1 shows a typical configuration of a multi-DOF isolation system 100. A two-DOF system is shown, but the system can also handle six-DOF and more. A multi-DOF isolation table 110 is supported on the floor 10 by springs $k_1$, $k_2$ and dampers $c_1$, $c_2$. The isolation table 110 supports other stages 220 (passive or active), or payload. Springs $k_3$, $k_4$ and dampers $c_3$, $c_4$ connect the upper stages to the isolation table 110. Sensors $132_1$ and $132_2$, for instance gap sensors, measure the displacements $z_1-z_0$, $z_2-z_0$ relative to the floor 10. Other sensors $134_1$ and $134_2$, such as geophone, measure the absolute velocities $\dot{z}_1$, $\dot{z}_2$ of the table 110. (A geophone sensor produces a signal proportional to the absolute velocity above its natural frequency.) Control forces $v_1$, $v_2$ can be generated by any appropriate of a variety of actuators 141, 142, such as linear voice-coil motor, pneumatic or hydraulic actuators, or piezoelectric stacks. For many applications, it is beneficial for the control to attenuate vibration of the floor 10 excitation $z_0$ under uncertain disturbances from the upper stages and payload. That desired performance is explored here in detail. The floor excitation $z_0$ may be uniform at each actuator location, or it may be different at each actuator location (and, in fact, $z_0$ may be a vector with an entry for each actuator location). The performances of isolation systems, such as, precision machine tools (E. I. Rivin), gravitational wave detectors (S. J. Richman, J. A. Giame, D. B. Newell, R. T. Stebbins, P. L. Bender, and J. E. Faller), and microgravity experiments (Y. P. Wang and A. Sinha), are often specified in the frequency domain.

Modal Decomposition

The mass, stiffness and damping properties of the isolation system can be obtained from mechanical design, and an analytical or finite-element model can theoretically be constructed. However, in practice it is hard to model the dynamics of the system accurately (even for the first stage) because of the uncertainties on the joints, contacts, damping, flexural modes, and payload. It is well-known that a mathematical model often doesn't match experimental measurements and can't be used in MIMO controller design with confidence. Bode/Nyquist-based approaches have been extended to MIMO system in part (see Hung and MacFarlane (Y. S. Hung and A. G. J. MacFarlane), but the results are not convenient for use in controller synthesis. A great deal of efforts has been invested in model development, such as system identification from experimental observation (L. Ljung), and model updating (J. E. Mottershead and M. I. Friswell) which tries to correct the finite element models using the test data. After the 1960's, experimental modal analysis (D. J. Ewins) has been developed as an important and powerful tool in structural dynamics. In the following, modal testing techniques are used to identify the modal frequency, damping, and mode shapes for the isolation system, which are then used in the control design.

The governing expression of the n-DOF isolation table with n force actuators takes the form $$M\ddot{z}+C(\dot{z}-\dot{z}_0)+K(z-z_0)=B_v v+f_d \quad (1)$$

where M, C and K are, respectively, the mass, damping, and stiffness matrices of dimension n×n, $B_V$ is an n×n matrix taking into account the effect of actuator locations, $f_d$ is the vector of disturbance forces acting on the isolation table 110, such as external forces or dynamics of the upper stages and payload 120, and $z_0$ is the vector of floor displacements. v is a vector of control force, generated by the actuators.

Since the mass matrix M is non-singular, the expression (1) is equivalent to:

$$\ddot{z}+M^{-1}C(\dot{z}-\dot{z}_0)+M^{-1}K(z-z_0)=M^{-1}B_v v+M^{-1}f_d \quad (2)$$

The matrix $M^{-1}K$ usually can be written in the diagonalized form:

$$M^{-1}K=V\Lambda V^{-1} \quad (3)$$

where $\Lambda$ is a diagonal matrix composed of $\omega_i^2$, i=1, 2, ... n, $\omega_i$, is the undamped modal frequency, and the matrix V is composed of the mode shape vectors.

If the following transformation, shown in Eq. 4, is applied to Eq. 2:

$$x=V^{-1}z \text{ and } u=V^{-1}M^{-1}B_v v=W^{-1}v \quad (4)$$

then, with control force vector u in modal coordinates, we have $$\ddot{x}+V^{-1}M^{-1}CV(\dot{x}-\dot{x}_0)+\Lambda(x-x_0)=u+V^{-1}M^{-1}f_d \quad (5)$$

where $V^{-1}M^{-1}CV$ is diagonal in the case of proportional damping $C=\alpha M+\beta K$. The $i^{th}$ diagonal item of $V^{-1}M^{-1}CV$ is $2\zeta_i\omega_i$, where $\zeta_i$ is called the modal damping ratio. The $ir^{th}$ off-diagonal entry is designated as $\epsilon_{ir}$, and $i^{th}$ element of vector $V^{-1}M^{-1}f_d$ as $d_i$. $W^{-1}$ is the inverse of the mode participation matrix W. Then, Eq. 5 can be rewritten as:

$$\ddot{x}_i+2\zeta_i\omega_i(\dot{x}_i-\dot{x}_{0i})+\omega_i^2(x_i-x_{0i})=u_i+d_i-\sum_{r=1,r\neq i}^{n}\epsilon_{ir}(\dot{x}_r-\dot{x}_{0r}), \quad (6)$$

$$i=1, 2, \ldots n$$

The matrices V and W can be determined by modal testing, and need not be known a priori.

Experimental Modal Analysis

By using the modal transformation of Eq. 4, the governing Eq. 1 of 2n order has been decomposed into n second-order systems in modal coordinates. There are two advantages of such a modal decomposition. The first is that a MIMO control of high order system has been changed into lower order SISO problems, which can be handled more easily.

These lower-order SISO problems also have clear physical meanings: one can design each loop to control the individual mode. Another advantage is that the mode shape and participation matrices V and W, respectively, used in the decomposition, and the parameters $\zeta_i$ and $\omega_i$ can be obtained from experimental modal testing. In modal testing (D. J. Ewins) the matrix $B_v$ is usually taken as identity. The idea for a general case of $B_v$ is similar.

It is an invention hereof to use data acquired from modal testing to establish matrices V and W as above and then to modally decompose the system using matrices V and W having known entries, rather than trying to analyze the normal coordinate system and determine entries of the C, M and K matrices.

First, proportional damping is assumed. From Eq. 1 and Eq. 4, one obtains the forced response from $v(j\omega)$ to $z(j\omega)$ (without $z_0$ and $f_d$) as $$[\ddots \omega_i^2 + 2j\zeta_i\omega^2\omega_i - \omega^2 \ddots]V^{-1}z(j\omega) = V^{-1}M^{-1}B_v v(j\omega) \quad (7)$$

$$= W^{-1}v(j\omega) \quad (8)$$

where $[\ddots]$ indicates a diagonal matrix. That is, the frequency response function (FRF) matrix $v(j\omega)$ to $z(j\omega)$, takes the form $$H(j\omega) = V[\ddots \omega_i^2 + 2j\zeta_i\omega^2\omega_i - \omega^2 \ddots]^{-1}W^{-1} \quad (9)$$

$$= \sum_{i=1}^{n} \frac{V_i W_i^T}{\omega_i^2 + 2j\zeta_i\omega^2\omega_i - \omega^2}$$

where $V_i$ is the $i^{th}$ mode shape ($i^{th}$ column of V), and $W_i$ is the $i^{th}$ column of $W^{-1}$, which represents the contribution of input $v_i$ to the responses. (Therefore, W is called the mode participation matrix.)

Eq. 9 is a central relationship upon which modal testing techniques are based. Using modal testing devices, or directly using the actuators and sensors of the isolation system, one can measure the FRF matrix $H(j\omega)$. Then, one can use curve fitting to extract the mode shape vectors $V_i$, modal participation vectors $W_i$, modal frequencies $\omega_i$, and modal damping $\zeta_i$. From Eq. 9 one sees that the residue matrix $V_i W_i^T$ at each mode is a rank-one matrix. Therefore, theoretically all the modal parameters can be extracted from any column and any row of the FRF matrix. Specifically, if all the actuators and sensors are of collocated pairs, the FRF matrix will be symmetric, and W can be taken as V. (Because of scaling effects, $W^{-1}$ V might not be the identity matrix, but $W^{-1}$ V is diagonal). Multi-input multi-output modal analysis has also been proposed for large-scale structures in case some mode cannot be excited or observed. Between 1980 and 2004, different time-domain and frequency domain fitting methods have been developed, and software packages are also available, such as MODENT Suite™ available from ICATS Company of London, UK and STAR System™ available from Spectral Dynamics, Inc. of San Jose, Calif. Any appropriate time-domain or frequency domain fitting methods may be used as part of inventions hereof.

Proportional damping is a good approximation for most engineering structures which are lightly damped. For non-proportional damping, similar relationships as Eq. 9 exist, but the mode shapes are generally complex-value vectors. The undamped eigenvectors are not the damped eigenvector, since the nonproportionally-damped modes are not simply in the pattern of in-phase and out-of-phase.

In the foregoing analysis, it is assumed that number of actuators and number of measurements is equal to the number of degrees of freedom of the system. This is what is known as a complete modal model, which is convenient for theoretical study. In structure control, one might only be concerned with the first m modes by using m actuators and sensors. For an incomplete modal model, the foregoing procedure is still valid, by replacing the inverse of modal shape matrix V and modal participation matrix W in the transformation of Eq. 4, with the pseudo-inverse of size m×n. But some attention should be paid to the effect of performance-reducing control spillover and destabilizing observation spillover (see, e.g., (D. Inman), (M. Balas).

Other than by experimental modal analysis, the decomposition matrices may also be obtained by any other appropriate means, such as from the measured frequency response function matrix by using an optimal decoupling procedure developed in (D. Vaes, W. Souverijns, J. DeCupyper, J. Swevers, and P. Sas) based on Owens' theory of dyadic systems (D. Owens).

Sliding Control for Frequency-Domain Performance

Figure 2:
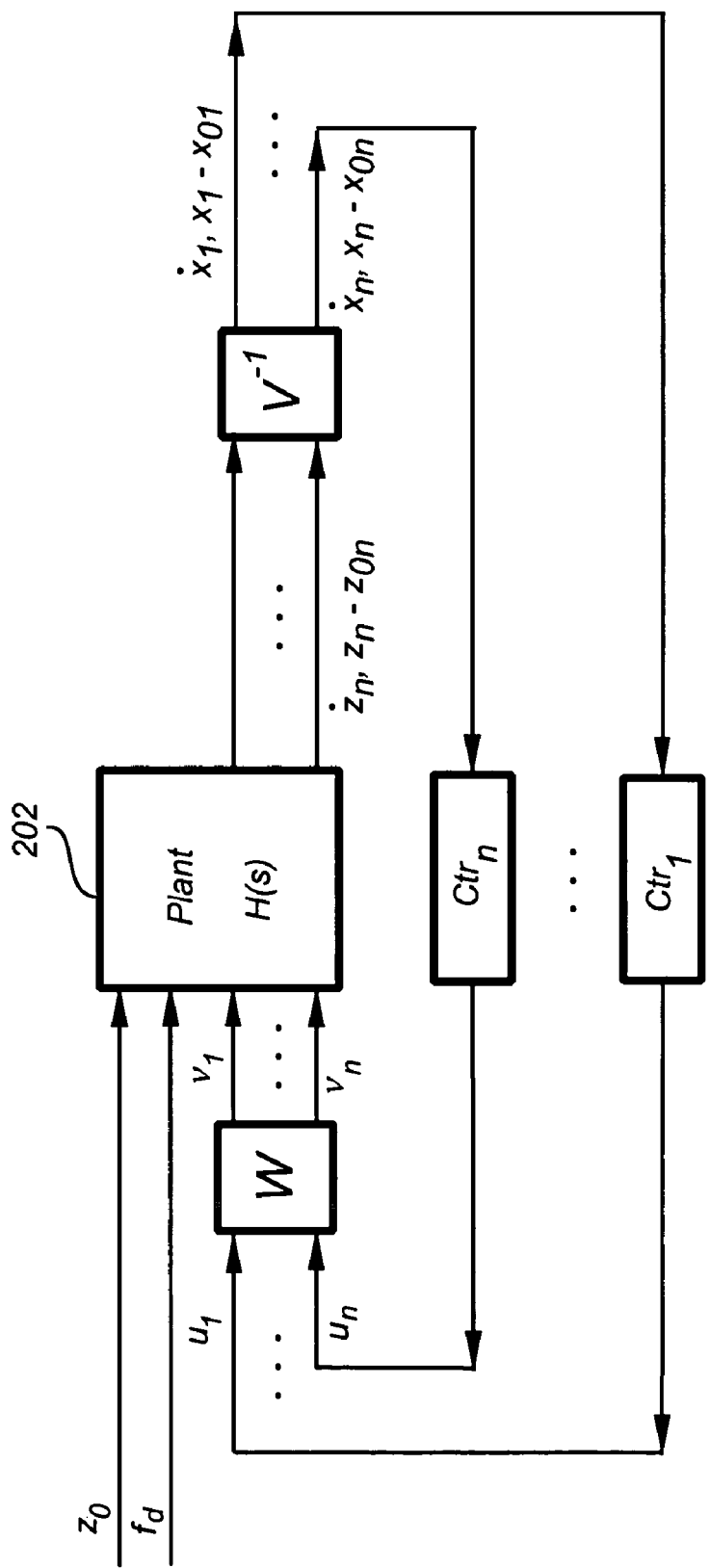
FIG. 2 is a schematic representation in block diagram of modal control of a multi-DOF system.

With the modal transformation of Eq. 4 discussed above, one can transform a MIMO high-order isolation problem into second-order SISO control, and all the parameters $\omega_i$, $\zeta_i$, V, and W used in the modelling and decomposition can be obtained from experimental or theoretical modal analysis. FIG. 2 shows a plant 202, which is subject to inputs $z_0$ and $f_d$, as described, and generates outputs $\dot{z}_m$, $z_n - z_{0n}$. These are transformed by application of the matrix $V^{-1}$ into n sets of modal coordinates $\dot{x}_1$, $x_1 - x_{01}$, etc., which are input to n individual SISO controllers $Ctr_1 \ldots Ctr_n$. Hence, one can design each SISO controller $Ctr_1 \ldots Ctr_n$ for the individual mode to achieve isolation performance. The outputs $u_1 \ldots u_n$ from the controllers are transformed by application of the matrix W, back into actuator parameters of the plant 202.

The governing Eq. 9 can be rewritten in modal coordinates as follows:

$$\ddot{x}_i + 2\zeta_i\omega_i(\dot{x}_i - \dot{x}_{0i}) + \omega_i^2(x_i - x_{0i}) = u_i + d_i - \sum_{r=1, r\neq i}^{n} \varepsilon_{ir}(\dot{x}_r - \dot{x}_{0r}), \quad (10)$$

$$i = 1, 2, \ldots n$$

One may find, however, that the modes are not completely decoupled, because of the coupling by non-proportional damping. Another concern is that there are uncertainties in the natural frequencies $\omega_i$ and damping $\zeta_i$, due to the modal testing error or time-varying of structures. Third, the system is subjected to payload disturbance or upper stage dynamics other than unknown base excitation. Sliding control is an important robust control techniques established for dealing with model uncertainties and external disturbance (J. J. E. Slotine and W. Li), (J. Y. Hung, W. Gao, and J. C. Hung), (K. D. Young, V. I. Utkin, and U. Ozguner).

Sliding control is based on an idea of transforming an original control problem into one of using actuators to drive system trajectories onto a specific manifold in a state space. In essence, it replaces a possibly high-order problem by a 1st order problem, that of controlling the distance from the system state to the manifold, so that the distance is zero, or as close thereto as the actuators can achieve. As a nonlinear control method, sliding control has been mainly used in tracking control problems (see e.g., (J. J. E. Slotine and W. Li)). For vibration isolation/suspension, however, the main concern is frequency domain performance. In this context, an idea (A. Alleyne and J. K. Hedrick), (C. Kim and P. I. Ro), (Y. P. Wang and A. Sinha) is to choose a so-called reference plant according to the performance requirement, then control the real plant to track the states or certain outputs of the reference plant. This, however, has three shortcomings.

One shortcoming is that it usually requires the measurement of ground vibration, which is not practical in many cases, such as vehicle suspension systems. Another shortcoming is the tradeoff of bandwidth: wide bandwidth decreases tracking error, but can increase control activity or chattering. The third shortcoming is that the performance during the transient stage can not be guaranteed.

In the following, rather than defining and tracking a reference model, the sliding surface is directly designed to meet the requirement of frequency-domain performance. This approach does not have the foregoing shortcomings of a reference-tracking schedule.

For the $i^{th}$ mode of the isolation system in second-order form (Eq. 10), the measured variables are often the states $x_i - x_{i0}$ and $\dot{x}_i$. (Actually, in the present example, $x_i - x_{i0}$ and $\dot{x}_i$ are in modal coordinates. Measurements are taken in normal non-modal coordinates, and then transformed to modal coordinates.) The conventional sliding variable $\sigma_i$ can be defined as a static intersection in the state space:

$$\sigma_i = \lambda_i (x_i - x_{i0}) + \dot{x}_i \qquad (11)$$

where $\lambda_i$ is a constant. Then on the sliding surface $\sigma_i = 0$, the system dynamics are $$\frac{x_i(s)}{x_{i0}(s)} = \frac{\lambda_i}{s + \lambda_i} \qquad (12)$$

where s is the Laplace operator. That is, the floor vibration is attenuated at −20 dB/Dec above the frequency $\lambda_i$. However, for the second-order plant expressed above in Eq. 10, such vibration attenuation −20 dB/Dec as a first order system, attained by using a conventional sliding control, might not be fast enough.

The inventors hereof have realized that, using a dynamic linear operator, $L_i(s)$ rather than a constant $\lambda_i$, provides unexpected advantages. $L_i(s)$ is a dynamic linear operator that is a function of s, the Laplace operator. (Below, a related novel technique is discussed where a dynamic non-linear operator is used.)

A dynamic sliding surface (which is a type of dynamic manifold), $\sigma_i$, can be defined, in general, as:

$$\sigma_i = L_i(s)(x_i - x_{i0}) + \dot{x}_i \qquad (13)$$

If the system states $(x_i - x_{i0})$ and $\dot{x}_i$ are driven by actuators to the particular sliding surface, $\sigma_i = 0$, then the dynamics become $$\frac{x_i(s)}{x_{i0}(s)} = \frac{L_i(s)}{s + L_i(s)} \qquad (14)$$

$L_i(s)$ can be chosen to achieve most, possibly any, dynamics that are desired. For example, one can take $L_i(s) = (b_1 s + b_0)/(s + a_0)$. Then Eq. 13 can be rewritten as $$\sigma_i = \frac{b_1 s + b_0}{s + a_0}(x_i - x_{i0}) + \dot{x}_i \qquad (15)$$

On this sliding surface, if the states are driven to $\sigma_i = 0$, the dynamics of Eq. 14 become $$\frac{x_i(s)}{x_{i0}(s)} = \frac{b_1 s + b_0}{s^2 + (a_0 + b_1)s + b_0} \qquad (16)$$

Thus, the second-order dynamics for the second-order plant described by Eq. 10 can be achieved by using the sliding surface described by Eq. 15 and driving the states to the surface at zero.

In fact, it is an aspect of an invention hereof that a sliding surface can be used to achieve $n^{th}$ order dynamics for a plant of order n or higher (and actually, also lower).

The idea of taking a sliding surface as a manifold defined by linear operators was proposed by Young and Ozguner (K. D. Young and U. Ozguner) but for the limited application of reducing the effect of unmodeled high-frequency dynamics in flexible manipulators. Therein, it has been interpreted as a low-pass filter and given the name frequency-shaped sliding surface. A similar strategy, called dynamic sliding mode, has also been proposed by Chan and Gao (S. Chan and W. Gao) and Yao and Tomizuka (B. Yao and M. Tomizuka) but for the limited application of robot manipulator control.

In the following, a physical interpretation of the frequency-shaped sliding surface is provided, as applied to vibration isolation.

Physical Interpretation: Skyhook

Assuming $b_1 = 0$ in the frequency-shaped sliding surface expressed by Eq. 16, then the ideal dynamics (on the sliding surface) are $$\frac{x_i(s)}{x_{i0}(s)} = \frac{b_0}{s^2 + a_0 s + b_0} \qquad (17)$$

The mechanical system corresponding to this transmission is shown in FIG. 3A. A unit mass 310a is supported above a vibrating base or floor 11 via a spring 330a of stiffness $b_0$ and is also connected to an inertial sky 350, above, via a dashpot 340 of damping coefficient $a_0$. This is exactly the skyhook damping suggested by Karnopp (D. Karnopp, M. J. Crosby, and R. A. Harwood), (D. Karnopp), which is incorporated herein by reference.

Figure 3B:
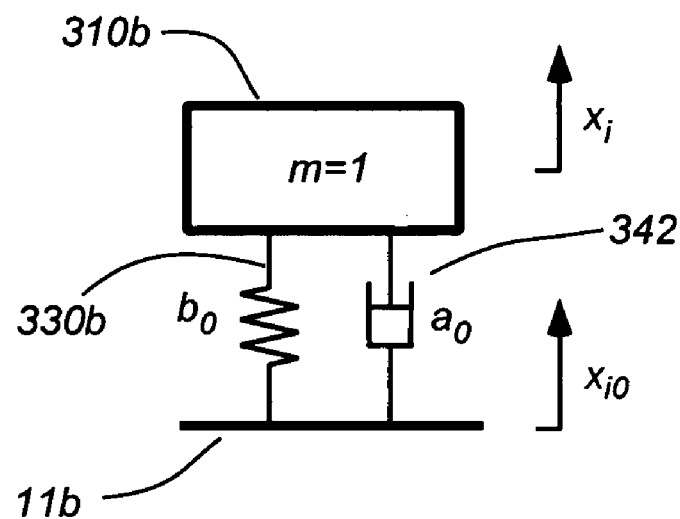
FIG. 3B is a schematic representation of a mass, damper, and spring arranged in a classical ground configuration.

As shown in FIG. 3B, usually a dashpot 342 can only connect to the base 11b, since there is no practical inertial sky 350. A spring 330b with spring constant $b_0$ also contributes to support the mass 310b. The corresponding (non-skyhook) transmission from $x_{i0}$ to $x_i$ as shown in FIG. 3B is $$\frac{x_i(s)}{x_{i0}(s)} = \frac{a_0 s + b_0}{s^2 + a_0 s + b_0} \qquad (18)$$

Figure 4:
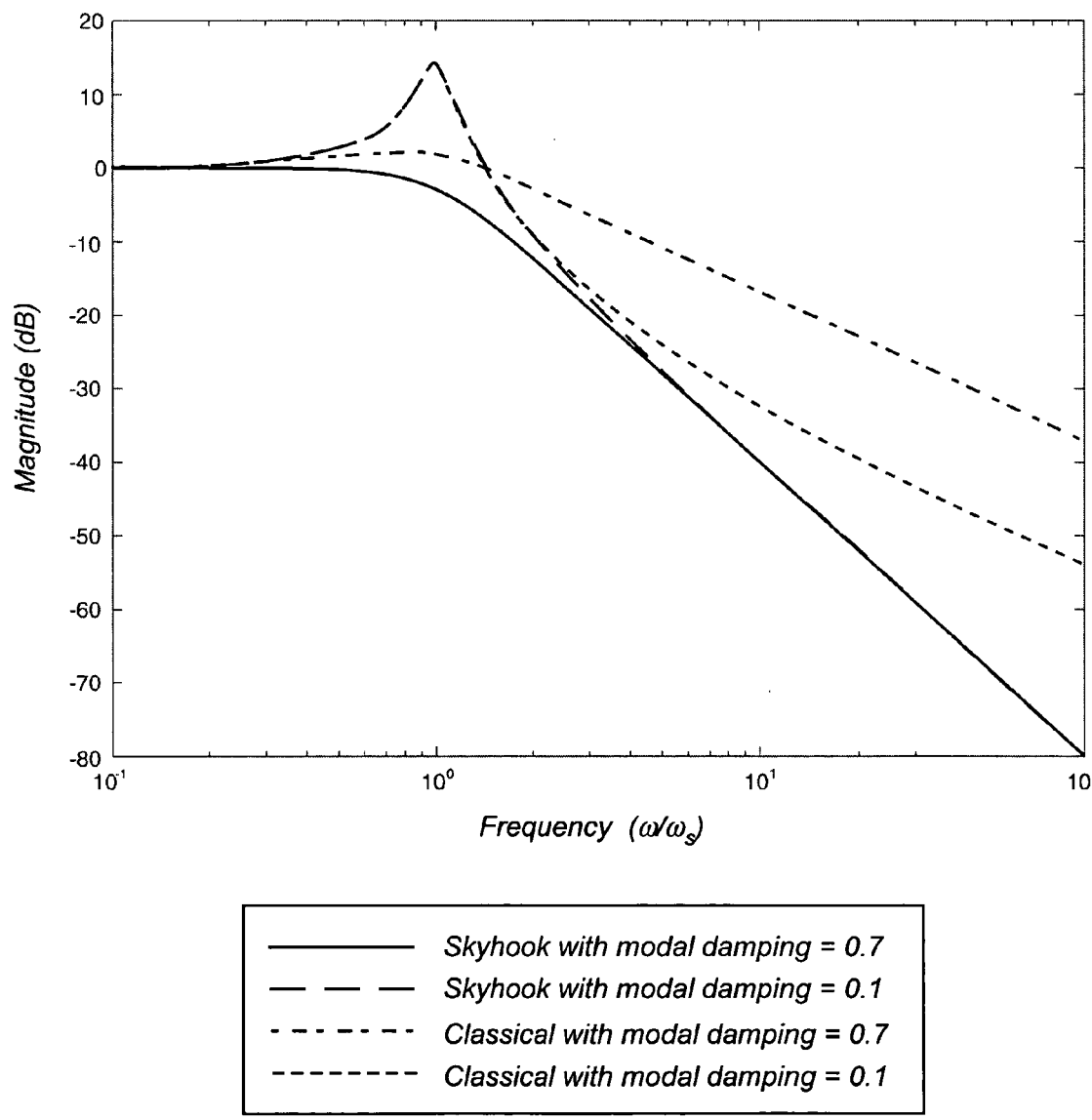
FIG. 4 is a graphical representation of vibration responses of two configurations ($a_0=2\zeta_s\omega_s$, $b_0=\omega_s^2$): skyhook with model damping=0.7 (solid); skyhook with modal damping=0.1 (dash); classical with modal damping=0.7 (dash-dot); classical with modal damping=0.1 (dot)

To highlight the advantage of skyhook damping yielded by the frequency-shaped sliding surface, FIG. 4 compares the vibration transmissions in the frequency domain for these two configurations shown in FIGS. 3A and 3B. Several matters are shown: first, there exist tradeoffs in the classical configuration between the high-frequency and low-frequency performances: larger damping yields smaller peak at resonance frequency but impairs the vibration attenuation at high frequency; second, there is no such conflict in the skyhook configuration; third, a skyhook configuration as shown in FIG. 3A is an ideal configuration for vibration isolation, much better than the classical configuration shown in FIG. 3B. The skyhook configuration also eliminates the tradeoff between rejection of disturbances directly acting at the payload and isolation from ground vibration. This is why a skyhook connected damper 340 has become an important concept in vibration isolation and has been an effective target in many isolation systems (A. Alleyne and J. K. Hedrick), (C. Kim and P. I. Ro), (M. Serrand and S. Elliott).

The choice of $L_i(s)=b_0/(s+a_0)$ yields an ideal skyhook effect, which is desireable for vibration isolation. Similarly, the frequency-shaped sliding surface can also be designed to achieve faster vibration attenuation in the frequency domain at the cost of high control authority (energy expenditure). Further, and significantly, virtually any desired system response $$\frac{x_i(s)}{x_{i0}(s)}$$

can be achieved by choosing an appropriate form of dynamic linear operator L(s). In general, inventions herein use any of a wide variety of dynamic linear operators.

A more general approach for selection of $L_i(s)$ is given below.

Switching Control for Vibration Isolation

It is demonstrated above that ideal vibration (or disturbance) isolation performance is achievable once the dynamics of the system is driven to the sliding surface $\sigma_i=0$. Below, a corresponding switching control law is derived, in a manner similar to as shown in J. J. E. Slotine (J. J. E. Slotine).

From the choice of sliding surface shown in Eq. 13, repeated here for convenience as Eq. 19

$$\sigma_i = L_i(s)(x_i - x_{i0}) + \dot{x}_i \qquad (19)$$

one obtains, by differentiating $$\dot{\sigma}_i = sL_i(s)(x_i - x_{i0}) + \ddot{x}_i \qquad (20)$$

Setting $\dot{\sigma}_i=0$, and combining with a plant model such as described by Eq. 10, by solving for and eliminating the second derivative $\ddot{x}_i$, one can obtain the best approximation $\hat{u}_i$ of the continuous control law that achieves $\dot{\sigma}_i=0$. That approximation is $$\hat{u}_i = [\hat{\omega}_i^2 - sL_i(s)](x_i - x_{i0}) + 2\hat{\zeta}_i\hat{\omega}_i(\dot{x}_i - \dot{x}_{i0}) + \qquad (21)$$
$$\sum_{r=1, r \neq i}^{n} \hat{\varepsilon}_{ir}(\dot{x}_r - \dot{x}_{0r}) - \hat{d}_i$$

where $\hat{\omega}_i$, $\hat{\zeta}_i$, $\hat{\varepsilon}_{ir}$ and $\hat{d}_i$ are respectively the estimations (nominal values) of the $i^{th}$ modal frequency, $i^{th}$ modal damping, $ir^{th}$ entry of the damping matrix, and the external disturbance on $i^{th}$ mode. Note that $\hat{\omega}_i$ and $\hat{\zeta}_i$ can be obtained from experimental modal analysis, $\hat{\varepsilon}_{ir}$ and $\hat{d}_i$ can be taken as zero.

To ensure the plant dynamics reach the sliding C surface in finite time despite the model uncertainties and external force, a discontinuous term is added to control force $u_i$:

$$u_i = \hat{u}_i - k_i sgn(\sigma_i) \qquad (22)$$

(To be clear, $sgn(\sigma_i)$ is used here to represent the sgn function, which is: +1 if $\sigma_i>0$; 0 if $\sigma_i=0$; and −1 if $\sigma_i<0$.) The sliding condition is the same as that in the standard sliding control (J. J. E. Slotine and W. Li)

$$\frac{1}{2}\frac{d}{dt}\sigma_i^2 \leq -\eta_i|\sigma_i| \qquad (23)$$

where $\eta_i$ is a constant scalar. To guarantee this condition, $k_i$ must be selected as large enough:

$$k_i = \eta_i + |\omega_i^2 - \hat{\omega}_i^2|_{max}|x_i - x_{i0}| + \qquad (24)$$
$$2|\zeta_i\omega_i - \hat{\zeta}_i\hat{\omega}_i|_{max}|\dot{x}_i - \dot{x}_{i0}| +$$
$$\sum_{r=1, r\neq i}^{n} |\varepsilon_{ir} - \hat{\varepsilon}_{ir}|_{max}|\dot{x}_r - \dot{x}_{0r}| + |d_i - \hat{d}_i|_{max}$$

where the maximum of $\omega_i$ and $\zeta_i$ can be obtained practically, and $\hat{\varepsilon}_{i_r}$ is generally less than or equal to the $i^{th}$ diagonal term $2\hat{\zeta}_i\hat{\omega}_i$ of the damping matrix. The maximum of $|d_i-\hat{d}_i|$ often cannot be obtained so directly in practice. To begin, $$d=V^{-1}M^{-1}f_d=V^{-1}M^{-1}VV^{-1}f_d=[\backslash 1/m_{ki}]V^{-1}f_d, \qquad (25)$$

where the modal mass $m_i$ can be obtained from experimental modal analysis. The maximum $f_d$ depends on the intensity of ground excitation and the properties of payloads or upper stages. An assumption is:

$$|f_{di}|=|f_{di}(t,\dot{z},z,\dot{z},\dot{z}_0,z_0)| \leq \Psi_{0i}(t)+\Psi_{1i}(t)\|[\dot{z}^T,(z-z_0)^T]^T\| \qquad (26)$$

where $\psi_{0i}$ and $\psi_{1i}$ are constants and i=1, 2, . . . n. Since usually there is some a priori knowledge about the intensity of ground excitation and the upper payloads, one can often estimate a constant upper bound as $\psi_{0i}$ and take $\psi_{1i}=0$. This requirement of a priori knowledge of disturbance upper bounds in sliding control may be relaxed by using disturbance observers (see, e.g., (N. Luo, J. Rodellar, D. De la Sen, and J. Vehi), (X. Chen, T. Fukuda, and K. Young)).

In isolation systems, the variables available are $z-z_0$, $\dot{z}$ and $\dot{z}_0$, which may be measured with displacement sensors and geophones. Hence $x-x_0$ and $\dot{x}-\dot{x}_0$ can be obtained for switching control and use in Eq. 13, Eq. 21, Eq. 22, and Eq. 24. And the controller force v can be constructed as v=Wu. In some cases, it is difficult to measure $\dot{z}_0$. In fact, it is only necessary to measure $\dot{z}$ and $z-z_0$. In cases where (for economic consideration) geophone sensors are not set on the ground, one can use $$\frac{s}{1+\tau_i s}(x_i - x_{i0})$$

as an estimation of $\dot{x}-\dot{x}_0$. Such an estimation will not create trouble in practice because the spectrum density of floor excitation is concentrated in low-frequency bandwidth (E. I. Rivin).

Many steps of the above derivation of the control force laws are somewhat specific for the plant described by Eq. 10. The steps shown are meant to be by example only, and not meant to be limiting.

Boundary Layer Analysis and Continuous Control

In sliding control, chattering is a main concern. Although frequency-shaped sliding control has the advantage of reducing the excitation of high-frequency, unmodeled dynamics, the robustness to chattering has only been implicitly addressed (K. D. Young, V. I. Utkin, and U. Ozguner). In the following, a smooth approximation of the switching control law is made, by choosing the proper boundary layer for σ around 0, in a manner similar to earlier work of an inventor (Slotine) hereof (J. J. E. Slotine).

A constant boundary layer thickness of $\phi_m$ can be considered. Outside the boundary layer the system dynamics are the same as for the switching control above. Inside the boundary layer $$\sigma_i(t)=L_i(s)(x_i-x_{i0})+\dot{x}_i=\Phi_i(t)\leq \Phi_m \tag{27}$$

Then $$x_i(t) = \frac{L_i(s)}{s+L_i(s)}x_{i0}(t) + \frac{1}{s+L_i(s)}\Phi_i(t) \tag{28}$$

Hence, after transients, the displacement error due to the boundary layer interpolation is bounded by $$|e_{x_i}(t)|_\Phi = \left|\int_0^t h(\tau)\Phi_i(t-\tau)d\tau\right| \leq \Phi_m \int_0^\infty |h(\tau)|d\tau = \Phi_m \|h(t)\|_1, \tag{29}$$

where h(t) is the impulse response of $$\frac{1}{s+L_i(s)}.$$

The notation $\| \|_1$ indicates the 1 norm of the system. (For a SISO, it is integration of the absolute value of the impulse response of the system.)

In particular, choosing $L_i(s)=b_o/(s+a_0)$ for the skyhook effect, inside the boundary layer, we have $$x_i(t) = \frac{b_0}{s^2+a_0 s+b_0}x_{0i}(t) + \frac{s+a_0}{s^2+a_0 s+b_0}\Phi_i(t) \tag{30}$$

In the immediately foregoing, it has been assumed that the absolute velocity of the platform (either modal or normal) can be measured perfectly. But in practice, the velocity measurement is only valid above some frequency. For a geophone sensor, the relation of measured signal $\hat{\dot{x}}_i$ and the velocity $\dot{x}_i$ generally takes the form $$\hat{\dot{x}}_i = \frac{s^2}{s^2+2\zeta_g\omega_g s+\omega_g^2}\dot{x}_i \tag{31}$$

where $\omega_g$ and $\zeta_g$ are the resonance frequency and damping ratio of the geophone sensor. Usually the damping ratio $\zeta_g$ of geophone sensor is close to the critical value 0.7. With the measurement $\hat{\dot{x}}_i$, the actual sliding surface for $L_i(s)=b_0/(s+a_0)$ becomes $$\hat{\sigma}_i = \frac{b_0}{s+a_0}(x_i-x_{i0}) + \hat{\dot{x}}_i \tag{32}$$

and the achieved dynamics from $x_{i0}$ to $x_i$ on the sliding surface $\hat{\sigma}_i=0$ becomes $$\frac{x_i(s)}{x_{i0}(s)} = \frac{b_0(s^2+2\zeta_g\omega_g s+\omega_g^2)}{s^4+a_0 s^3+b_0(s^2+2\zeta_g\omega_g s+\omega_g^2)} \tag{33}$$

Using the Routh-Hurwitz criterion, the stability of Eq. 33 is ensured if $$\frac{\omega_s}{\omega_g} > \frac{\zeta_s}{\zeta_g} + \frac{\zeta_g}{\zeta_s} \tag{34}$$

where $\omega_s$ and $\zeta_s$ are the resonance frequency and damping ratio of the ideal skyhook isolator. ($\omega_s=\sqrt{b_0}$, and $\zeta_s=a_0/2\sqrt{b_0}$.) If the damping ratio $\zeta_s$ of the ideal skyhook isolator is chosen as the critical value 0.7, close to $\zeta_g$, then the geophone resonance frequency should be smaller than half of the resonance frequency of the ideal skyhook isolator. If the geophone resonance is very low ($\omega_g/\omega_s<<1$), then the ideal skyhook effect can be closely attained.

By designing dynamic sliding surfaces, the skyhook effect can be directly achieved for each mode of vibration. The entire performance of a multi-mode system is a combination of the individual modes. Suppose that the target dynamics (for example, a skyhook) of the $i^{th}$ mode is $x_i(s)/x_{i0}(s)=T_{x_i/x_{i0}}(s)$. From the modal transformation expressed by Eq. 4, one finds that on the sliding surface the entire performance is $$z(s)=V[T_{x_i/x_{i0}}(s)]V^{-1}z_0(s) \tag{35}$$

Specifically as an example, if the target of each mode is chosen to be identical, $T_{x_i/x_{i0}}(s)=T_{x/x_0}(s)$, $i=1, 2 \ldots n$, then $z_i(s)=T_{x/x_0}(s)z_{i0}(s)$. If the isolation requirement is stated as a frequency-domain envelope in natural coordinates from $z_{i0}(s)$ to $z_i(s)$, the relation of Eq. 35 can be used to obtain the skyhook targets $T_{x_i/x_{i0}}(s)$ in modal coordinates.

In practice, identification errors also exist in the mode shape matrix V and participation matrix W. This yields mode coupling even in proportionally-damped systems. To explicitly take the effect of V and W errors into account in the framework of sliding control is challenging. Practically, one may check that the $WH(j\omega)V^{-1}$ is diagonally dominant before using matrices V and W in controller design. In addition, the effect of some modal coupling can be reduced implicitly by encompassing it as part of disturbance $d_i$.

Successful applications of experiment-based modal control have been reported, e.g., (H. Yoshioka, Y. Takahashi, K. Katayama, T. Imazawa, and N. Murai), (U. Stobener and L. Gaul), (MIT/Caltech LIGO Laboratory), yet the accurate identification of the modal shape matrix V and participation matrix W is still an important research topic.

The foregoing discussion has focused on using a single dynamic linear operator L(s) to define the frequency shaped sliding surface $\sigma_i$. However, it is also possible to introduce a second dynamic linear operator $Q_i(s)$, and to apply it to operate on the state of displacement $\dot{x}_i$, as for instance $$\sigma_i = L_i(s)(x_i - x_0) + Q_i(s)\dot{x}_i \quad (35A)$$

Further, although it is not necessary to measure ground velocity $\dot{x}_0$, if such measurement is made, a third dynamic linear operator $G_i(s)$ can be applied, as for instance $$\sigma_i = L_i(s)(x_i - x_0) + Q_i(s)\dot{x}_i + G_i(s)\dot{x}_{0i}, \quad (35B)$$

to provide even more flexibility in designing $\sigma_i$.

Further, the foregoing has used as states the parameters $x_i - x_{i0}$ and $\dot{x}_i$. The dynamic manifold $\sigma_i$ is a function of the states of the system and one or more dynamic linear operators, which operate on at least one of the states. The parameters chosen for states are but an example. As is well known, the state of a system can be defined by more than one set of parameters, any one of which sets can properly constitute the states of the system. As used herein, states means this general definition, and is not limited to the states of $x_i - x_{i0}$ (relative displacement) and $\dot{x}_i$ (velocity).

A general process for designing a robust controller using a frequency shaped sliding surface will be discussed with reference to FIG. 21, which is a schematic flowchart of steps a designer would take. This method is applicable to any second order system that can be described by a second order equation in an output, such as x, and an excitation input, such as $x_0$, of which Eq. 10 is a general form.

The method is also applicable to any multi-DOF plant that can be decomposed into a plurality of modal plants, each defined by a second order equation. For such a method, Eq. 10 represents a single mode, which has been derived from decomposing a multi-modal system.

Further, the method is equally applicable to a single DOF plant.

The process begins 2100. Two somewhat independent pathways are followed initially and are thus shown in parallel. Along one pathway, the initial substantive step is to determine 2102 the governing equations for the plant, for example, as Eq. 1 above. A multi-DOF plant is discussed first, because that is more general. The steps for designing a controller for a single mode plant are a subset of those for designing a controller for a multi-DOF plant, and will be discussed below. The multi-DOF plant has n actuators and n DOF. The matrices V and W are pre-determined 2104, as discussed above. This can be done using either modal testing, theoretical modal analysis, or any other appropriate means. The multi-DOF plant is decomposed 2104, using any appropriate technique, into a plurality n of modal plants, of which an ith plant will be considered as representative. Analogous steps are carried out for the $1^{st}, 2^{nd}, \ldots n^{th}$ modal plants. A result of modal decomposition is determination of modal frequencies $\omega$ and damping $\zeta$.

Using the matrices V and W, one can identify 2108 a SISO plant in modal coordinates, for instance as represented by Eq. 10 above.

Turning now to the other parallel pathway, performance requirements exist 2110, such as vibration isolation from specific frequencies, or from certain frequency ranges (e.g. high or low) or some other performance. Typically, the performance requirements are specified by a user, or dictates of a larger system of which the plant is a part. They may be described in words, or by other means. Target dynamics that correspond to the performance requirements are determined 2112, by the designer to match as closely as possible the performance requirements. For instance, as represented by mathematical equations or a curve on a graph such as is shown at FIG. 4, (solid or dash) describing a skyhook damper isolation. The frequency response shown for the skyhook in FIG. 4 is suitable to achieve performance requirements of vibration isolation. If the plant is to perform to different requirements, then a different frequency response may be appropriate and the corresponding target dynamics can be obtained. The frequency response might also be specified by a user or customer or determined by other means.

Step 2114 is to design a sliding surface $\sigma_i$ in terms of at least one dynamic linear operator $L_i(s)$, that is a function of s, which operates upon at least one of: the difference between the output and the excitation; and the derivative of the output, such as shown at Eq. 13 above, $\sigma_i = L_i(s)(x-x_0) + \dot{x}$. (If the plant is not a modal plant, but is complete in itself, then all of these steps are performed, but the modal aspect is not present.) The sliding surface is chosen such that if $\sigma_i = 0$, the plant will behave according to the target dynamics, as explained above.

This pathway is not fully independent of the other pathway, because it is necessary to know some minimal information about the plant to design $\sigma$. For instance, the order of the plant must be known.

The step of designing the sliding surface can be conducted according to any one of several different techniques 2114a–2114e. Some possible techniques for designing an appropriate sliding surface include, but are not limited to: pole/zero assignment 2114a; feedback/feedforward analysis 2114b (FIG. 14, FIG. 16); fractional transform and modern control 2114c (FIG. 15); non-linear contraction theory 2114d (Eq. 41, Eq. 42, below); or any other appropriate technique 2114e. A substep of designing a sliding surface 2114 according to one of the techniques mentioned (2114a–2114e) is designing a dynamic linear operator $L_i(s)$, also chosen so that if $\sigma_i = 0$, the target performance is obtained.

A modal control force $u_i$ is determined 2116 by combining the modal plant in modal coordinates from the step 2108 of the first described pathway and $\sigma_i$ from step 2114 of the second described pathway. The combination can be any appropriate set of steps that results in a control force law, such as at Eq. 21), that relates the force, $u_i$ to the states, $x_1 - x_{0i}, \dot{x}_i$.

This results in a modal force law for each of n modes. These modal force laws are combined 2118 to form an actuator force vector v having n entries, one for each actuator. The process ends 2120, as the non-modal control force controller has been successfully designed.

As has been mentioned, the process shown in FIG. 21 illustrates designing a controller for a multi-DOF plant, by decomposing 2104 into n modal plants. It also illustrates designing a controller for controlling a single mode plant. That process is identical to the portion of the process shown in FIG. 21 for a single mode plant, including steps 2108 (determine the plant governing equations; 2110, understand performance requirements; 2112, determine corresponding target dynamics; 2114, design a sliding surface (With any appropriate variation 2114*a–e*); and 2116, determine control force law.

Eq. 21 is a reasonable control law. Thus, the process of designing a control law using a dynamic manifold is complete 2120. The designer can continue and refine the law, with a discontinuous term, as discussed above.

The steps of the process have been shown in the flowchart in a particular order. However, the order is not required. Some steps may be performed in a different order. Others may be combined, or eliminated in favor of equivalent sets of steps. Further, the step of designing a sliding surface $\sigma_i$ may also include additional dynamic linear operators such as G(s) and Q(s), applied to $\dot{x}_1$ and $\dot{x}_{0i}$, as discussed above.

For a multi DOF plant, it is not necessary to control every mode according to an invention hereof, or, even, at all. It may be beneficial to control one or more modes using a controller designed as disclosed herein, and to control another using a conventional controller, for instance a P-I-D controller. Further, it may be reasonable to have another mode uncontrolled, for instance one whose natural frequency is much higher than any expected excitation frequencies.

Experimental Simulation

In this section a 2DOF vibration isolator is taken as an example and demonstrates that a skyhook effect can be robustly achieved using modal decomposition and frequency-shaped sliding control.

As shown in FIG. 1, the 2DOF isolation table 110 used in simulation has mass 500 kg and rotational inertia 250 kg m². The distances $e_1$, $e_2$ from the center of mass of the table to mounting 101 and mounting 102 are 1.0 m and 1.4 m, respectively, and $k_1=k_2=3\times10^5$ N/m, $c_1=200$ N s/m, $c_2=120$ N s/m. Suppose modal frequencies $\omega_1$ as 5.4±0.1 Hz and $\omega_2$ as 9.5±0.1 Hz, are identified, as well as modal damping $2\zeta_1\omega_1$ as 0.7±0.2 and $2\zeta_2\omega_2$ as 1.7±0.3, and mode shape $$V = \begin{bmatrix} -1.0 & -0.6 \\ -0.6 & 1.0 \end{bmatrix}.$$

The maximum of off-diagonal damping in modal coordinates is taken as $(2\hat{\zeta}_1\hat{\omega}_1, 2\hat{\zeta}_2\hat{\omega}_2)=0.7$.

The dynamics of upper stages/payload may be unknown or changeable. As discussed above, their effect can be considered as a disturbance force vector $f_d$. It is reasonable to assume that the bound of $|f_d|$ could be obtained as $$|f_d| \leq \begin{bmatrix} 20 \\ 20 \end{bmatrix} + \begin{bmatrix} 2\times10^4 \\ 1\times10^4 \end{bmatrix}(|z_1|+|z_2|).$$

In this simulation, the upper stage/payload 120 is taken as a 2DOF system supported symmetrically on the isolation table 110 with a pair of spring-dashpots $k_3, c_3; k_4, c_4$, of 1500 N/m and 8 N s/m. Its mass is 125 kg (25% of the isolation table), and rotational inertia is 10 kg m². The distance $e_{3-4}$ between the spring-dashpot connections is 1.0 m, and the mass center $m_p$ of the upper stage is located directly above the geometric center $g_c$ of the isolation table 110.

Figure 5:
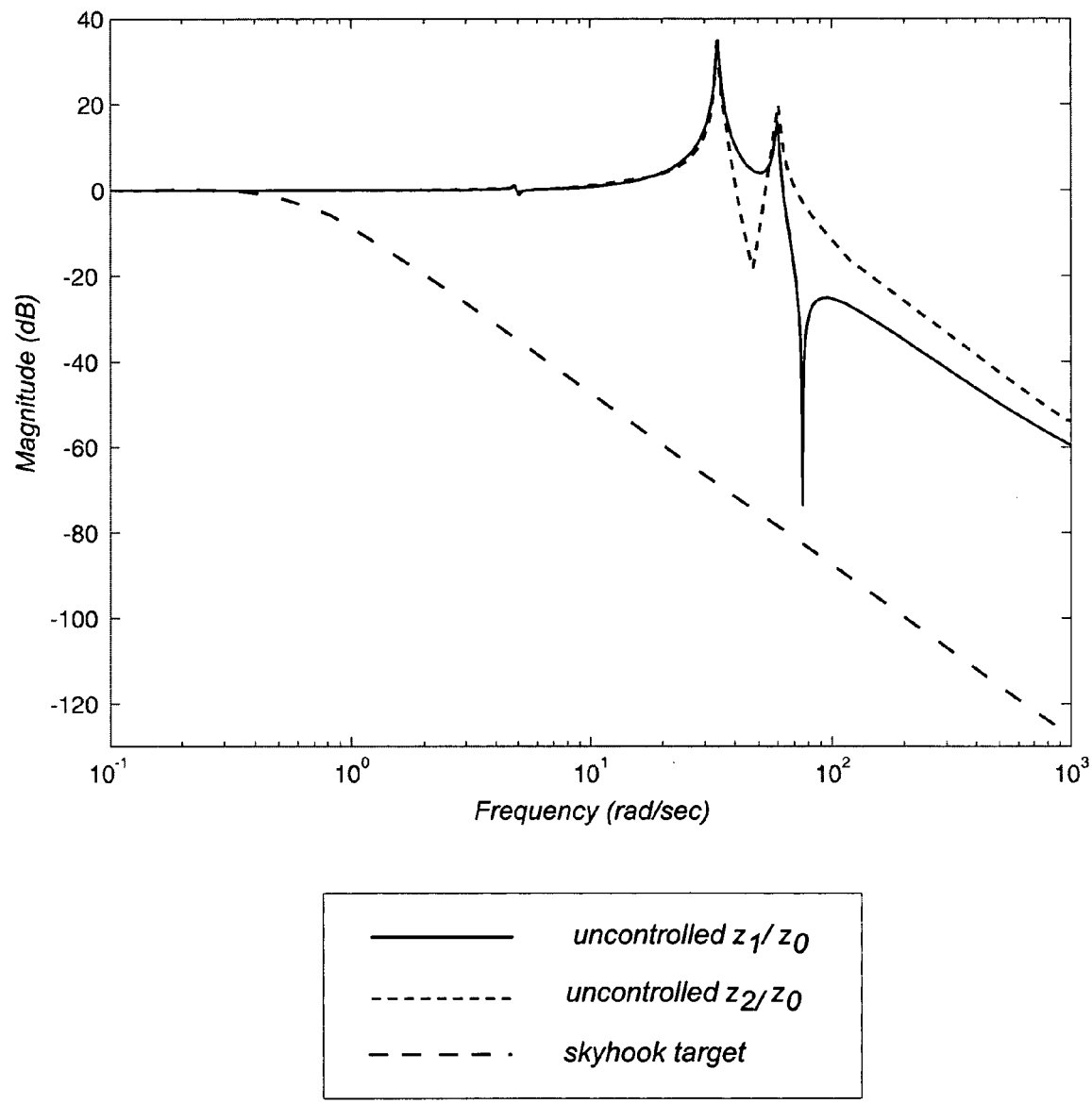
FIG. 5 is a graphical representation showing transmission of uncontrolled plant and target dynamics used in simulation: uncontrolled $z_1/z_0$ (solid); uncontrolled $z_2/z_0$ (dot); skyhook target (dash)

The target dynamics $z_1/z_0$ and $z_2/z_0$ are chosen as a skyhook of frequency 0.1 Hz and damping ratio 0.7. FIG. 5 shows the transmission from $z_0$ to $z_1$ and $z_0$ to $z_2$ of plant and the skyhook target. The resonant frequencies of the actual plant are 0.778, 1.378, 5.415, and 9.555 Hz. The uncontrolled $z_1/z_0$ is shown solid, uncontrolled $z_2/z_0$ is shown dotted, and skyhook target is shown dashed.

Figure 6:
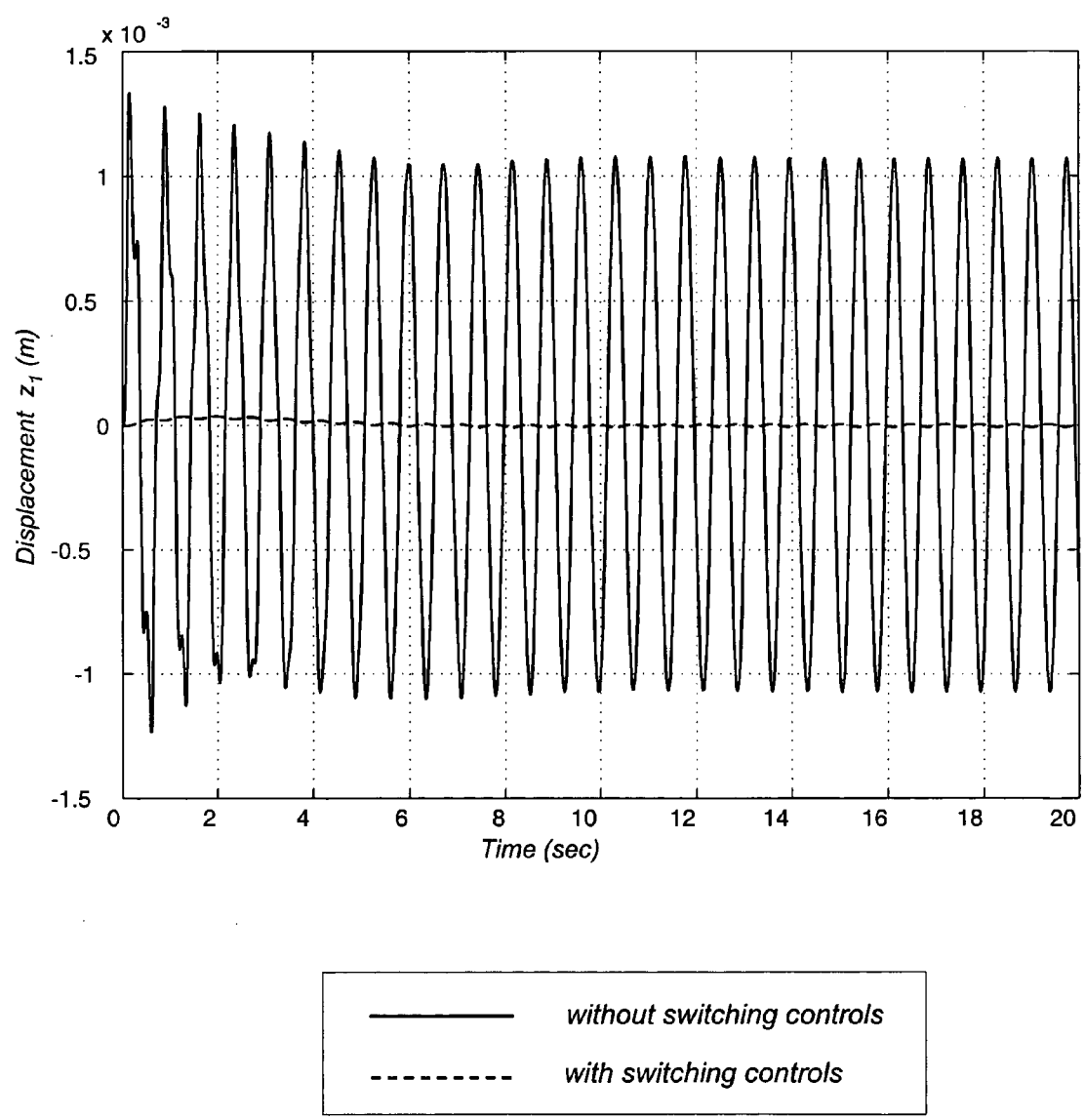
FIG. 6 is a graphical representation showing responses of $z_1(t)$: with switching control (dash); and without control (solid)

The controller can be designed using modal decomposition and a frequency-shaped sliding surface in which $\eta_1=\eta_2=0.2$. FIG. 6 shows the responses $z_1(t)$ of the system at zero initial conditions with (dashed) and without (solid) control under harmonic ground excitation ($z_0=0.001$ sin $(1.38\times2\pi t)$m), $t\geq0$. The response with control is very steady, while that without, fluctuates widely. Thus, the vibration of the isolation table is greatly attenuated.

FIGS. 7A, 7B and 7C show the responses of $z_1(t)$ (FIG. 7A) and $z_2(t)$ (FIG. 7B) with switching control, compared with the ideal outputs of a skyhook system (FIG. 7C) excited at resonant frequencies 1.38 Hz ($z_0=0.001$ sin($1.38\times2\pi t$)m). FIGS. 8A, 8B and 8C show corresponding responses excited at a resonant frequency of 9.55 Hz ($z_0=0.001$ sin($9.55\times2\pi t$) m).

Figure 9A:
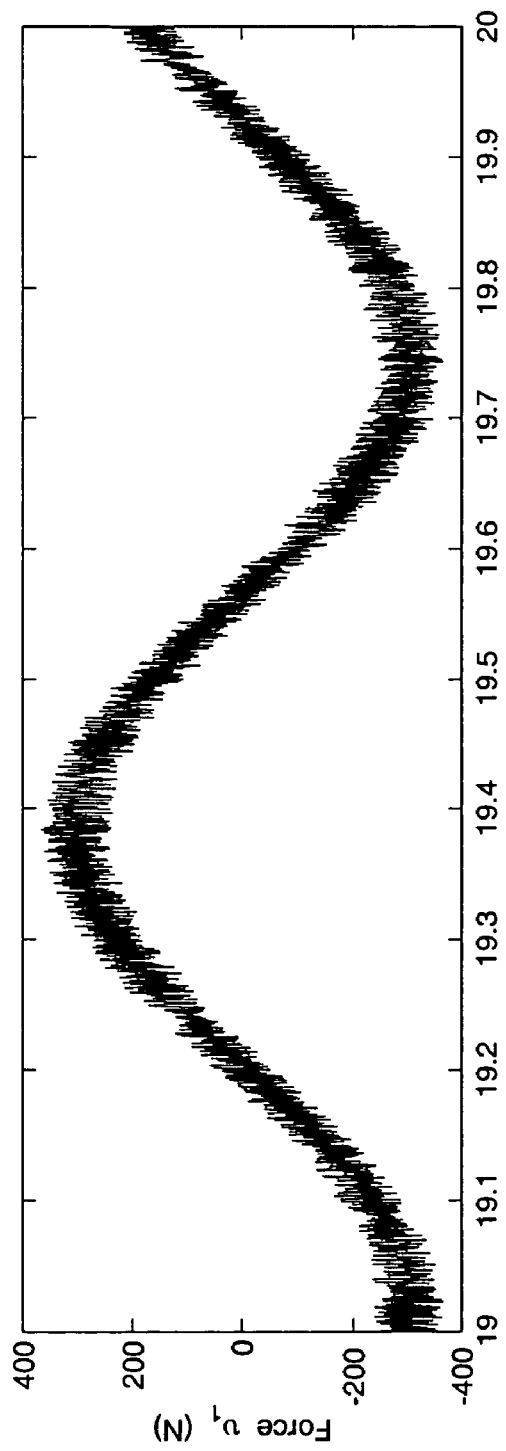
FIGS. 9A and 9B are graphical representations showing control forces $v_1$ and $v_2$, respectively, with switching control under ground excitation $z_0=0.001\sin(1.38\times2\pi t)$m.
Figure 9B:
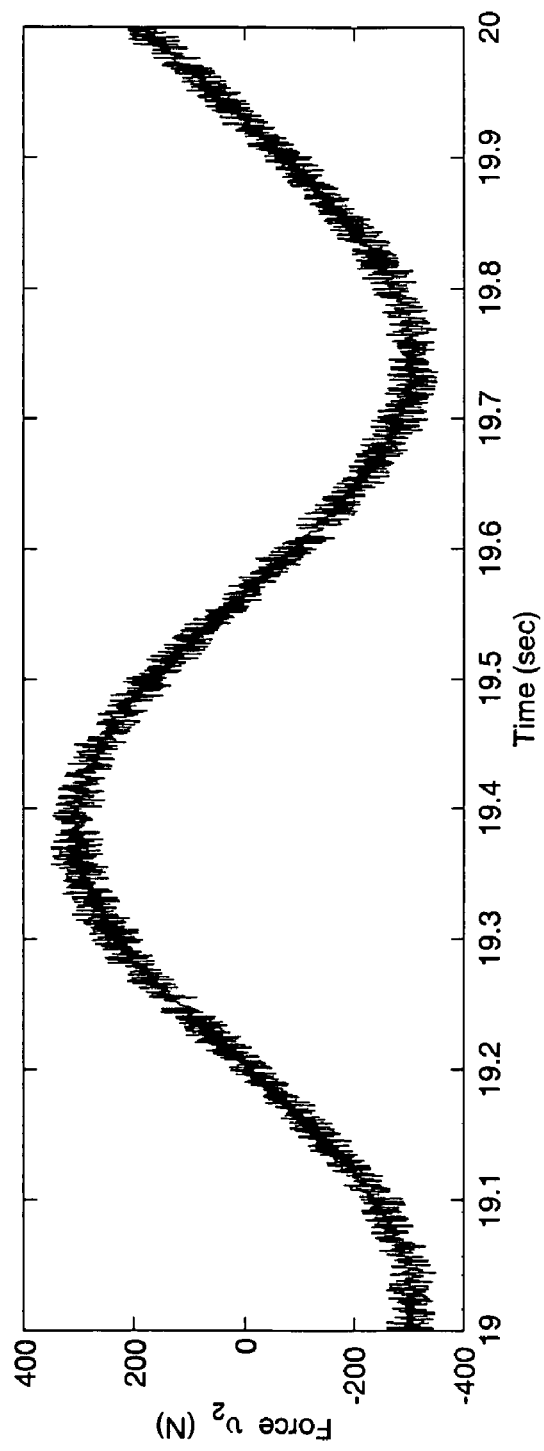

From these figures, it can be seen that the ideal skyhook effect is attained under the uncertainties and disturbance. The control forces $v_1$ and $v_2$ of switching control are shown in FIG. 9.

Figure 10A:
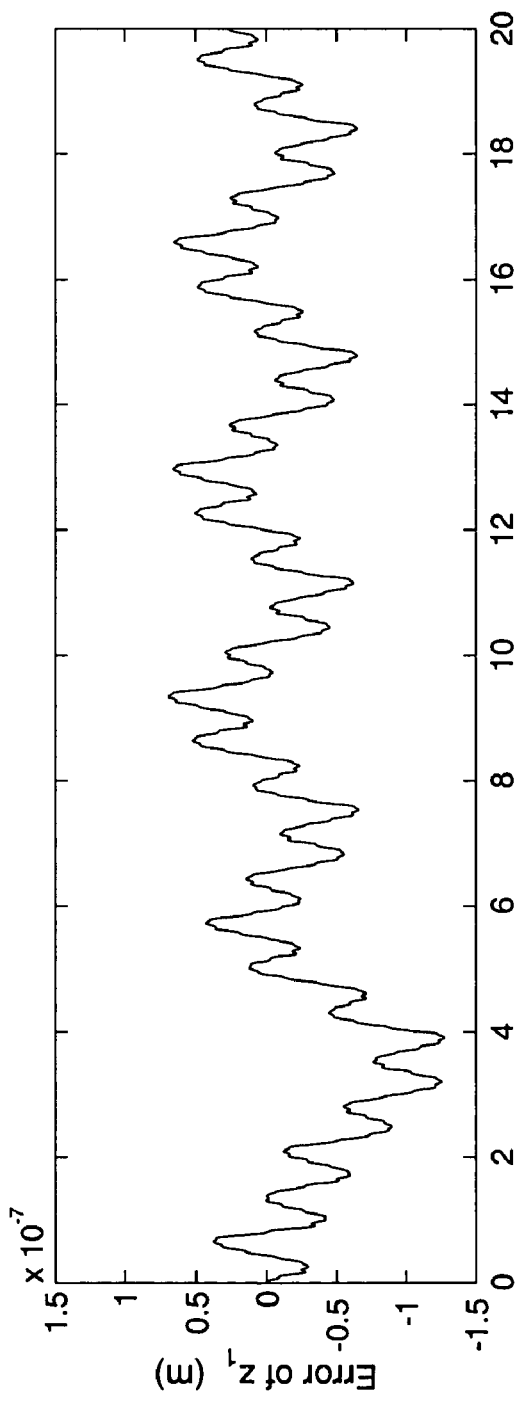
FIGS. 10A and 10B are graphical representations showing displacement errors $z_1$ and $z_2$, respectively, due to boundary layer under ground excitation $z_0=0.001\sin(1.38\times2\pi t)$m.
Figure 10B:
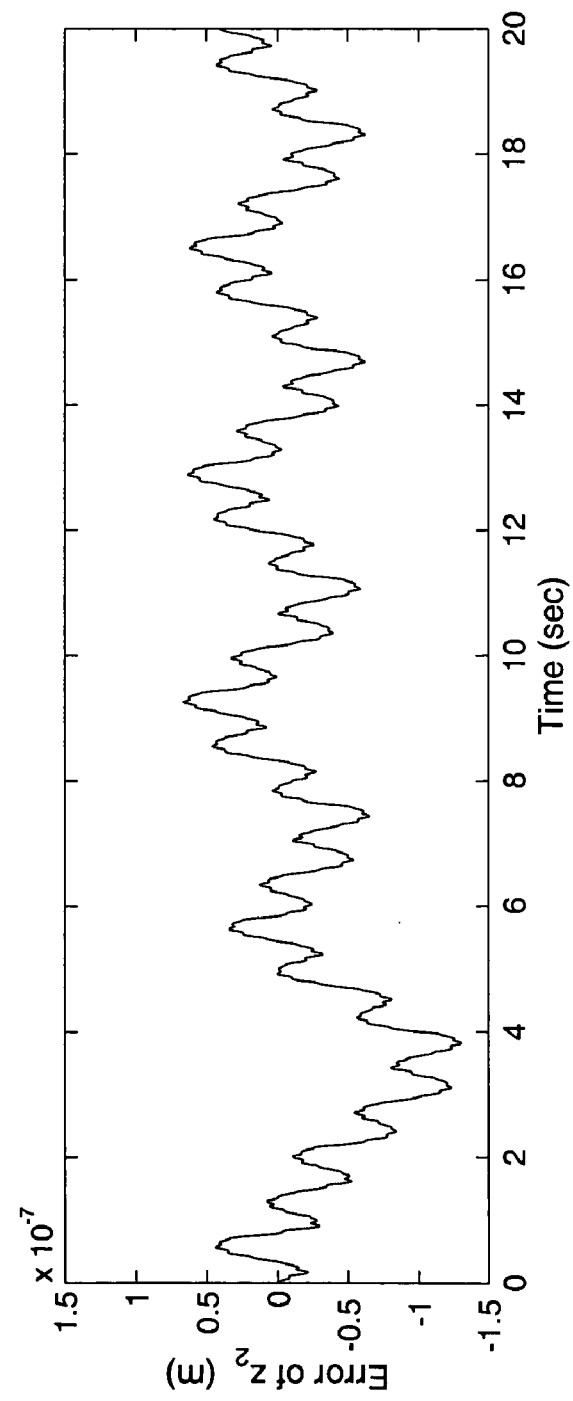

To reduce the chattering of control forces, the continuous control can be designed using the boundary layer as discussed above. The boundary thickness $\Phi_m$ can be taken as $5\times10^{-6}/\|h(t)\|_1$ (see Eq. 29) and replace sgn($\sigma_i$) in Eq. 22 with a saturation interpolation sat($\sigma_i/\Phi_m$). FIGS. 10A and 10B show the errors of the response $z_1(t)$ and $z_2(t)$, respectively, in comparison with an ideal output of a skyhook system.

The peak error due to a boundary layer is less than $\Phi_m\|h(t)\|_1=5$ μm. The continuous control forces $v_1$ and $v_2$ are shown in FIGS. 11A and 11B. Comparing FIGS. 11A and 11B to FIGS. 9A and 9B, respectively, it can be seen that chattering has been reduced.

Figure 13A:
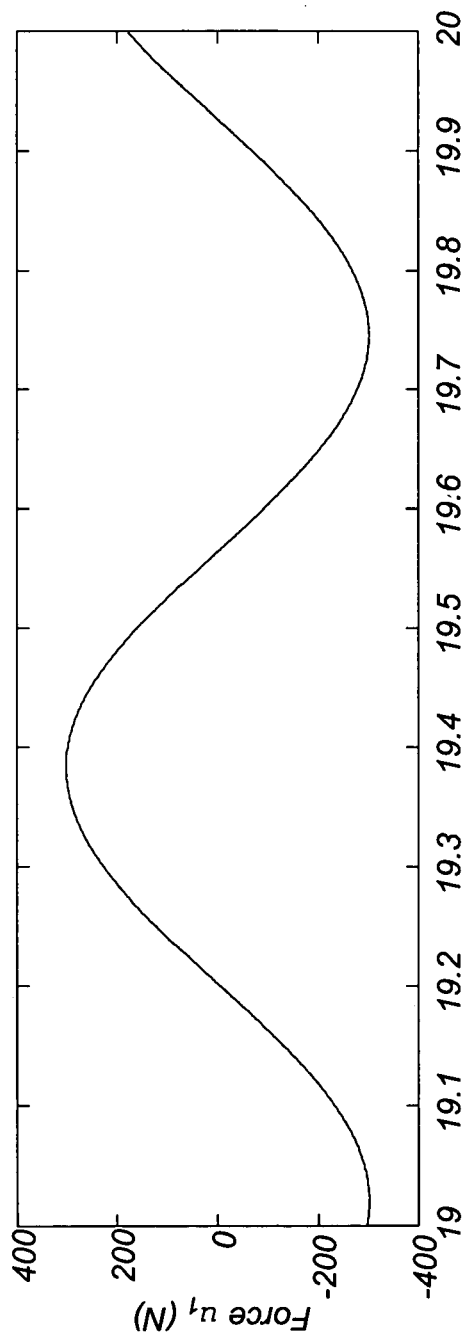
FIGS. 13A and 13B are graphical representations showing control forces $v_1$ and $v_2$, respectively, with a thicker boundary layer, under the same ground excitation $z_0=0.001\sin(1.38\times2\pi t)$m.
Figure 13B:
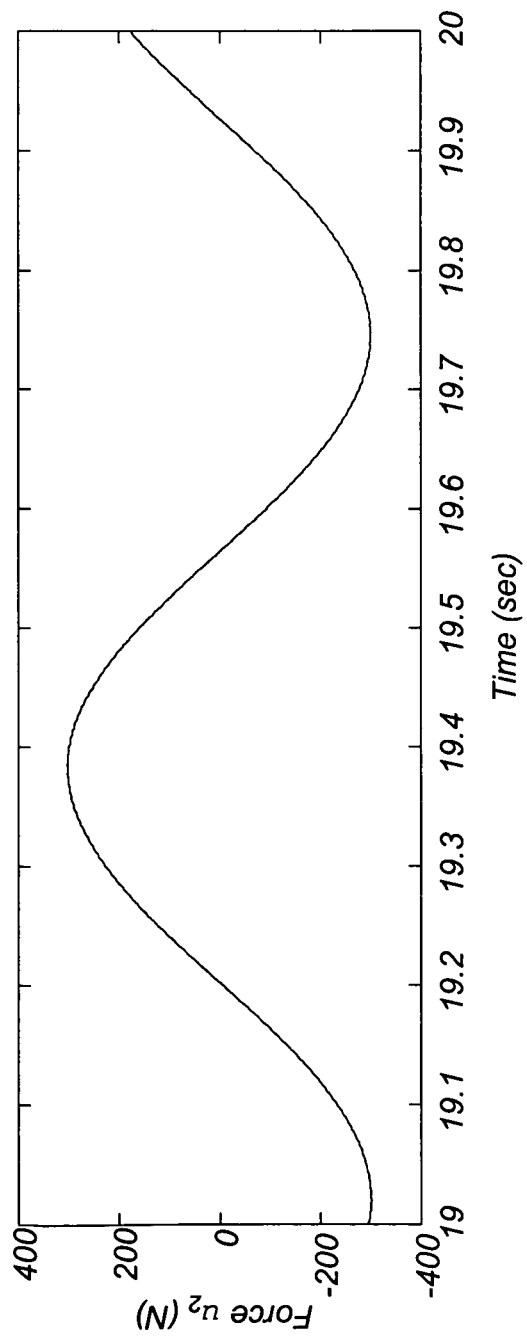

In FIGS. 10A, 10B and 11A, 11B the error due to boundary layer is one-order smaller than the expected values, and in FIGS. 11A and 11B, the control forces are still not very smooth. The reason is that the constant $k_i$ in $k_i$sat($\sigma_i/\Phi_m$) is over-estimated, such that the actual boundary layer is much thinner than the expected one. FIGS. 12A and 12B show the corresponding errors of displacements due to this boundary layer, by taking the boundary layer $\Phi_m$ as $1\times10^{-4}/\|h(t)\|_1$. FIGS. 13A and 13B show the corresponding control forces $v_1$ and $v_2$ under ground excitation $z_0=0.001$ sin($1.38\times2\pi t$)m. These control forces are much smoother than before.

Experimental simulation results depicted in FIGS. 7A, 7B, 7C and 8A, 8B and 8C, show that the controlled system approaches the skyhook target from the beginning. The displacement errors in FIGS. 10A and 10B and FIGS. 12A and 12B also show that there is no obvious transition stage. This is not by chance, for the following two reasons. First, the target dynamics is achieved once the system is driven to the sliding surface. While in the schedule of reference tracking (see (A. Alleyne and J. K. Hedrick), (C. Kim and P. I. Ro), (Y. P. Wang and A. Sinha)) there are still error dynamics (low-pass filter) between the controlled system and the target on the sliding surface. Second, the states in the frequency-shaped sliding surface (states in $L_i(s)$) offer the feasibility to choose the initial states, such that the dynamics of the controlled system start on the sliding surface $\sigma_i=0$ at the beginning t=0. Therefore, the transient performance is guaranteed. This guarantee of transient performance is the third advantage of frequency-shaped sliding surface over the conventional sliding control and reference tracking schedule.

Extensions and Experiment Verification

Sliding Surface and Input-Output System

Simulation results in the previous section show that the ideal skyhook effect of isolation can be robustly attained with the frequency-shaped sliding control and modal decomposition. The procedure of designing the sliding surface, or equivalently the choice of $L_i(s)$, may be essentially one of pole and zero assignment. In other words, the designer would know the desired system performance in the frequency domain. The designer can use known pole and zero assignment techniques to design $L_i(s)$ to achieve the desired response. For example, $b_1=0$ in Eq. 15, to put the zero at infinity, and $a_0$ and $b_0$ are chosen for the desired damping ratio and natural frequency of skyhook isolation. Though the SISO system is determined uniquely by pole, zero and gain, it is more general (e.g., an extension to MIMO sliding) and more convenient, to examine the input-output relation therein.

Eq. 28 shows the system dynamics of $x_i(t)$ under the inputs $x_{i0}(t)$ and $\Phi_i(t)$ (inside boundary layer $\Phi_i(t)=\sigma_i(t)$). Eq. 28 can be rewritten as $$x_i(t) = \frac{\frac{1}{s}L_i(s)}{1+\frac{1}{s}L_i(s)} x_{i0}(t) + \frac{\frac{1}{s}}{1+\frac{1}{s}L_i(s)} \Phi_i(t) \qquad (36)$$

Figure 14:
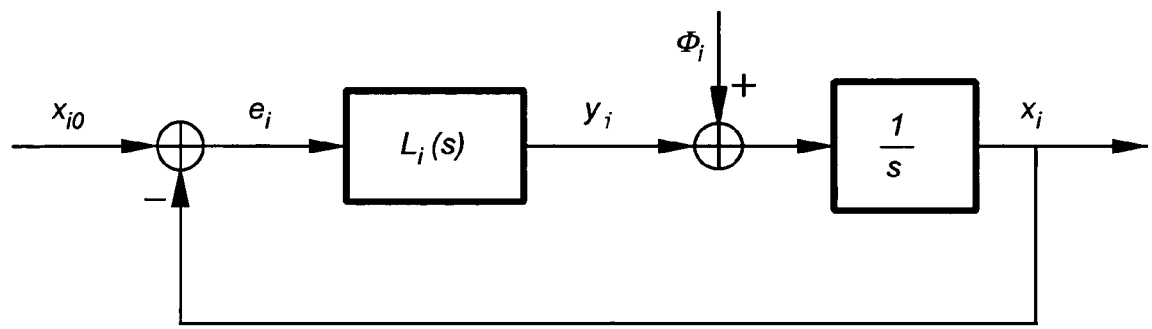
FIG. 14 is a schematic representation in block diagram form of a feedback system defined by a sliding surface.

The block-diagram of the system described by the above equation is shown in FIG. 14.

Figure 15:
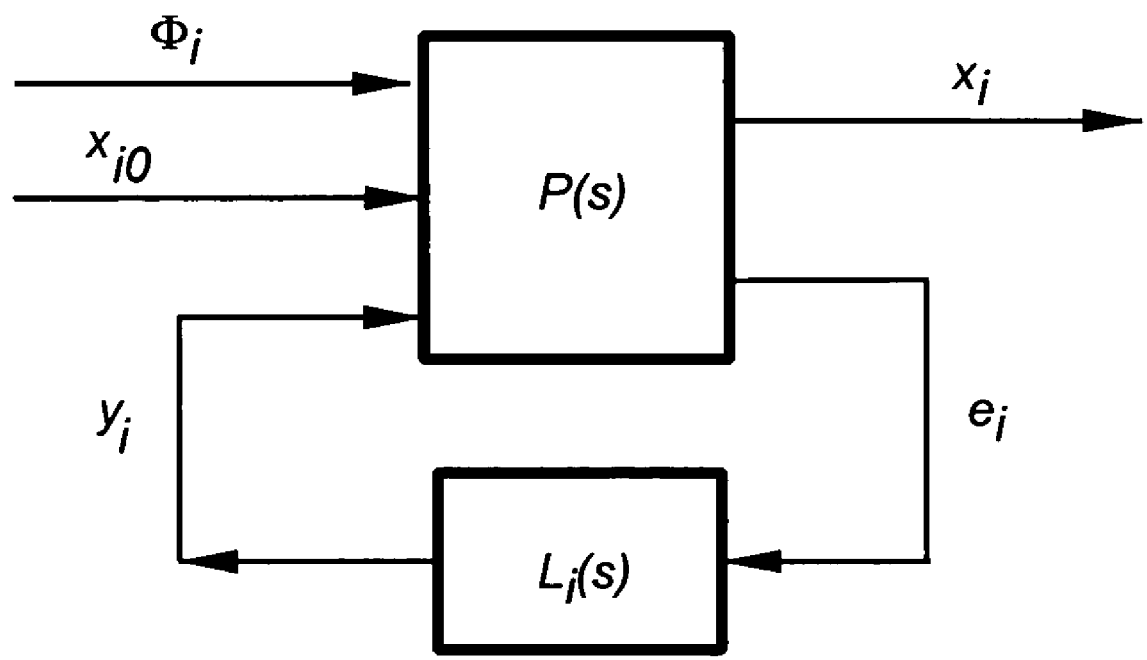
FIG. 15 is a schematic representation in block diagram form of a linear fraction transformation form of sliding surface.

It can be seen that the sliding surface in fact defines a control system: plant $$\frac{1}{s},$$

controller $L_i(s)$, inputs $x_{i0}(t)$ and $\Phi_i(t)$. This system is familiar to control engineers, and thus, the sliding surface $L_i(s)$ can be designed using the classical Linear Time Invariant (LTI) control methodologies, according to the performance specifications. The system dynamics of $x_i(t)$ under the inputs $x_{i0}(t)$ and $\Phi_i(t)$ can also be written in the form of linear fractional transformation, as shown in FIG. 15, where the generalized plant is given by $$P(s) = \begin{bmatrix} 1/s & 0 & 1/s \\ -1/s & 1 & -1/s \end{bmatrix}.$$

Thus, state-space LTI control techniques can also be used, such as $H_2$/LQG, $H_\infty$ or $\mathcal{L}_1$ to design the sliding surface. These techniques are known to those skilled in the art of control design, as described in K. Zhou, J. Doyle and K. Glover, *Robust and Optimal Control*, Prentiss Hall, N.J. (1995). In addition, the spectrum of the ground noise can also be taken into account if one includes a shape filter of $x_{i0}$ in the generalized plant. For a practical isolator, position alignment at low-frequencies is also required. This can be done by replacing $x_{i0}(t)$ in FIG. 14 as $x_{i0}(t)+x_{ref}(t)$, and the dynamic performance of alignment can be examined from FIG. 14.

The previous discussion does not include the term $\dot{x}_{i0}$ in the design of sliding surface, but it can be included. If a geophone sensor is available on the ground, the frequency-shaped sliding surface described by Eq. 13 can be defined more generally as $$\sigma_i = L_i(s)(x_i - x_{i0}) + G_i(s)\dot{x}_{i0} + \dot{x}_i \qquad (37)$$

where $G_i(s)$ is another linear operator. In general, at least one of $L_i(s)$ and $G_i(s)$ is a dynamic linear operator. The other can also be a dynamic linear operator, or may be a constant, including 0.

Figure 16:
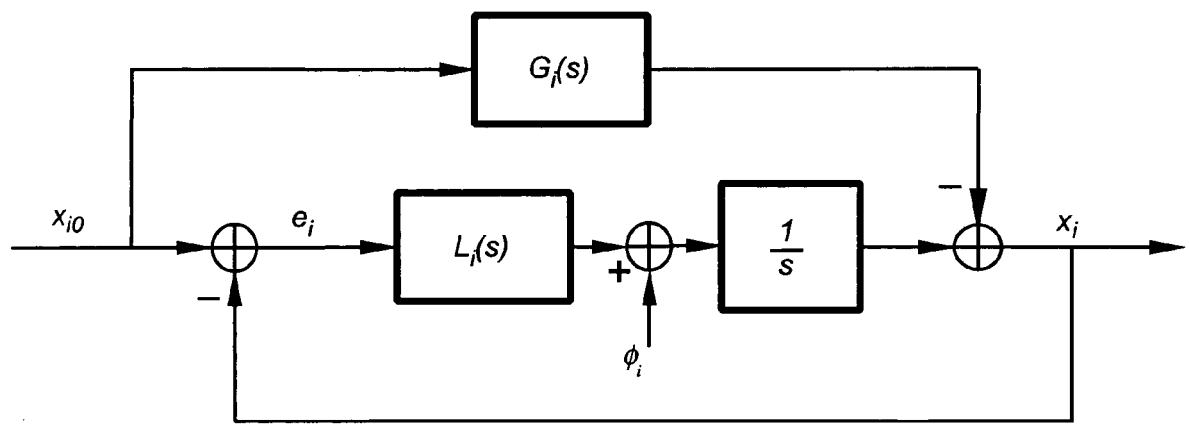
FIG. 16 is a schematic representation in block diagram form showing a feedback-feedforward system defined by sliding surface.

On the sliding surface $\sigma_i=0$, as shown schematically by FIG. 16, the system dynamics are $$\frac{x_i}{x_{i0}} = \frac{L_i(s) - sG_i(s)}{s + L_i(s)} \qquad (38)$$

This system is a hybrid feedback and feedforward control. This is consistent with the fact that ground signals in vibration isolation are often used for feedforward. FIG. 16 suggests that the extensively investigated feedback-feedforward control methods can be used to design the frequency-shaped sliding surface. The boundary layer analysis can also be carried out similarly.

Much of the foregoing has addressed controlling a plant to isolate it from vibration. A sliding surface defined in part by a dynamic linear operator has been examined which, when the system states are driven such that the sliding surface $\sigma_i=0$, achieves a desired system performance that constitutes a skyhook performance. The system performance is illustrated schematically with reference to FIG. 4, which has been explained. This is only a specific case that has been used for explanation. It is an invention hereof to design a controller for controlling a plant to achieve virtually any desired frequency response performance. Such frequency response performance may be virtually anything that is desired, and is not at all limited to curves such as are shown in FIG. 4, or anything similar. The designer will choose the frequency response that is desired, depending on the properties of the plant and its functions. Such choice of desired frequency response is up to the designer, according to known principles. The disclosed inventions provide the designer with ways to design a controller to achieve virtually any desired response. The response may be designed to reduce response to certain specific known prevailing frequencies, or combinations of frequencies, or, perhaps, even a dynamic frequency situation.

Furthermore, the foregoing has focused on isolating a mechanical plant from vibration. This also is just for explanatory purposes. The plant to be controlled might be subject to other types of disturbances that are not properly considered to be vibration, due, for instance more general type of motion, or vibration of position, or velocity, or acceleration.

Additionally, the inventions described herein of how to design a controller to control a modal plant or a multi-DOF plant by modal decomposition to a plurality of modal plants, are not limited to applications for mechanical plants. Any plant subject to inputs, having states and outputs, that can be characterized by differential equations that are both stabilizable and detectable can be controlled. Such applicable plants include but are not limited to any of the following, either pure, or combinations thereof: electrical, thermal, fluid, or any combinations, such as just to name one, electro-mechanical. They can also be used for chemical plants. They can be used to control natural systems, such as populations of living things (bacteria, pests, plants, animals for agriculture) whose populations grow and contract under the influence of external forces, such as food supply, and hazard disturbances, such as predation, pollution, etc. Of course, it would be necessary to identify what components are analogous to mass, stiffness, damping, etc. But this is within the skill of system dynamics engineers.

Nonlinear Target Dynamics

The foregoing has shown that a frequency-shaped sliding surface can directly achieve linear target dynamics (such as skyhook dynamics) of the same order as the nominal plant, and also that the design of such sliding surface may be thought of as a LTI control problem of feedback or feedback-feedforward.

In fact, the target dynamics can also be chosen to be nonlinear, and the sliding surface can be synthesized using contraction theory such as described in (W. Lohmiller and J. J. E. Slotine), ("Control system design for mechanical systems using contraction theory"). The following discusses generalizations of a method to design frequency-shaped sliding surfaces from the point of view of linear compensator design and of contraction theory. This allows linear or nonlinear target dynamics of the same order as the nominal plant to be systematically specified.

A single-input system is taken as an example. The system to be controlled is $$x^{(n)} = f(x, \dot{x}, \ldots, x^{(n-1)}, t) + b(x, \dot{x}, \ldots, x^{(n-1)}, t)u \quad (39)$$

and the target dynamics can be taken as any contracting system $$x^{(n)} = g(x, \dot{x}, \ldots, x^{(n-1)}, t) \quad (40)$$

To achieve this target one can define the sliding surface as $$\sigma = x^{(n-1)} + \overline{\sigma} \quad (41)$$

where $\overline{\sigma}$ is first determined as follows $$\dot{\overline{\sigma}} = -a(t)(\overline{\sigma} + x^{(n-1)}) - g(x, \dot{x}, \ldots, x^{(n-1)}, t) \quad (42)$$

where a(t) is a time varying, or invariant gain, or an operator, such that $\dot{\overline{\sigma}} - a(t)\overline{\sigma}$ is contracting.

In this way a hierarchy of two nominally contracting systems is constructed, $$\dot{\sigma} - a(t)\sigma = x^{(n)} - g(x, \dot{x}, \ldots, x^{(n-1)}, t) \quad (42)$$

and one can design the control u to make a tend to zero under the plant uncertainty or disturbance.

The initial condition of $\hat{\sigma}$ can be chosen as $-x^{(n-1)}$, such that $\sigma$ is initially zero.

Furthermore, the target dynamics have been chosen to be of the same order as the system to be controlled. This may be natural, e.g., when the system is best controlled intermittently, or when it must follow a desired dynamic behavior, rather than desired trajectory, as in some robotic locomotion applications.

Adaptive Control Based on Frequency-Shaped Manifold

The frequency-shaped sliding control of vibration isolation can also be extended to adaptive control. For instance, continuing with a vibration isolation example, one can attain a desired multi-DOF skyhook isolation without identifying the modal parameters. Non-skyhook targets are also achievable, but a skyhook target is used here as an example. The following will summarize the adaptive control based on frequency-shaped manifold with $f_d=0$. For the case $f_d$ is not zero (but is bounded), similar expression can be derived, with some slight revision.

The matrix B in the plant dynamics Eq. (1) is determined by the geometric location of the actuators and sensors, which is straight forward to obtain. Thus, typically the B matrix can be obtained off-line, and the matrices M, C and K are unknown. Now the designer would like to achieve target n DOF skyhook isolation in the form $$\ddot{z} + \overline{C}\dot{z} + \overline{K}(z - z_0) = 0 \quad (44)$$

where $\overline{C}$ and $\overline{K}$ are preselected matrices to meet the requirement of frequency domain performance.

A frequency-shaped or dynamic manifold vector σ with n entries in the state space can be defined:

$$\sigma = \dot{z} + (sI + \overline{C})^{-1} \overline{K}(z - z_0) \quad (45)$$

Frequency shaped manifold and dynamic manifold are used interchangeably herein. In this system, $(sI + \overline{C})^{-1}\overline{K}$ is a dynamic linear operator as L(s) above. Thus, eq. 45 could be rewritten as $$\sigma = \dot{z} + L(s)(z - z_0) \quad (45A)$$

(Similar to the single mode case above, one sees that n DOF target skyhook effect of Eq. 44 is achieved once the system is driven to this manifold σ=0.)

By rearranging the unknown parameters from the matrices K, C, and M, into a column vector a, one can define a matrix Y as follows:

$$K(z - z_0) + C(\dot{z} - \dot{z}_0) - M(sI + \overline{C})^{-1}\overline{K}s(z - z_0) := Ya \quad (46)$$

where Y has proper dimension composed of $z - z_0$, and $\dot{z} - \dot{z}_0$. In Eq. 46, the unknown parameters from the matrices K, C, and M show up linearly in vector a. Eq. 46 can be rewritten as $$K(z - z_0) + C(\dot{z} - \dot{z}_0) - MLs(z - z_0) = Ya \quad (46A)$$

A positive-definite Lyapunov function may be chosen as $$V(\sigma, \tilde{a}) = \frac{1}{2}\sigma(t)^T M \sigma(t) + \frac{1}{2}\tilde{a}(t)^T P^{-1} \tilde{a}(t) \quad (47)$$

where the vector σ(t) is defined by Eq. 45, M is the mass matrix of the system (symmetric positive definite), P is a pre-selected (constant) symmetric positive definite matrix, and the vector of ã(t) is the error vector of on-line estimates of the parameters a: $\tilde{a}(t) = \hat{a} - a$.

Using Eq. 1 and Eq. 45, one obtains the time derivative of V(σ,ã):

$$\dot{V}(\sigma, \tilde{a}) = \sigma(t)^T \left[ M\ddot{z} + M(sI + \overline{C})^{-1}\overline{K}(\dot{z} - \dot{z}_0) \right] + \dot{\tilde{a}}(t)^T P^{-1} \tilde{a}(t) \quad (48)$$

$$= \sigma(t)^T \left[ Bv - K(z - z_0) - C(\dot{z} - \dot{z}_0) + M(sI + \overline{C})^{-1}\overline{K}s(z - z_0) \right] + \dot{\tilde{a}}(t)^T P^{-1} \tilde{a}(t)$$

Substituting the expression 46 for Ya into this Eq. 48, one obtains:

$$\dot{V}(\sigma, \tilde{a}) = \sigma(t)^T (Bv - Ya) + \dot{\tilde{a}}(t)^T P^{-1} \tilde{a}(t) \quad (49)$$

Therefore, the control-force vector can be $$v = B^{-1}[Y\hat{a}(t) - k_d\sigma(t)] \quad (50)$$

and the parameter adaptation law can be $$\dot{\hat{a}}(t) = \dot{\tilde{a}} = -PY^T\sigma(t) \quad (51)$$

such that $\dot{V}(\sigma,\tilde{a}) = -\sigma(t)^T k_d \sigma(t)$ is negative semi-definite for some selected positive definite matrix $k_d$ of size n×n, and $\ddot{V}(\sigma,\tilde{a})$ is bounded. Thus, according to the Lyapunov theorems and Barbalet's lemma (J. J. E. Slotine and W. Li), one can conclude that σ(t) approaches zero as t approaches infinity, and hence the target dynamics of skyhook isolation Eq. 44 is achieved. The values for a can initially be assigned any reasonable value.

Thus, it is possible to control a plant to achieve a desired performance, without knowing all or even any of the entries of the M, C or K matrices. Further, it is not even necessary to have a nominal value for those parameters. If the Lyapunov and Barbalet conditions set out above are satisfied, then it is guaranteed that σ can be driven to 0, and to control the plant as desired. A point of contrast to the controller and method of designing a controller using a sliding surface, discussed above, is that with the sliding surface controller, it is beneficial that there be at least a nominal estimate for the parameters, as represented by the parameters having a ^ indicator, such as $\hat{\omega}_i$, discussed in connection with Eq. 21.

The expressions 50 and 51 represent the adaptive control of vibration isolation based on a frequency-shaped dynamic manifold. In contrast with the well-known model reference adaptive control, the adaptive algorithm of expressions 50 and 51 does not use any reference model, and there is no requirement to measure ground vibration. In addition, since there are additional states in the manifold σ (Eq. 45), the initial states can be chosen to ensure that σ(t=0)=0 and guarantee the transient performance. It is also possible to include a friction term in the governing Eq. 1, which will then turn up in the other equations, as would be understood.

The foregoing discussion regarding adaptive control has explained method steps of inventions hereof with respect to vibration isolation and achieving system performance in accord with a skyhook configuration. As with the techniques discussed above regarding a modal system, particularly one that represents a modal aspect of a multi-DOF system, the adaptive control methods discussed herein can be used to achieve many, virtually any desired performance requirements, without identifying modal parameters by choosing different L(s).

Further, the foregoing example has used a mechanical system as the plant to be controlled. Similar to the point made above regarding modal systems, the adaptive control methods discussed herein can be used to design a control law for any plant that can be described by differential equations that are both stabilizable and detectable. For instance, the plant can be any of those discussed above, such as electrical, thermal, fluid, combinations thereof, etc. And, it is not necessary to know the modal parameters that would correspond to the entries in the matrices M, C, and K, in the analogous, non-mechanical plant.

A general process for designing a controller using a dynamic manifold with adaptive control will be discussed with reference to FIG. 22, which is a schematic flowchart of steps a designer would take. This method is applicable to a multi-DOF system that can be described by a second order equations, such as Eq. 10. The entries in mass, damping and stiffness matrices M, C, and K, need not be known.

The process begins 2200. As with the robust method described above in connection with FIG. 21 using a sliding surface, two pathways are initially followed in parallel. Along one pathway, the initial substantive step is to determine 2202 the governing equations for the plant, for example, as Eq. 1 above, with unknown M, C, and K. Entries for a matrix B, which are based on the locations of actuators and sensors and the shape of the plant, can be determined 2204 by testing, measurement, etc.

Turning now to the beginning of the other parallel pathway, these steps are also very similar in general concept to those outlined above for the sliding surface method, and thus will not be discussed in as much detail. Performance requirements exist 2210 such as have been mandated by a customer, etc. Target dynamics corresponding to the performance requirements are then determined 2212, for instance as represented by a curve of a graph such as is shown at FIG. 4 or a mathematical equation. Note that in this case, the steps are performed for the entire plant, rather than for a single mode.

Step 2214 is to design a frequency shaped dynamic manifold vector σ in terms of at least one dynamic linear operator L(s), that is a function of s (and perhaps two, including also G(s) or three, including Q(s), analogous to those described above for a modal case). The operator operates upon at least one of: the difference between the output and the excitation input; and the derivative of the output, such as shown at Eq. 45A above, $\sigma = L(s)(z-z_0) + \dot{z}$. The dynamic manifold is chosen such that if the vector σ=0, then the plant behaves according to the desired target performance, as explained above.

The same possible techniques discussed above for designing an appropriate sliding surface may be used and are shown as 2214a–2214e for designing a dynamic manifold (except that the goal of the design is called a dynamic manifold, rather than a sliding surface, because there is no sliding phenomena occurring in the adaptive control case). A sub-step of designing 2214 a frequency shaped dynamic manifold according to one of the techniques shown (2214a–2214e) is designing a dynamic linear operator L(s) (and perhaps a second and third dynamic linear operator), also chosen so that if σ=0, the desired target performance is obtained.

Again, as mentioned regarding the modal case discussed above, the pathways are not wholly independent. Very basic facts about the plants must be used to design σ, such as the order of the plant.

The parallel streams of steps rejoin at parameter rearrangement step 2218.

The unknown parameters of the matrices M, C, and K are arranged in a column a. A matrix Y of proper dimension is defined so that the basic plant equation Eq. 1 can be rewritten 2218 in terms of Y and a, as at Eq. 46 and 46A. Initial values for the column a are assigned, which values need not be accurate.

Using the Lyapunov theorem and the Barbalet lemma, the control force vector v and the parameter adaptation law for $\dot{\hat{a}}$ are established 2230 and the process of designing a controller ends 2234.

Thus a controller has been designed without knowing the parameters of the K, M and C matrices. Steps of mathematical manipulation for establishing a control law using a dynamic manifold and driving it to zero are typically somewhat specific for the actual case under examination. A representative method has been discussed above. Others can be chosen that also result in a suitable control law.

Turning now to a brief discussion of a general method of controlling a plant to achieve a target performance that isolates the plant from vibration, reference to FIG. 23 is helpful. The process begins 2311, with the first substantive step being providing 2313 a dynamic manifold σ, that is a function of states of the plant and a dynamic linear operator L(s) that is a function of the LaPlace operator s and which operates on at least one of the states. As discussed above, σ is further chosen so that when the states are such that σ=0, the states are also such that the target performance is achieved. This description assumes that a dynamic manifold σ has been designed already, for instance according to a method discussed above. The states are measured 2315 and σ is calculated 2317. Based on the value for σ, the actuators are controlled 2321 to drive the states so that σ is driven to 0. The process ends 2323.

The step of controlling the actuators to drive σ to 0 may be conducted in one of several ways. For instance, according to a sliding control method, the method can generate a force signal to drive the relevant actuator or actuators. The force signal may be based, in part on the sgn function of σ, such as at Eq. 22 above. If σ is greater than zero, this results in a force that drives the states to reduce σ, toward zero. If σ, is less than zero, this results in a force that drives the states to increase σ. The force may be a switching control force, as discussed above in connection with Eq. 22. Or, the force may vary continuously within a boundary layer of σ, also as discussed above at Eq. 27.

As is discussed above, it is also possible to use a method of adaptive control, where on-line adaptation of parameters is conducted. In that case, for example, some terms in the M, C and K matrices are unknown. An expression for a force vector can be developed in terms of σ, and the unknown terms, such as Eq. 50. Further, a parameter adaptation law, such as at Eq. 51, can be developed in terms of σ. While σ does not equal zero, the parameters are adapted, and the force rule changes. When σ reaches zero, the adaptation ceases, and the force rule remains stable.

Returning now briefly to a discussion of the general apparatus shown in FIG. 1, the elements of a representative controller 130 will be outlined. Each of the sensors $132_1$, $134_1$, $132_2$, $134_2$, etc., are coupled to the controller 130 through an interface, such as wires 131, data acquisition circuitry, wireless transmission link, or any appropriate device. The controller 130 may be a programmable processor, programmed to follow steps, a more dedicated device that has the steps embodied in hardware, firmware or some intermediate. Hardware implementation of the controller will be within the capability of the skilled person. Within the controller 130 is a processor 133 or other apparatus, which holds a rule for generating a dynamic manifold σ having the properties discussed above, from the states inputs from the sensors, and for calculating its value. The σ element 133 provides a signal that represents the value of σ. Based on the value, a force generator 137 determines values for forces to be generated by the actuators, e.g., 141, according to any appropriate method, for instance using a sliding surface, or using adaptive control, as discussed above. The force generator is coupled to the actuators 141 through any appropriate interface, such as wires 139, an input/output card, wireless transmission link, etc.

Experimental Verification of Frequency-Shaped Sliding and Adaptive Control of Isolation The frequency-shaped sliding control and adaptive control for vibration isolation have been verified. FIGS. 17A and 17B show the experimental results of single-DOF isolation using the proposed sliding control, with FIG. 17A showing passive isolation without control and FIG. 17B show active isolation with frequency-shaped sliding control. The experimental plant has a resonant frequency of 12±1 Hz and modal damping of 18±4%, and the target is a skyhook isolation at 2 Hz and critical damping 0.7. The measured time response shown in FIG. 17B shows that this controller is very effective for vibration isolation. The measured base velocity is shown as a dotted line as keyed on the graph. The measured platform velocity is shown as a solid line. The target skyhook velocity is shown as a dashed line. At the scale showing on FIG. 17B, the target skyhook and the measured platform velocities are essentially superimposed. FIG. 17C shows, schematically, a portion of these two curves over the course of about 0.35 seconds, enlarged.

The frequency response controlled with the frequency shaped sliding surface is shown in FIG. 18, a graphical representation of the frequency response magnitude from a base to an isolated platform under different conditions, with passive isolation without control shown dotted; active isolation with proposed frequency-shaped sliding control shown solid, and target skyhook shown dot-dash. This figure shows that the skyhook target is closely achieved over a large bandwidth.

FIG. 19 shows the experimental results of a single-DOF isolation using the adaptive control based on frequency-shaped manifold, where the target is selected as a skyhook isolation at 1.2 Hz and critical damping 0.7. In this experiment the parameters of the mass, stiffness, and damping are initially taken as zero and updated according to Eq. 51. Thus, the platform velocity (solid line) initially tracks the base velocity (dotted line) closely, and then approaches the target skyhook (dashed line). The adaptive control based on frequency-shaped manifold is very effective for vibration isolation, and the skyhook target is closely attained even though there is no prior knowledge of the plant parameters.

FIGS. 20A and 20B show, schematically, responses of a base velocity (dot) in comparison with platform velocity (solid) and target skyhook velocity (dash) with FIG. 20A showing the response, and FIG. 20B showing a zoomed time view (enlarging the amplitude axis). The zoomed time response shows that the skyhook target is closely attained. In fact, even at the zoomed scale shown in FIG. 20B, it is difficult to discern divergences between the two traces.

FIG. 24 shows, schematically, an instance of a vehicle 2420 and active control system embodying inventions hereof. The vehicle is generic, and may be any vehicle that contacts a travel surface 2410 through supports 2401, 2402, such as wheels as shown. The travel surface typically has undulations, shown exaggerated here. The supports 2401 may be any support that supports the mass of the vehicle, and is subject to transmission of displacement excitation from the travel surface, either due to the motion of the travel surface relative to an inertial frame, such as due to tremors, or due to variations in the height of the ground surface from one place to another, which variations are transmitted to the supports as the supports move along generally congruent to the travel surface. Supports include but are not limited to wheels, skids (such as on an ice boat, or toboggan) air suspensions (such as with a hover craft that passes over water, or rail) magnetic levitation supports, etc. (Note, the travel surface may be water.)

In FIG. 24, two supports 2401 and 2402 are shown, which may be two of four supports, such as in a conventional automobile. However, there may be any number of supports, such as two, as in a motorcycle, or three as in a tri-cycle configuration, or more than four. Each support is coupled to a chassis 2410 through a local suspension that consists of an element characterized by a spring coefficient k, an element characterized by a damping coefficient c and an active actuator having an output, such as a force v. Subscripts 1 and 2 are shown in FIG. 24 for each support, as appropriate.

The chassis 2410 supports a payload 2420, such as a passenger compartment, for a driver. Typically, the payload 2420 is coupled to the chassis by a suspension 2403, which may be conventional, passive, or could also include aspects of inventions hereof.

As shown, $z_1$ indicates displacement of the chassis at one suspension, and $z_2$ indicated displacement of the chassis at the other suspension. One only will be discussed here. The wheel 2401 is coupled to the suspension through some appropriate couple 2408, such as a hub-bearing and axle. The point of the wheel that contacts the travel surface experiences a displacement $z_{001}$, which is transmitted to the axle, itself having displacement $z_0$. Typically, $z_0$ does not equal $z_{001}$, due to the transmission properties of the wheel and bearing coupling themselves, such as with a flexible tire, etc. In actual practice, those unsprung stiffness, mass and damping properties could be analyzed and combined with the dynamics of those above the wheels, so they are not shown separately here. However, they should be considered by a designer. Thus, for purposes of discussion here, $z_0$ will be considered to be equal to $z_{00}$.

As discussed above, sensors measure the relative displacement $z_1 - z_0$, between the chassis end $z_1$ and travel surface displacement $z_0$, and the derivative of absolute displacement $z_1$. The sensors can be a gap sensor 2432 for measuring relative displacement, and a geophone sensor 2434 for measuring derivative of displacement. A geophone sensor could also be placed on the bearing couple or wheels axis 2408 to measure its displacement derivative but that is not necessary.

These sensors are coupled to a signal processor 2430, in which the controller software (or firmware or hardware) instructions resides. The controller takes as inputs the relative displacements and the vertical velocities, and generates as an output a signal to the actuators 2441, 2442, which generate a force as determined by the force law, to achieve the desired frequency response, for instance for a vehicle, isolation from vibration and motion of the bearing coupling due to variations in height of the road surface.

In the case of a vehicle, appropriate sensors at each actuator sense conditions, and send them to the signal processor 2430. The signal processor 2430 may follow steps discussed above that modally decompose the measured states, analyze them modally for single modes, generate modal force signals, which are then combined to a non-modal form before they are transmitted to the actuators. Or, the signal processor may analyze the signals in their non-modal form, using the techniques of adaptive frequency shaped dynamic manifold control discussed above, depending on the availability of modal parameters, model quality, processing capacity, etc., as a designer may choose.

The inventions disclosed herein can be used in the design of controllers for vibration isolation, as well as many other control problems. In the realm of vibration isolation, specific applications include support for precision instrumentation, vehicle suspensions, camera isolation from vehicles, such as helicopters.

The vibrating excitation can be a displacement, a velocity, an acceleration, or even other types of motion.

Inventions disclosed herein include methods of designing controllers and the control laws that define such controllers, as well as methods of controlling a plant, and controllers themselves that embody such control laws, and apparatus systems that include such controller to control hardware, or to control processes that can be defined by analogous equations and methods of controlling a plant. Thus, as an example, an invention hereof is a method to design a controller, and the control law that defines such a controller, to isolate a vehicle passenger compartment from vibration due to movement along the travel surface. A controller that accomplishes the isolation, as is a signal processor that accomplishes the isolation, is also an invention hereof, as is a larger system of sensors, actuators and a signal processor that manages input and output among the sensors and actuators, governed by the controller. Furthermore, the vibration isolated vehicle or instrument itself that embodies such a system of sensors, actuators and a controller, is also an aspect of an invention hereof. Inventions hereof also include instructions stored on a media capable of being read by a computer or signal processor or an appropriate peripheral device coupled to a signal processor, that comprise instructions for causing a signal processor or computer to perform the steps and functions of the methods described herein. Such media includes, but is not limited to: magnetic tapes, disc, optical disc, CD, DVD, tape, and any media developed in the future.

SUMMARY

A robust control schedule is shown for multi-DOF vibration isolation. Modal decomposition handles the MIMO vibration control using SISO control method in modal coordinates. The system can be modeled from measured transfer functions via experimental modal analysis. Therefore the disclosed control schedule is applicable to controller synthesis based on measurement data or analytical modelling. Frequency-shaped sliding control, originally proposed in the literature for chatter reduction, is exploited instead to achieve performance requirements in the frequency-domain under plant uncertainty and payload/upper stage disturbances. The effect of boundary layer thickness on performance is quantified. Simulation results illustrate that the ideal skyhook effect of vibration isolation can be robustly achieved. Also disclosed is that the design of frequency-shaped sliding surfaces is equivalent to a control problem of feedback or feedback-feedforward, and that linear or non-linear target dynamics of the same order as the system to be controlled can be also attained. Experiments also demonstrate that the sliding and adaptive control based on frequency-shaped sliding surface are very effective for vibration isolation. Control can be achieved without measuring the excitation, such as ground motion. Further, performance during the transient stage can be guaranteed. Also, control can be achieved even without knowing the values of entries for mass, stiffness and damping matrices. The methods of controller design can be used to design control for plants subject to disturbances other than only vibration. The plant can be mechanical, electrical, thermal, or any that can be described by system equations that are mathematically of the same character as are those that describe mechanical dynamic systems. The target dynamics need not be skyhook dynamics, but can be any dynamics desired, even non-linear.

A preferred embodiment of an invention hereof is an apparatus comprising an interface, configured to be coupled to an input of at least one actuator that is coupled to a plant that is subject to a vibration excitation, and that is to be controlled to achieve a target performance that isolates the plant from the vibration excitation. Coupled to the interface, is a controller, configured to generate signals to control the at least one actuator so that the states of the plant are such that, a dynamic manifold σ defined as follows, equals 0, where σ is defined: by a function of the states and a dynamic linear operator L(s), which is a function of the Laplace operator, s, and which operates on at least one of the states; and such that, if σ=0, then the target performance is achieved.

The controller can be for use with a plant that is subject to a vibration excitation $x_0$ and operates with a performance x, the function that defines the dynamic manifold σ being of: first derivative of performance $\dot{x}$; and a difference between performance and vibration excitation, $x-x_0$. The excitation may be a position vibration and the performance a position performance. Or, the excitation may be a velocity vibration and the performance is a velocity performance. Or, both the excitation and performance may be acceleration, or any other motion.

The linear operator L(s) may operate upon the state of difference between performance and vibration excitation, $x-x_0$ or upon first derivative $\dot{x}$ of performance or both, or different linear operators may operate upon each. A further linear operator can operate upon the excitation itself, or its first derivative, also in combination with one or two other linear operators, as above.

According to a useful embodiment, an invention is an apparatus wherein: the target performance is a skyhook supported performance; the dynamic manifold $\sigma=L(s)(x-x_0)+\dot{x}$; and $L(s)=(b_0)/(s+a_0)$, where $b_0$ represents a spring coefficient and $a_0$ represents a damping coefficient.

It is possible that the controller be configured to generate signals to control the at least one actuator, which signals are a function of the dynamic linear operator L(s). They may also be a function of the dynamic manifold σ.

According to yet another embodiment, the controller may be configured to generate signals to control the at least one actuator, which signals are a function of the Sgn function of the dynamic manifold σ, or the signals may be a continuous approximation of the Sgn function, within a boundary layer of sigma.

For most of the preceding embodiments, the plant may be a single input and single output plant, the states may be in normal coordinates, and the controller may be configured to generate a signal to control a single actuator.

The controller may be further configured to drive σ to equal 0 using sliding control, and, optionally, with a boundary layer.

With any embodiment, the plant may be of order n, and the target performance may have dynamics of order less than n, equal to n or greater than n. The plant may be multi DOF, and can be defined by one or more modes. A controller of the invention can be used to control one or more modes, any or all or only some of which are so controlled, for instance to achieve target performance of a damped skyhook.

The plant may advantageously be a vehicle, such as a passenger automobile, truck, train car, etc., or an instrument isolation table or other support. Embodiments of the invention may be very advantageously used for vibration isolation, for instance isolating a camera carried by a helicopter from vibration thereof.

With respect to quite a few preferred embodiments of inventions hereof, the plant is a multiple degree of freedom (DOF) plant having a plurality of actuators, and defined by a plurality of modes, each to be controlled to achieve a target modal performance. Further, the dynamic manifold σ is a set of modal dynamic manifolds $\sigma_i$, each corresponding to one of the plurality of modes; wherein: the controller is configured to generate, for each of the plurality of actuators, a signal that drives the actuator, so that the states of the multi DOF plant are such that, for each mode, a modal dynamic manifold $\sigma_i$ equals 0. $\sigma_i$ is defined: by a function of the states in modal coordinates and a modal dynamic linear operator $L_i(s)$, which is a function of the Laplace operator, s, and which operates on at least one of the states in modal coordinates; and such that, if $\sigma_i=0$, then the target performance is achieved.

Alternatively, another preferred embodiment is an apparatus, wherein the plant is one mode of a multi DOF plant, that has at least one actuator, the modal plant having states in modal coordinates and to be controlled to achieve a target modal performance. The dynamic manifold σ is a modal dynamic manifold $\sigma_i$. The controller is configured to generate, for the modal plant, a force signal $u_i$ in modal coordinates, to be a component of a force signal that is supplied to a modal combination module, configured to combine modal force signals corresponding to other modes and to generate signals to drive the at least one actuators so that the states of the modal plant are such that the modal dynamic manifold $\sigma_i$ equals zero. $\sigma_i$ is defined: by a function of the states of the modal plant and a modal dynamic linear operator $L_i(s)$, which is a function of the Laplace operator s, and which modal dynamic linear operator operates on at least one of the states of the modal plant; and such that, if $\sigma_i$ equals zero, then the target modal performance is achieved.

According to a related preferred embodiment, the force signal $u_i$ is defined by a function of a predetermined estimation of a modal parameter, such as modal frequency, or a modal damping parameter, or mode participation or mode shape vectors.

With many of the mentioned embodiments, controller further comprises a modal combination module, configured to combine the corresponding force signals $u_i$ for at least two modes and generate for each of the plurality of actuators, a signal $v_i$ to drive the actuator, so that the states are such that $\sigma_i=0$.

Still another related embodiment sees the controller for use with a plant that is subject to a plurality of modal vibration excitations, a single such excitation being designated $x_{0i}$, and where the plant exhibits a plurality of modal performances, a single such performance in modal coordinates being designated $x_i$. The function that defines the modal dynamic manifold $\sigma_i$ is of the states in modal coordinates of: first derivative of performance; and difference between vibration excitation and performance. Other combinations of parameters that constitute states of a system are also possible.

For the modal dynamic manifold $\sigma_i$, a linear operator $L_i(s)$ operates on the state of difference between performance and vibration excitation, both in modal coordinates. Or it may operate upon the state of derivative of performance, or both. Or, a different dynamic linear operator may operate on one or more of the states.

According to a particular embodiment, the modal target performance is a skyhook supported performance, and the modal dynamic manifold $\sigma_i=L_i(s)(x_i-x_{i0})+\dot{x}_i$ and $L_i(s)=b_0/(s+a_0)$, where $b_0$ represents a modal spring coefficient and $a_0$ represents a modal damping parameter.

With all of these embodiments, the controller may be configured to generate a signal that is a function of the dynamic linear operator L(s).

Still another preferred embodiment, is an apparatus where the controller is further configured to drive sigma a to zero while using adaptive control by updating estimation online of unknown parameters chosen from the group consisting of at least one component of matrices of: mass, damping, stiffness and friction. The controller may be for use with a multi DOF plant that is subject to a vibration excitation vector $z_0$ and operates with a performance vector $z$, and the dynamic manifold $\sigma$ is a vector function of the states of the plant. The states may be first derivative of performance $\dot{z}$, and difference between vibration excitation $z_0$ and performance $z$ or any other reasonable set of parameters that constitute states.

For the adaptive control apparatus, the dynamic linear operator $L(s)$ can be a matrix that operates upon the state of difference between vibration excitation $z_0$ and performance $z$, or of the derivative of performance, or both. Or, there can be more than one dynamic linear operators that operate upon each.

According to one adaptive control apparatus embodiment, the target performance is a skyhook supported damped performance. The dynamic manifold vector $\sigma = L(s)(z-z_0)+\dot{z}$ and $L(s)=(sI+\overline{C})^{-1}\overline{K}$, where I is the identity matrix and $\overline{C}$ and $\overline{K}$ are preselected damping and stiffness matrices, respectively, to meet the target performance.

For adaptive control apparatus embodiments, the order of the plant may be equal to, greater than, or less than the order of the target performance dynamics.

According to a particularly useful embodiment an invention is an apparatus having a parameter adaptation module, which applies a law $\hat{a}$ that is a function of the dynamic manifold $\sigma$. It also has a force rule generator, that generates as an output a force vector signal $v$, that is a function of $\sigma$ and an estimation $\hat{a}$ of unknown parameters a from matrices K, C and M, which represent spring coefficients, damping parameters and mass, respectively, of the plant. If $\sigma=0$, the adaptation module retains any present parameter estimate, and if not, it applies the parameter adaptation law.

Another embodiment of an invention hereof is a method comprising the steps of: providing a dynamic manifold $\sigma$ that is: i. a function of states of a plant that is subject to vibration excitation and is to achieve a target performance that exhibits a desired isolation of the plant from vibration; a function of a dynamic linear operator $L(s)$, which is a function of the Laplace operator, s; and composed such that if the states are such that the dynamic manifold $\sigma$ equals zero, the target performance is attained. The method further comprises: measuring the states and generating signals that correspond thereto; generating a signal that corresponds to the dynamic manifold $\sigma$, based on the state signals; and generating signals to at least one actuator that is coupled to the plant, to drive the at least one actuator so that the states of the plant are such that the dynamic manifold $\sigma$ equals 0.

The states may be: the difference between a performance of the plant and a vibration excitation; and time derivative of position performance, or any other reasonable set of parameters that constitute states of a plant in a conventional sense. The method may be for use with a plant that is subject to a vibration excitation $x_0$ and operates with a performance $x$, the function that defines the dynamic manifold being of the states of first derivative of performance $\dot{x}$, and a difference between performance and vibration excitation $x-x_0$. The excitation may be a position vibration and the performance may be a position; or the excitation may be a velocity vibration, and the performance a velocity, or the excitation and performance may be any corresponding motions.

The variations mentioned above with respect to apparatus embodiments of inventions hereof also may be enjoyed with method embodiments. The dynamic manifold $\sigma$ may be further defined by a dynamic linear operator $Q(s)$, which operates upon a first derivative $\dot{x}$ of performance.

A method of an invention may have a target performance that is a skyhook supported performance. The dynamic manifold $\sigma=L(s)(x-x_0)+\dot{x}$; and $L(s)$ is a dynamic linear operator equal to $(b_0)/(s+a_0)$, where $b_0$ represents a spring coefficient and $a_0$ represents a damping coefficient.

Another method may further include the step of generating signals to control the at least one actuator, which signals are a function of the dynamic linear operator $L(s)$. The signals may also be a function of the dynamic manifold $\sigma$, a Sgn function of the dynamic manifold $\sigma$ or a continuous approximation of the Sgn function, within a boundary layer of $\sigma$.

Still another method of an invention is a method wherein the plant is a single input and single output plant, the states are in normal coordinates, and a signal is generated to control a single actuator.

Alternatively, a method of an invention is to control a multi DOF plant, having n modes, to achieve target performance having dynamics of order equal to or greater than n, or even less than n.

According to another method of an invention hereof, the disclosed techniques are used to control one or more modes of a multi DOF plant to achieve a skyhook suspended damped performance.

Still another method of an invention hereof is to control any such plant using sliding control, with, or without a boundary layer.

Various methods of inventions hereof are suitable for vibration isolation, for instance with traveling vehicles, such as automobiles or trucks, or isolating laboratory equipment from vibration, or cameras from vibration, such as from a helicopter mount.

A method of an invention hereof may be for where the plant is a multiple degree of freedom (DOF) plant, having a plurality of actuators, and defined by a plurality of modes, the plant to be controlled to achieve, for each mode, a target modal performance. Signals are benerated to actuators comprising the steps of: generating, for each of the plurality of modes, a force signal $u_i$ in modal coordinates; combining each signal $u_i$ with corresponding modal force signals for each other of the plurality of modes; and generating, for each of the plurality of actuators, a signal $v_i$ that drives the actuator so that the states of the multi-DOF plant are such that, for each mode, a modal dynamic manifold $\sigma_i$ equals zero. The dynamic manifold $\sigma_i$ is defined: by a function of the states in modal coordinates and a modal dynamic linear operator $L(s)$, which is a function of the Laplace operator, s, and which operates on at least one of the states in modal coordinates; and such that, if $\sigma_i=0$, then the target performance is achieved.

A related method of an invention hereof is for use where the plant has states in modal coordinates, and is one mode of a multi degree of freedom (DOF) plant that has at least one actuator, the modal plant having states in modal coordinates and to be controlled to achieve a target modal performance. Signals to actuators are generated by: generating, for the modal plant, a force signal $u_i$ in modal coordinates; combining the signal $u_i$ with other force signals; and generating, for the at least one actuator, a signal $v_i$ that drives the actuator so that the states of the multi DOF plant are such that for the single mode, a modal dynamic manifold $\sigma_i$ equals zero. The dynamic manifold $\sigma_i$ is defined: by a function of the states in modal coordinates and a modal dynamic linear operator $L_i(s)$, which is a function of the Laplace operator, s, and which operates on at least one of the states in modal coordinates; and such that, if $\sigma_i=0$, then the modal target performance is achieved.

According to a related method, the step of generating a force signal $u_i$ comprises generating a signal that is based on a function of a predetermined estimation of a modal parameter, such as frequency, damping, or mode shape or mode participation vectors. Modal testing or theoretical analysis may be conducted to predetermine the estimation.

With a related embodiment the method is for use with a plant that is subject to a modal vibration excitation, in modal coordinates, being designated $x_{Oi}$, and where the plant provides a modal performances in modal coordinates being designated $x_i$, further wherein the step of generating, for at least one actuators, a signal, comprises generating a signal that drives the at least one actuator so that a modal dynamic manifold $\sigma_i=0$, which dynamic manifold is defined by a function of the states in modal coordinates. The states may be any reasonable set of parameters, as mentioned above. The excitation may be any excitation, including without limitation a position vibration, a velocity vibration, an acceleration vibration, or vibration of any motion parameter, with corresponding performances.

According to one embodiment of an invention hereof, the method is to achieve, for at least one mode, a skyhook supported target performance. The modal dynamic manifold $\sigma_i = L_i(s)(x_i - x_{iO}) + \dot{x}_i$; and $L_i(s) = b_O/(s+a_O)$, where $b_O$ represents a modal spring coefficient and $a_O$ represents a modal damping parameter.

The modal force signal may be a function of the dynamic linear operator $L_i(s)$. Similarly may be the actuator signal force, or forces.

Another embodiment of an invention hereof generates signals to drive the actuators by using adaptive control to generate signals to drive $\sigma$ to equal 0, while updating estimation online of unknown parameters chosen from the group consisting of at least one component of matrices of: mass, damping, stiffness and friction.

With a method embodiment of the inventions hereof, the plant is a multi degree of freedom (DOF) plant that is subject to a vibration excitation vector $z_0$ and operates with a performance vector $z$, and the dynamic manifold $\sigma$ is a vector function of the states of the plant. The states may be first derivative of performance $\dot{z}$, and difference between vibration excitation $z_0$ and performance $z$, or any other set of parameters that constitute states.

According to a particularly useful embodiment, the target performance is a skyhook supported damped performance. The dynamic manifold $\sigma = L(s)(z-z_0) + \dot{z}$; and $L(s) = (sI+\overline{C})^{-1}\overline{K}$, where I is the identity matrix and $\overline{C}$ and $\overline{K}$ are preselected damping and stiffness matrices, respectively, to meet the target performance.

With a particularly elegant embodiment of an invention hereof, generating signals to at least one actuator further comprises: applying a parameter adaptation law $\dot{\hat{a}}$ for adapting unknown parameters $\hat{a}$ for unknown parameters $a$ from matrices K, C and M, which represent spring coefficients, damping ratios and mass, respectively, of the plant. The adaptation law is a function of $\sigma$, composed such that: if $\sigma$ is not equal to 0 changes values for the parameters; and if $\sigma$ is equal to 0 retains any present estimate for the parameters. The method also entails generating a force vector signal v, that is a function of the dynamic manifold $\sigma$ and the estimation $\hat{a}$ of unknown parameters $a$.

Various functions and steps have been discussed as being performed by a computer or a signal processor or a signal generator. However, it may be that it is reasonable to combine all processing functions within a single processor and that is also considered to be included in the description of the individual processors mentioned. Also, conversely, operations that are discussed as being conducted in a single processor may theoretically be performed in more than one processor, whose outputs are combined and directed such that they operate in consort or a properly programmed general purpose computer or network of computers. This also is considered to be included in the description of individual processors with discrete functions. Rather than processors, perse, hardwired, dedicated circuits may be developed to achieve many of the functions described herein, and those too are considered to be included within the rubric of processor.

This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

Some assemblies of hardware, or groups of steps, are referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

Citations

The following items are referred to herein. To the extent permitted by applicable law, they are incorporated fully herein by reference. Incorporation by reference is not an admission that any listed item is prior art.

D. Hrovat, "Survey of advanced suspension developments and related optimal control applications," Automatica, vol. 33, no. 10, pp. 1781–1817, 1997.

D. Karnopp, M. J. Crosby, and R. A. Harwood, "Vibration control using the semi-active force generators," ASME Journal of Engineering for Industry, vol. 96, pp. 619–626, 1974.

D. Karnopp, "Active and semi-active vibration isolation," ASME Journal of Mechanical Design, vol. 117, pp. 177–185, 1995.

M. Serrand and S. Elliott, "Multichannel feedback control for the isolation of base-excited vibration," Journal of Sound and Vibration, vol. 234, no. 4, pp. 681–704, 2000.

B. Zhao, X. Lu, M. Wu, and Z. Mei, "Sliding mode control of buildings with base-isolation bybrid protective system," Earthquake Engineering and Structural Dynamics, vol. 29, pp. 315–326, 2000.

N. Luo, J. Rodellar, D. De la Sen, and J. Vehi, "Output feedback sliding mode control of base isolated structures," Journal of the Franklin Institute, vol. 337, pp. 555–577, 2000.

T. E. Pare and J. P. How, "Hybrid H2 control design for vibration isolation," Journal of Sound and Vibration, vol. 226, no. 1, pp. 25–39, 1999.

H. Yoshioka, Y. Takahashi, K. Katayama, T. Imazawa, and N. Murai, "An active microvibration isolation system for Hi-tech manufacturing facilities," AMSE Journal Vibration and Acoustics, vol. A. Alleyne and J. K. Hedrick3, no. 4, 269–275 2001.

M. R. Bai and W. Liu, "Control design of active vibration isolation using μ-synthesis," Journal of Sound and Vibration, vol. 257, no. 1, pp. 157–175, 2002.

A. Alleyne and J. K. Hedrick, "Nonlinear adaptive control of active suspensions," IEEE Transactions on Control Systems Technology, vol. 3, no. 1, pp. 84–101, 1995.

C. Kim and P. I. Ro, "A sliding mode controller for vehicle active suspension systems with nonlinearities," Proc Instn Mech Engrs Part D, Journal of Automobile Engineering, vol. 2A. Alleyne and J. K. Hedrick, pp. 79–92, 1998.

Y. P. Wang and A. Sinha, "Adaptive sliding mode control algorithm for multi-degree-of-freedom microgravity isolation system," in Proceedings of the IEEE International Conference on Control Applications, 1997.

K. Mizutani, Y. Fujita, and H. Ohmori, "Hybrid control system for microvibration isolation," in Proceedings of the 4th IEEE International Workshop on Advanced Motion Control, 1996, vol 2, pp 577–582.

S. J. Richman, J. A. Giame, D. B. Newell, R. T. Stebbins, P. L. Bender, and J. E. Faller, "Multistage active vibration isolation system," Review of Science Instruments, vol. 69, no. 6, pp. 2531–2538, 1998.

K. D. Young and U. Ozguner, "Frequency shaping compensator design for sliding mode," International Journal of Control, vol. 57, no. 5, pp. 1005–1019, 1993.

E. I. Rivin, "Vibration isolation of precision equipment," Precision Engineering, vol. 17, no. 1, pp. 41–56, 1995.

Y. S. Hung and A. G. J. MacFarlane, Multivariable Feedback. a Quasi-Classical Approach. Springer-Verlag, 1982.

L. Ljung, System Identification: Theory for the User. Prentice Hall, 1999.

J. E. Mottershead and M. I. Friswell, "Model updating in structural dynamics: a survey," Journal of Sound and Vibration, vol. 167, no. 2, pp. 347–375, 1993.

D. J. Ewins, Modal Testing: Theory, Practice, and Application. Research Studies Press, 2000.

D. Inman, "Active modal control for smart structures," Philosophical Transactions of the Royal Society of London Series A, vol. 359, pp. 205–219, 2001.

M. Balas, "Trends in large space structure control theory: fondest hopes, wildest dreams," IEEE Transactions on Automatica Control, vol. 27, no. 3, pp. 522–535, 1982.

L. Meirovitch, Dynamics and Control of Structures. Wiley, 1990.

D. Vaes, W. Souverijns, J. DeCupyper, J. Swevers, and P. Sas, "Optimal decoupling for improved multivariable controller design, applied on an automotive vibration test rig," in Proceedings of the American Control Conference, 2003, 785–790.

D. Owens, Multivariable and Optimal Systems. Academic Press, 1981.

J. J. E. Slotine and W. Li, Applied Nonlinear Control. Prentice Hall, 1991.

J. Y. Hung, W. Gao, and J. C. Hung, "Variable structure control: a survey," IEEE Transactions on Industrial Electronics, vol. 40, no. 1, pp. 2–22, 1993.

K. D. Young, V. I. Utkin, and U. Ozguner, "A control engineer's guide to sliding mode control," IEEE Transactions on Control Systems Technology, vol. 7, no. 3, pp. 328–342, 1999.

S. Chan and W. Gao, "Variable structure model-reaching control strategy for robot manipulators," in Proceedings of the IEEE International Conference on Robotics and Automation, 1989, 1504–1508.

B. Yao and M. Tomizuka, "Smooth robust adaptive sliding model controlof manipulators with guaranteed transient performance," ASME Journal of Dynamic Systems, Measurement, and Control, vol. 118, pp. 764–775, 1996.

J. J. E. Slotine, "Sliding controller design for nonlinear systems," International Journal of Control, vol. 40, no. 2, pp. 421–434, 1984.

X. Chen, T. Fukuda, and K. Young, "A new nonlinear robust disturbance observer," Systems & Control Letters, vol. 41, pp. 189–199, 2000.

U. Stobener and L. Gaul, "Active vibration control of a car body based on experimentally evaluated modal parameters," Mechanical Systems and Signal Processing, vol. 15, pp. 173–188, 2001.

MIT/Caltech LIGO Laboratory, "Seismic isolation system upgrade, second review," 2003, http://www.ligo-.caltech.edu/coyne/IL/EPI/review2/EPI review2.htm.

W. Lohmiller and J. J. E. Slotine, "On contraction analysis for non-linear systems," Automatica, vol. 34, no. 6, pp. 683–696, 1998.

W. Lohmiller and J. J. E. Slotine, "Control system design for mechanical systems using contraction theory," IEEE Transactions on Automatica Control, vol. 45, no. 5, pp. 984–989, 2000.

The invention claimed is:

1. An apparatus comprising:
   a. an interface, configured to be coupled to an input of at least one actuator that is coupled to a plant that is subject to a vibration excitation, that experiences states, and that is to be controlled to achieve a target performance that isolates the plant from the vibration excitation;
   b. coupled to the interface, a controller, configured to generate signals to control the at least one actuator so that the states of the plant are such that, a dynamic manifold σ defined as follows, equals 0, where σ is defined:
      i. by a function of the states and a dynamic linear operator L(s), which is a function of the Laplace operator, s, and which operates on at least one of the states; and
      ii. such that, if σ=0, then the target performance is achieved.

2. The apparatus of claim 1, further wherein the controller is for use with a plant that is subject to a vibration excitation $x_0$ and operates with a performance x, the function that defines the dynamic manifold σ being of: first derivative of performance $\dot{x}$; and a difference between performance and vibration excitation, $x-x_0$.

3. The apparatus of claim 2, further wherein the linear operator L(s) operates upon a state of difference between performance and vibration excitation, $x-x_0$.

4. The apparatus of claim 3, further wherein the dynamic manifold σ is further defined by a dynamic linear operator Q(s) which operates upon a first derivative $\dot{x}$ of performance.

5. The apparatus of claim 2, further wherein the linear operator L(s) operates upon a state of first derivative $\dot{x}$ of performance.

6. The apparatus of claim 2, wherein:
   a. the target performance is a skyhook supported performance;
   b. dynamic manifold $\sigma = L(s)(x-x_0) + \dot{x}$; and
   c. $L(s) = (b_0)/(s+a_0)$, where $b_0$ represents a spring coefficient and $a_0$ represents a damping coefficient.

7. The apparatus of claim 2, the controller configured to generate signals to control the at least one actuator, which signals are a function of the dynamic linear operator L(s), which operates upon a state of difference between performance and vibration excitation, $x-x_0$.

8. The apparatus of claim 1, wherein the excitation is a position vibration and the performance is a position.

9. The apparatus of claim 1, wherein the excitation is a velocity vibration and the performance is a velocity.

10. The apparatus of claim 1, the controller configured to generate signals to control the at least one actuator, which signals are a function of the dynamic linear operator L(s).

11. The apparatus of claim 1, the controller configured to generate signals to control the at least one actuator, which signals are a function of the dynamic manifold σ.

12. The apparatus of claim 1, the controller configured to generate signals to control the at least one actuator, which signals are a function of a Sgn function of the dynamic manifold σ.

13. The apparatus of claim 1, the controller configured to generate signals to control the at least one actuator, which signals are a continuous approximation of a Sgn function, within a boundary layer of the dynamic manifold σ.

14. The apparatus of claim 1, wherein the plant is a single input and single output plant, the states are in normal coordinates, and the controller is configured to generate a signal to control a single actuator.

15. The apparatus of claim 1, the controller further configured to drive σ to equal 0 using sliding control.

16. The apparatus of claim 15, the controller further configured to drive σ to be near equal to 0 using sliding control with a boundary layer.

17. The apparatus of claim 1, the plant being of order n, where n is a positive integer and the target performance having dynamics of order equal to n or greater than n.

18. The apparatus of claim 1, the plant being of order n, where n is a positive integer and the target performance having dynamics of order equal to n.

19. The apparatus of claim 18, a target performance for each mode of the plant being a skyhook damped performance.

20. The apparatus of claim 1, the plant being of order n, where n is a positive integer and the target performance having dynamics of order less than n.

21. The apparatus of claim 1, the plant having n DOF, where n is a positive integer, and the target performance having dynamics of order equal to 2n.

22. The apparatus of claim 1, wherein the controller is for use with a plant that is a traveling vehicle.

23. The apparatus of claim 1, wherein the controller is for use with a plant that is a passenger vehicle.

24. The apparatus of claim 1, wherein the controller is for use with a plant that is an instrumentation support.

25. The apparatus of claim 1, wherein the controller is for use with a plant that is an instrument vibration isolation support.

26. The apparatus of claim 25, wherein the controller is for use with a plant that is to isolate vibration from equipment carried by a helicopter.

27. The apparatus of claim 1, wherein the controller is for use with a plant that is to isolate vibration from laboratory equipment.

28. The apparatus of claim 1, wherein the plant is a multiple degree of freedom (DOF) plant having a plurality of actuators, and defined by a plurality of modes, each to be controlled to achieve a target modal performance, further wherein:
   a. the dynamic manifold σ is a set of modal dynamic manifolds $\sigma_i$, each corresponding to one of the plurality of modes;
   b. the controller is configured to generate, for each of the plurality of actuators, a signal that drives the actuator, so that the states of the multi DOF plant are such that, for each mode, a modal dynamic manifold $\sigma_i$ equals 0, where $\sigma_i$ is defined:
      i. by a function of the states in modal coordinates and a modal dynamic linear operator $L_i(s)$, which is a function of the Laplace operator, s, and which operates on at least one of the states in modal coordinates; and
      ii. such that, if $\sigma_i = 0$, then the target performance is achieved.

29. The apparatus of claim 28, the controller configured to generate a signal that is a function of the dynamic linear operator L(s).

30. The apparatus of claim 1, wherein the plant is one mode of a multi degree of freedom (DOF) plant, that has at least one actuator, the modal plant having states in modal coordinates and to be controlled to achieve a target modal performance, further wherein:
   a. the dynamic manifold σ is a modal dynamic manifold $\sigma_1$; and
   b. the controller is configured to generate, for the modal plant, a force signal $u_i$ in modal coordinates, to be a component of a force signal that is supplied to a modal combination module, configured to combine modal force signals corresponding to other modes and to generate signals to drive the at least one actuator[s] so that the states of the modal plant are such that the modal dynamic manifold $\sigma_i$ equals zero, where $\sigma_i$ is defined:
      i. by a function of the states of the modal plant and a modal dynamic linear operator $L_i(s)$, which is a function of the Laplace operator s, and which modal dynamic linear operator operates on at least one of the states of the modal plant; and
      ii. such that, if $\sigma_i$ equals zero, then the target modal performance is achieved.

31. The apparatus of claim 30, further where the force signal $u_i$ is defined by a function of a predetermined estimation of a modal parameter.

32. The apparatus of claim 30, further where the force signal $u_i$ is defined by a function of a predetermined estimation of modal frequency.

33. The apparatus of claim 30, further where the force signal $u_i$ is defined by a function of a predetermined estimation of a modal damping parameter.

34. The apparatus of claim 30, the controller further comprising a modal combination module, configured to combine the corresponding force signals $u_i$ for at least two modes and generate for each of the at least one actuators, a signal $v_i$ to drive the actuator, so that the states are such that $\sigma_i=0$.

35. The apparatus of claim 30, further wherein the controller is for use with a plant that is subject to a plurality of modal vibration excitations, a single such excitation being designated $x_{0i}$, and where the plant exhibits a plurality of modal performances, a single such performance in modal coordinates being designated $x_i$, the function defining the modal dynamic manifold $\sigma_i$ being of the states in modal coordinates of: first derivative of performance; and difference between vibration excitation and performance.

36. The apparatus of claim 35, further wherein, for the modal dynamic manifold $\sigma_i$, a dynamic linear operator $L_i(s)$ operates on the state of difference between performance and vibration excitation, both in modal coordinates.

37. The apparatus of claim 36, wherein the modal target performance is a skyhook supported performance, and the modal dynamic manifold $\sigma_i=L_i(s)(x_i-x_{i0})+\dot{x}_i$ and $L_i(s)=b_0/(s+a_0)$, where $b_0$ represents a modal spring coefficient and $a_0$ represents a modal damping parameter.

38. The apparatus of claim 1, the controller further configured to drive $\sigma$ to zero while using adaptive control by updating estimation online of unknown parameters chosen from the group consisting of at least one component of matrices of: mass, damping, stiffness and friction.

39. The apparatus of claim 1, further wherein the controller is for use with a multi degree of freedom (DOF) plant that is subject to a vibration excitation vector $z_0$ and operates with a performance vector z, and the dynamic manifold $\sigma$ is a vector function of the states of the plant.

40. The apparatus of claim 1, further wherein the controller is for use with a multi degree of freedom (DOF) plant that is subject to a vibration excitation vector $z_0$ and operates with a performance vector z, and the dynamic manifold $\sigma$ is a vector function of the states of first derivative of performance $\dot{z}$, and difference between vibration excitation $z_0$ and performance z.

41. The apparatus of claim 40, further wherein the dynamic linear operator L(s) is a matrix that operates upon the state of difference between vibration excitation $z_0$ and performance z.

42. The apparatus of claim 40, further wherein:
a. the target performance is a skyhook supported damped performance;
b. the dynamic manifold vector $\sigma=L(s)(z-z_0)+\dot{z}$; and
c. $L(s)=(sI+\overline{C})^{-1}\overline{K}$, where I is the identity matrix and $\overline{C}$ and $\overline{K}$ are preselected damping and stiffness matrices, respectively, to meet the target performance.

43. The apparatus of claim 40, wherein the plant has an order and the target performance dynamics have an order, and the plant and target performance dynamics orders are equal.

44. The apparatus of claim 40, wherein the plant has an order and the target performance dynamics have an order, which is greater than the plant order.

45. The apparatus of claim 40, further comprising:
a. a parameter adaptation module, which applies a law $\hat{a}$ that is a function of the dynamic manifold $\sigma$;
b. a force rule generator, that generates as an output a force vector signal v, that is a function of $\sigma$ and an estimation $\hat{a}$ of unknown parameters a from matrices K, C and M, which represent spring coefficients, damping parameters and mass, respectively, of the plant; and
  i. if $\sigma=0$, retains any present parameter estimate, and
  ii. if not, applies the parameter adaptation law.

46. A method comprising the steps of:
a. providing a dynamic manifold $\sigma$ that is:
  i. a function of states of a plant that is subject to vibration excitation and is to achieve a target performance that exhibits a desired isolation of the plant from vibration;
  ii. a function of a dynamic linear operator L(s), which is a function of the Laplace operator, s; and
  iii. composed such that if the states are such that the dynamic manifold $\sigma$ equals zero, the target performance is attained;
b. measuring the states and generating signals that correspond thereto;
c. generating a signal that corresponds to the dynamic manifold $\sigma$, based on the state signals; and
d. generating signals to at least one actuator that is coupled to the plant, to drive the at least one actuator so that the states of the plant are such that the dynamic manifold $\sigma$ equals 0.

47. The method of claim 46, further where the states are: a difference between a performance of the plant and a vibration excitation; and time derivative of performance.

48. The method of claim 46, further wherein the controller is for use with a plant that is subject to a vibration excitation $x_0$ and operates with a performance x, the function that defines the dynamic manifold being of first derivative of performance $\dot{x}$, and a difference between performance and vibration excitation $x-x_0$.

49. The method of claim 48, further wherein the linear operator L(s) operates upon the state of difference between performance and vibration excitation $x-x_0$.

50. The method of claim 49, further wherein the dynamic manifold $\sigma$ is further defined by a dynamic linear operator Q(s), which operates upon a first derivative $\dot{x}$ of performance.

51. The method of claim 48, further wherein the linear operator L(s) operates upon a first derivative $\dot{x}$ of performance.

52. The method of claim 48, wherein:
a. the target performance is a skyhook supported performance;
b. the dynamic manifold $\sigma=L(s)(x-x_0)+\dot{x}$; and
c. L(s) is a dynamic linear operator equal to $(b_0)/(s+a_0)$, where $b_0$ represents a spring coefficient and $a_0$ represents a damping coefficient.

53. The method of claim 48, further comprising the step of generating signals to control the at least one actuator, which signals are a function of the dynamic linear operator L(s) which operates upon the state of difference between performance and vibration excitation, $x-x_0$.

54. The method of claim 48, further wherein the dynamic linear operator L(s) is a matrix that operates upon the state of difference between vibration excitation $z_0$ and performance z.

55. The method of claim 54, wherein:
a. the target performance is a skyhook supported damped performance;
b. the dynamic manifold $\sigma=L(s)(z-z_0)+\dot{z}$; and
c. $L(s)=(sI+\overline{C})^{-1}\overline{K}$, where I is the identity matrix and $\overline{C}$ and $\overline{K}$ are preselected damping and stiffness matrices, respectively, to meet the target performance.

56. The method of claim 46, wherein the excitation is a position vibration and the performance is a position.

57. The apparatus of claim 46, wherein the excitation is a velocity vibration and the performance is a velocity.

58. The method of claim 46, further comprising the step of generating signals to control the at least one actuator, which signals are a function of the dynamic linear operator L(s).

59. The method of claim 46, the step of generating signals to control the at least one actuator, comprising generating signals that are a function of the dynamic manifold σ.

60. The method of claim 46, the step of generating signals to control the at least one actuator, comprising generating signals that are a function of a Sgn function of the dynamic manifold σ.

61. The method of claim 46, the step of generating signals to control the at least one actuator, comprising generating signals that are a continuous approximation of a Sgn function, within a boundary layer of σ.

62. The method of claim 46, wherein the plant is a single input and single output plant, the states are in normal coordinates, and the step of generating a signal to control at least one actuator comprises generating a signal to control a single actuator.

63. The method of claim 46, the plant being of order n, which is a positive integer, and the target performance having dynamics of order equal to or greater than n.

64. The method of claim 46, the plant being of order n, which is a positive integer, and the target performance having dynamics of order equal to n.

65. The method of claim 46, the plant being of order n, which is a positive integer, and the target performance having dynamics of order less than n.

66. The method of claim 46, the plant having n Degrees of Freedom (DOF), where n is a positive integer, and the target performance having dynamics of order equal to 2n.

67. The method of claim 66, the plant further being defined by a plurality of modes, the target performance for at least one mode being a skyhook supported performance.

68. The method of claim 66, the plant being defined by at least one mode, target performance for at least one mode being a skyhook damped performance.

69. The method of claims 46, the step of generating signals to drive the actuators comprising using sliding control to generate signals to drive σ to equal 0.

70. The method of claim 69, the step of using sliding control comprising using sliding control with a boundary layer.

71. The method of claim 46, wherein the plant is a traveling vehicle.

72. The method of claim 46, wherein the plant is a passenger vehicle.

73. The method of claim 46, wherein the plant is an instrument support.

74. The method of claim 46, wherein the plant is an instrument vibration isolation support.

75. The method of claim 74, wherein the plant is a vibration isolator for equipment carried by a helicopter.

76. The method of claim 74, wherein the plant is a vibration isolator for laboratory equipment.

77. The method of claim 46, wherein the plant is a multiple degree of freedom (DOF) plant, having a plurality of actuators, and defined by a plurality of modes, the plant to be controlled to achieve, for each mode, a target modal performance, further wherein the step of generating signals to at least one actuator comprises the steps of:

a. generating, for each of the plurality of modes, a force signal $u_i$ in modal coordinates;

b. combining each signal $u_i$ with corresponding modal force signals for each other of the plurality of modes; and c. generating, for each of the plurality of actuators, a signal $v_j$ that drives the actuator so that the states of the multi-DOF plant are such that, for each mode, a modal dynamic manifold $\sigma_i$ equals zero, which dynamic manifold $\sigma_i$ is defined:

i. by a function of the states in modal coordinates and a modal dynamic linear operator L(s), which which operates on at least one of the states in modal coordinates; and ii. such that, if $\sigma_i=0$, then the target performance is achieved.

78. The method of claim 46, wherein the plant has states in modal coordinates, and is one mode of a multi degree of freedom (DOF) plant that has at least one actuator, the modal plant having states in modal coordinates and to be controlled to achieve a target modal performance, further wherein the step of generating signals to at least one actuator comprises the steps of:

a. generating, for the modal plant, a force signal $u_i$ in modal coordinates;

b. combining the signal $u_i$ with other force signals; and c. generating, for the at least one actuator, a signal $v_j$ that drives the actuator so that the states of the multi DOF plant are such that for the single mode, a modal dynamic manifold $\sigma_i$ equals zero, which dynamic manifold $\sigma_i$ is defined:

i. by a function of the states in modal coordinates and a modal dynamic linear operator $L_i(s)$, which operates on at least one of the states in modal coordinates; and ii. such that, if $\sigma_i=0$, then the modal target performance is achieved.

79. The method of claim 78, further where the step of generating a force signal $u_i$ comprises generating a signal that is based on a function of a predetermined estimation of a modal parameter.

80. The method of claim 79, further comprising the step of conducting modal testing to generate the predetermined estimation of a modal parameter.

81. The method of claim 78, further where the step of generating a force signal $u_i$ comprises generating a signal that is based on a function of a predetermined estimation of modal frequency.

82. The method of claim 81, further comprising the step of conducting modal testing to generate the predetermined estimation of modal frequency.

83. The method of claim 78, further where the step of generating a force signal $u_i$ for the at least one actuator[s] comprises generating a signal that is based on a function of a predetermined estimation of modal frequency.

84. The method of claim 78, further where the step of generating a force signal $u_i$ comprises generating a signal that is a function of a predetermined estimation of a modal damping parameter.

85. The method of claim 84, further comprising the step of conducting modal testing to generate the predetermined estimation of a modal damping parameter.

86. The method of claim 78, further where the step of generating a force signal $u_i$ for the at least one actuators comprises generating a signal that is a function of a predetermined estimation of a modal damping parameter.

87. The method of claim 78, further wherein the method is for use with a plant that is subject to a modal vibration excitation, in modal coordinates, being designated $x_{0i}$, and where the plant provides a modal performances in modal coordinates being designated $x_i$, further wherein the step of generating, for at least one actuator, a signal, comprises generating a signal that drives the at least one actuator so that a modal dynamic manifold $\sigma_i=0$, which dynamic manifold is defined by a function of the states in modal coordinates.

88. The method of claim 87, further wherein the states are: first derivative of performance; and difference between vibration excitation and performance.

89. The method of claim 87, further wherein, the linear operator $L_i(s)$ operates on the state of difference between performance and vibration excitation, both in modal coordinates.

90. The method of claim 89, wherein for the at least one mode:
   a. the target performance is a skyhook supported performance;
   b. the modal dynamic manifold $\sigma=L_i(s)(x_i-x_{i0})+\dot{x}_i$; and
   c. $L_i(s)=b_0/(s+a_0)$, where $b_0$ represents a modal spring coefficient and $a_0$ represents a modal damping parameter.

91. The method of claim 78, the step of generating for the mode a force signal comprising generating, a signal that is a function of the dynamic linear operator $L_i(s)$.

92. The method of claim 78, the step of generating, for the at least one actuator, a signal that drives the actuator comprising generating a signal that is a function of the dynamic linear operator $L(s)$.

93. The method of claim 46, the step of generating signals to drive the at least one actuator comprising using adaptive control to generate signals to drive $\sigma$ to equal 0 while updating estimation online of unknown parameters chosen from the group consisting of at least one component of matrices of: mass, damping, stiffness and friction.

94. The method of claim 93, wherein the plant has an order and the target dynamics performance have an order, and the plant and target dynamics performance orders are equal.

95. The method of claim 93, wherein the plant has an order and the target dynamics performance have an order, which is greater than the plant order.

96. The method of claim 93, wherein the plant has an order the target dynamics performance have an order, which is less than the plant order.

97. The method of claim 46, further wherein the plant is a multi degree of freedom (DOF) plant that is subject to a vibration excitation vector $z_0$ and operates with a performance vector z, and the dynamic manifold $\sigma$ is a vector function of the states of the plant.

98. The method of claim 46, further wherein the plant is a multi degree of freedom (DOF) plant that is subject to a vibration excitation vector $z_0$ and operates with a performance vector z, and the dynamic manifold $\sigma$ is a vector function of the states of first derivative of performance $\dot{z}$, and difference between vibration excitation $z_0$ and performance z.

99. The method of claim 46, the step of generating signals to at least one actuator further comprising:
   a. applying a parameter adaptation law â for adapting unknown parameters â for unknown parameters a from matrices K, C and M, which represent spring coefficients, damping ratios and mass, respectively, of the plant, which adaptation law is a function of $\sigma$, composed such that:
      i. if $\sigma$ is not equal to 0, changes values for at least one of the parameters; and
      ii. if $\sigma$ is equal to 0, retains any present estimate for the parameters; and
   b. generating a force vector signal v, that is a function of the dynamic manifold $\sigma$ and the estimation â of unknown parameters a.

100. Software stored on a medium that is readable by a signal processor equipped with an appropriate peripheral reading device, comprising instructions for causing a processor to perform the steps of:
   a. providing a dynamic manifold $\sigma$ that is:
      i. a function of states of a plant that is subject to vibration excitation and is to achieve a target performance that exhibits a desired isolation of the plant from vibration;
      ii. a function of a dynamic linear operator $L(s)$, which is a function of the Laplace operator, s; and
      iii. composed such that if the states are such that the dynamic manifold $\sigma$ equals zero, the target performance is attained;
   b. measuring the states and generating signals that correspond thereto;
   c. generating a signal that corresponds to the dynamic manifold $\sigma$, based on the state signals; and
   d. generating signals to at least one actuator that is coupled to the plant, to drive the at least one actuator so that the states of the plant are such that the dynamic manifold $\sigma$ equals 0.

101. The method of claim 100, further wherein the controller is for use with a plant that is subject to a vibration excitation $x_0$ and operates with a performance x, the software further comprising instructions for causing a computer to set the function that defines the dynamic manifold to be of states of first derivative of performance $\dot{x}$, and a difference between performance and vibration excitation $x-x_0$.

102. The software of claim 100, further wherein the target performance is a skyhook supported performance, the software further comprising instructions for causing a computer to set;
   a. the dynamic manifold $\sigma=L(s)(x-x_0)+\dot{x}$; and
   b. $L(s)$, equal to $(b_0)/(s+a_0)$, where $b_0$ represents a spring coefficient and $a_0$ represents a damping coefficient.

103. The software of claim 100, further comprising instructions for causing a computer to use sliding control to generate signals to the actuators to drive $\sigma$ to equal 0.

104. The software of claim 100, further wherein the plant has states in modal coordinates, and is one mode of a multi degree of freedom (DOF) plant that has at least one actuator, the modal plant having states in modal coordinates and is to be controlled to achieve a target modal performance, the software comprising instructions for further causing a computer to perform the steps of:
   a. generating, for the modal plant, a force signal $u_i$ in modal coordinates;
   b. combining the signal $u_i$ with other force signals; and
   c. generating, for the at least one actuator, a signal $v_i$ that drives the actuator so that the states of the multi DOF plant are such that for the single mode, a modal dynamic manifold $\sigma_i$ equals zero, which dynamic manifold $\sigma_i$ is defined:
      i. by a function of the states in modal coordinates and a modal dynamic linear operator $L_i(s)$, which is a function of the Laplace operator, s, and which operates on at least one of the states in modal coordinates; and ii. such that, if $\sigma_i=0$, then the modal target performance is achieved.

105. The software of claim 104, further comprising instructions for causing a computer to perform the step of generating a force signal $u_i$ that is based on a function of a predetermined estimation of a modal parameter.

106. The software of claim 100, further comprising instructions for causing a computer to perform the step of generating signals to drive the actuators using adaptive control to generate signals to drive σ to equal 0 while updating estimation online of unknown parameters chosen from the group consisting of at least one component of matrices of: mass, damping, stiffness and friction.

107. The software of claim 106, further wherein the plant is a multi degree of freedom (DOF) plant that is subject to a vibration excitation vector $z_0$ and operates with a performance vector z, and the target performance is a skyhook supported damped performance, the software further comprising instructions for causing the computer to perform the steps of setting:

a. the dynamic manifold $\sigma=L(s)(z-z_0)+\dot{z}$; and b. $L(s)=(sI+\overline{C})^{-1}\overline{K}$, where I is the identity matrix and $\overline{C}$ and $\overline{K}$ are preselected damping and stiffness matrices, respectively, to meet the target performance.

* * * * *